United States Patent [19]
Fujiwara et al.

[11] Patent Number: 5,251,011
[45] Date of Patent: Oct. 5, 1993

[54] DISPLACEMENT DETECTION SYSTEM

[75] Inventors: Nariaki Fujiwara; Tokaji Shibahara, both of Kyoto, Japan

[73] Assignee: Dainippon Screen Manufacturing Co., Ltd., Japan

[21] Appl. No.: 927,872

[22] Filed: Aug. 10, 1992

Related U.S. Application Data

[63] Continuation of Ser. No. 546,409, Jun. 28, 1990, abandoned.

[30] Foreign Application Priority Data

Jun. 28, 1989 [JP] Japan ................................ 1-166462
Jun. 28, 1989 [JP] Japan ................................ 1-166463
Jun. 28, 1989 [JP] Japan ................................ 1-166464

[51] Int. Cl.$^5$ ............................................. G01B 11/14
[52] U.S. Cl. .............................................................. 356/373
[58] Field of Search ............... 356/372, 373, 375, 376, 356/121, 123, 122; 250/201.2, 201.3, 201.4, 201.5, 201.6, 201.1

[56] References Cited

U.S. PATENT DOCUMENTS

| | | | |
|---|---|---|---|
| 3,491,240 | 1/1970 | Vyce | 356/373 |
| 4,378,491 | 3/1983 | Lehman | 250/201.5 |
| 4,694,443 | 9/1987 | Ando et al. | 250/201.5 |
| 5,033,856 | 7/1991 | Nose et al. | 250/201.2 |

FOREIGN PATENT DOCUMENTS

| | | | |
|---|---|---|---|
| 48-60645 | 8/1973 | Japan . | |
| 58-60433 | 4/1983 | Japan . | |
| 58-217909 | 12/1983 | Japan . | |
| 60-37509 | 2/1985 | Japan . | |
| 60-76035 | 4/1985 | Japan . | |
| 0075308 | 4/1987 | Japan | 356/373 |
| 2077421 | 12/1981 | United Kingdom | 356/373 |
| 2078947 | 1/1982 | United Kingdom | 356/375 |

*Primary Examiner*—Richard A. Rosenberger
*Assistant Examiner*—Hoa Q. Pham
*Attorney, Agent, or Firm*—Ostrolenk, Faber, Gerb & Soffen

[57] ABSTRACT

Light emitted from a light source (1) reaches a sample surface (2) via an objective lens (6). An edge (7a) of a louver (7) is located at a a position which is conjugate with a predetermined reference position across the objective lens. When the sample surface is displaced from the reference position, light reflected from the sample surface impinges upon the louver is reflected therefrom and is then detected by a photo-sensor (8). When the surface coincides with the reference position, the light does not reach the photo-sensor. Thus, a displacement of the sample surface from the reference point can be detected by monitoring output signals from the photo-sensor.

34 Claims, 33 Drawing Sheets

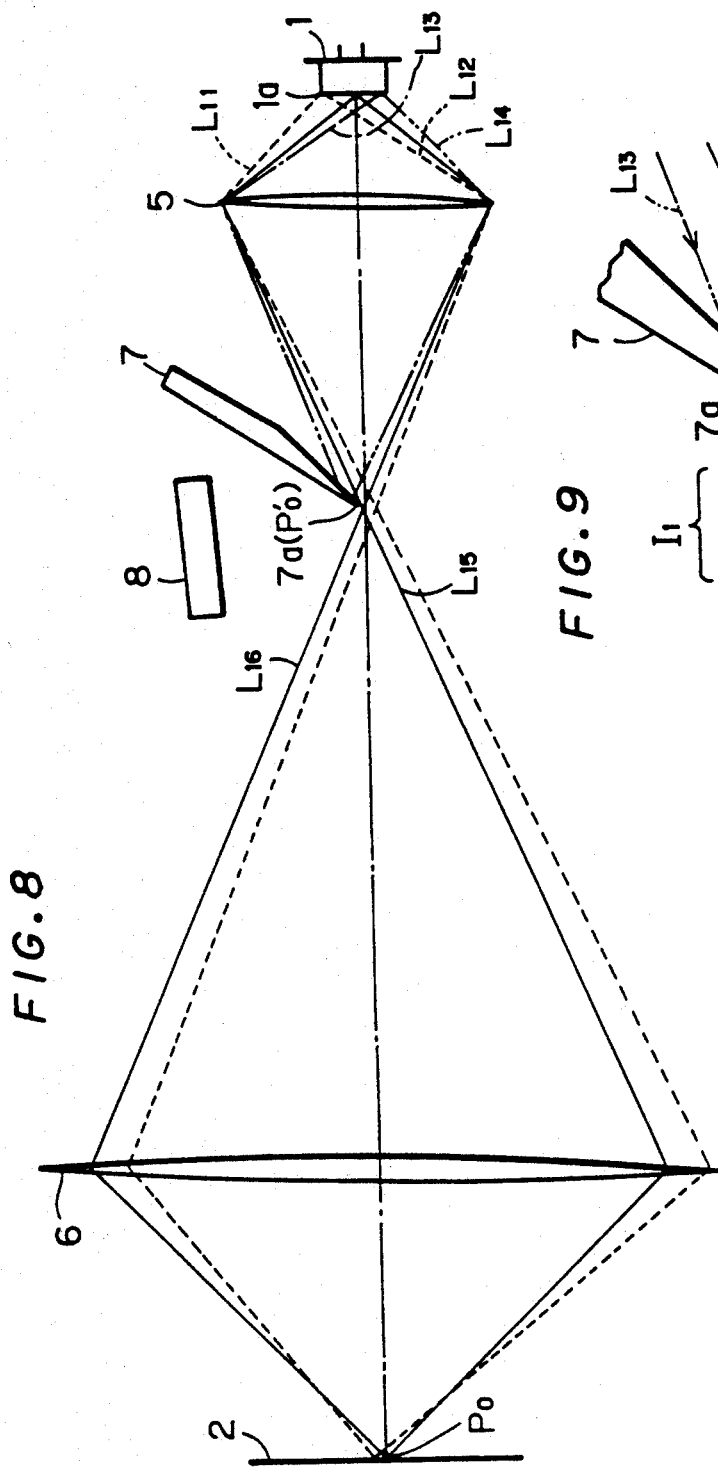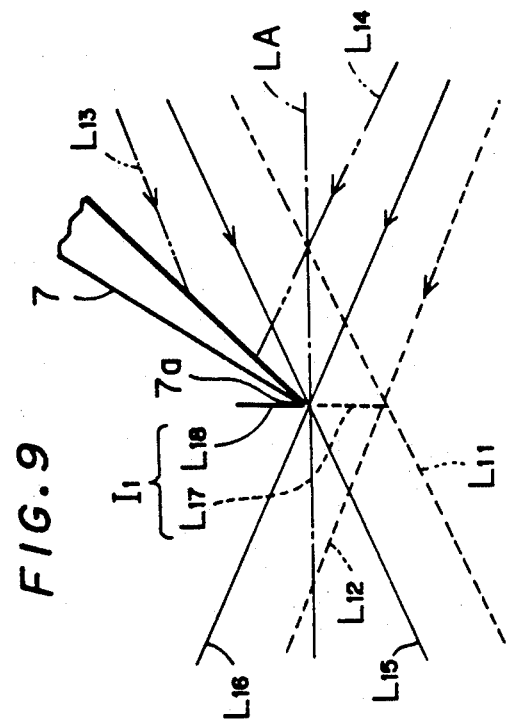
FIG.8
FIG.9

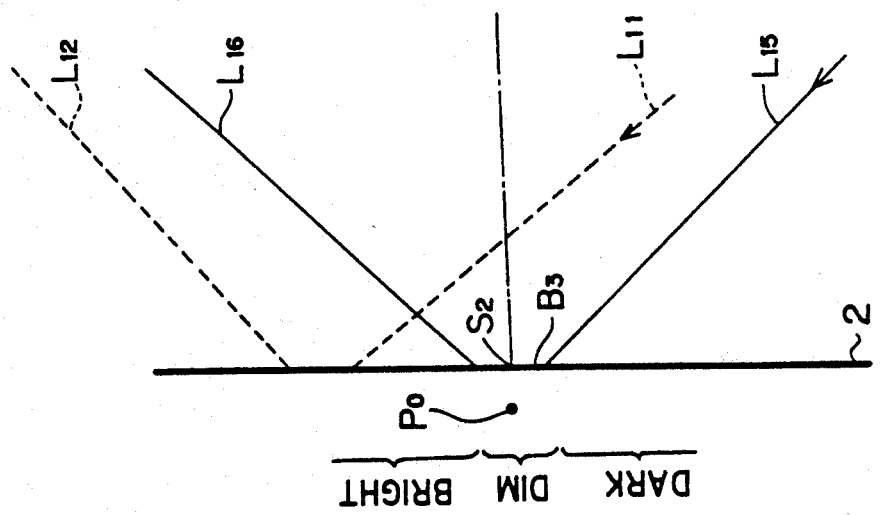
FIG. 12 BEFORE FOCUS
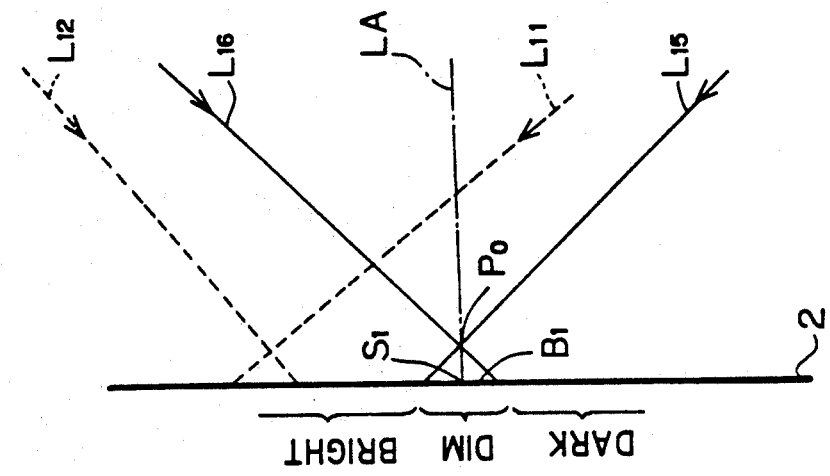
FIG. 11 BEHIND FOCUS
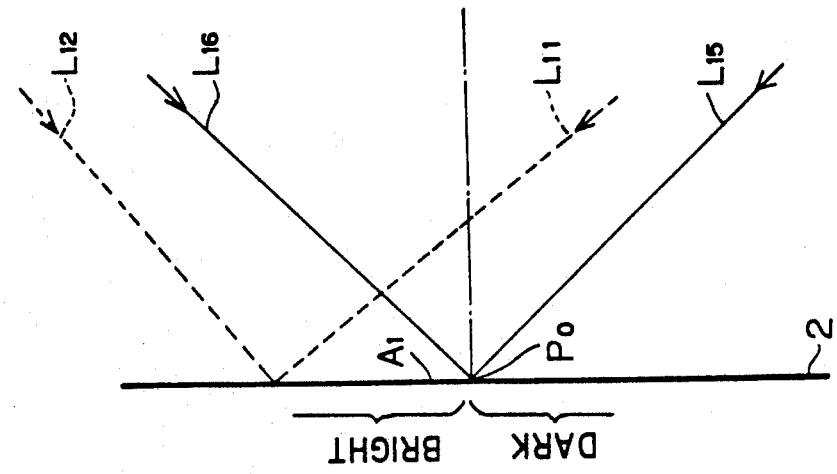
FIG. 10 ON FOCUS

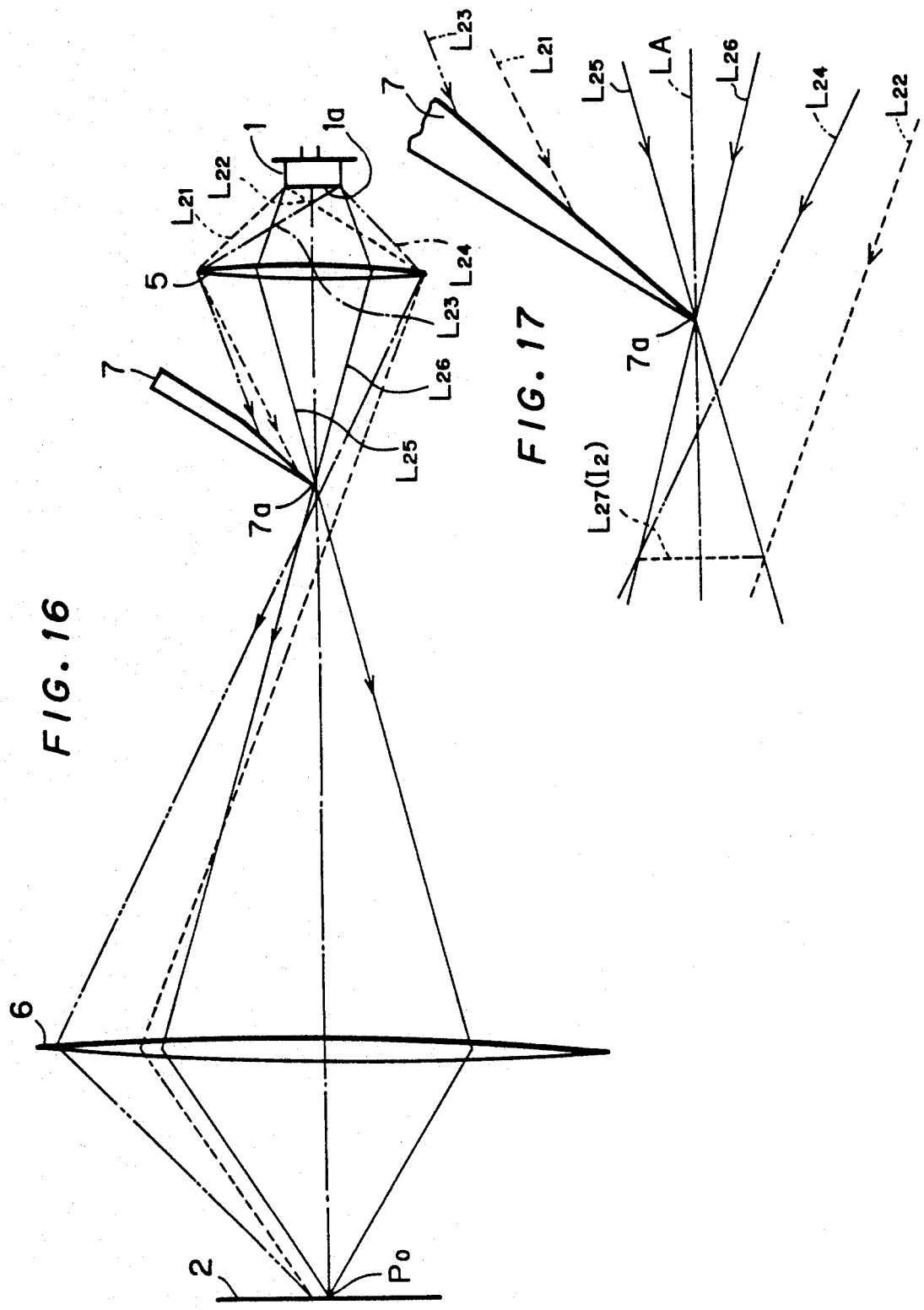

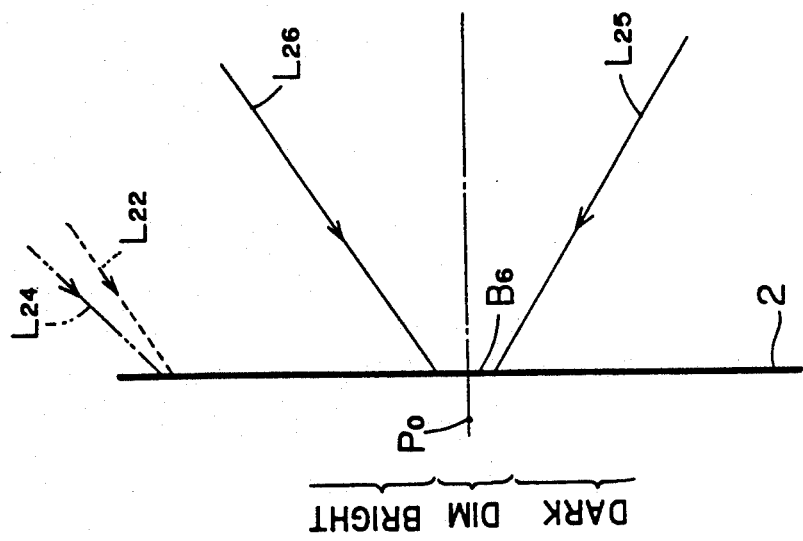
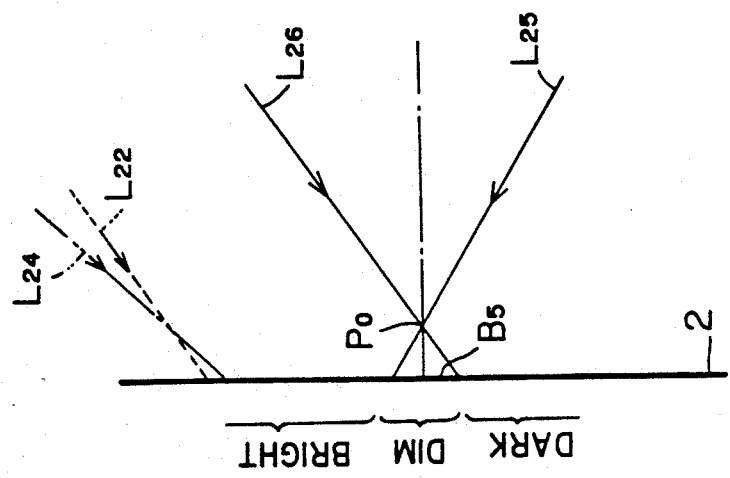
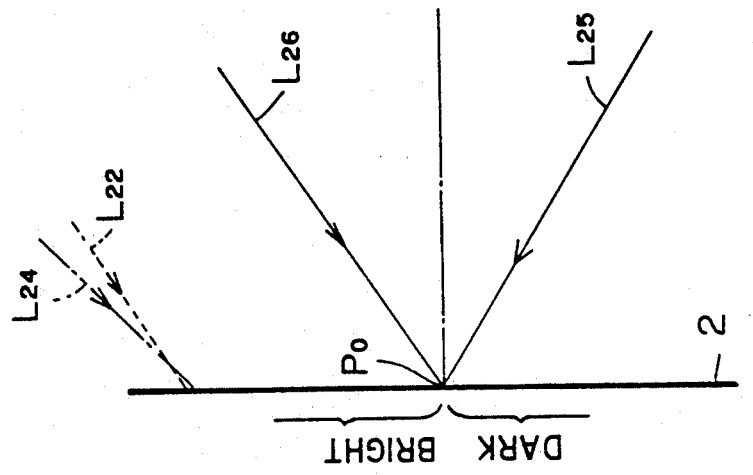

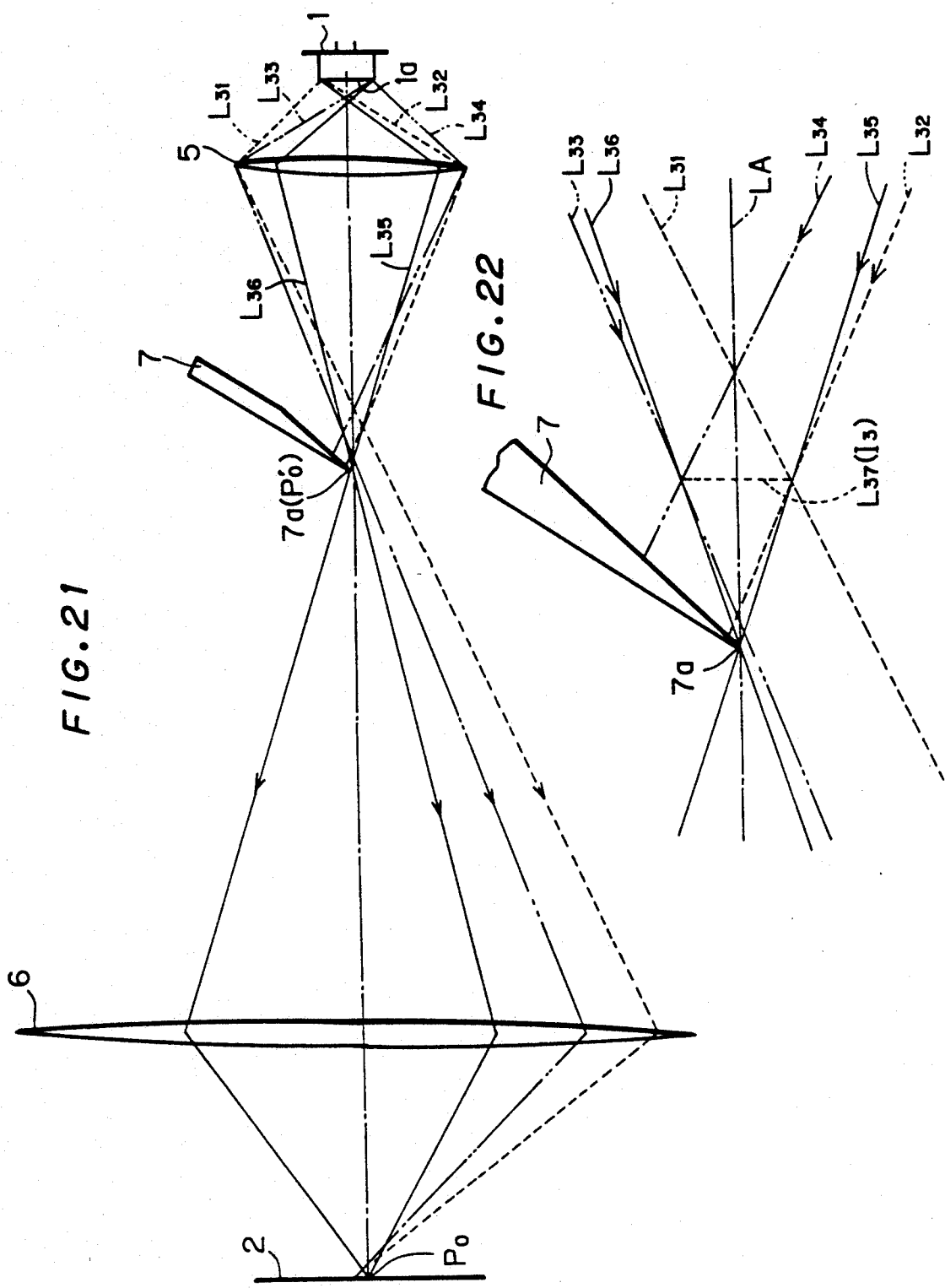

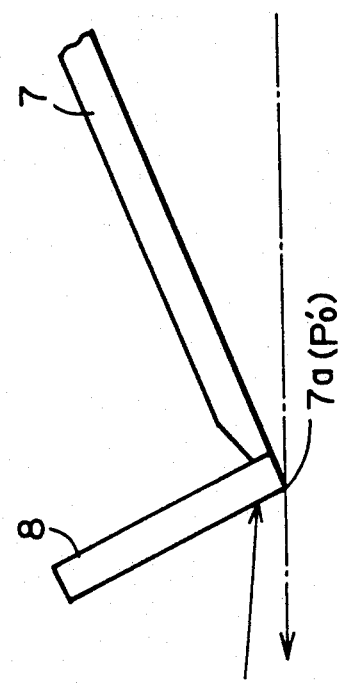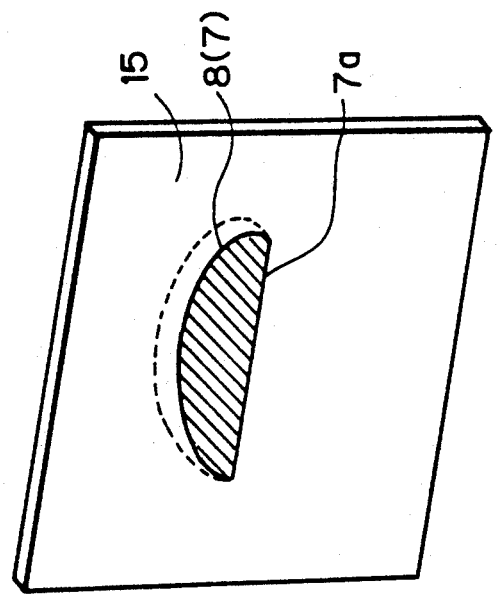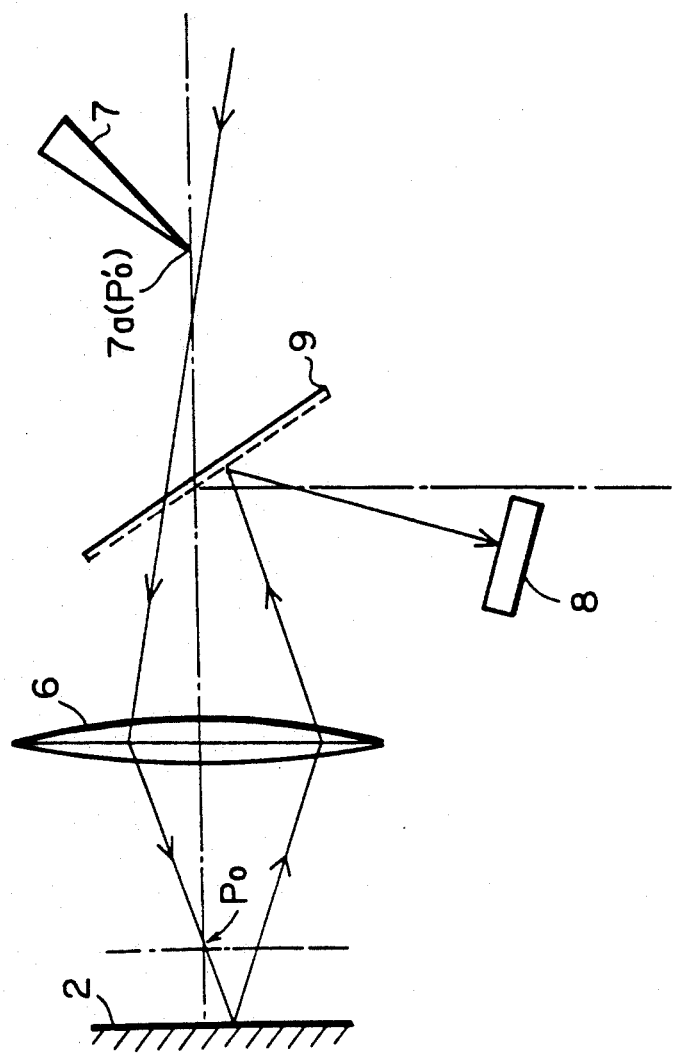

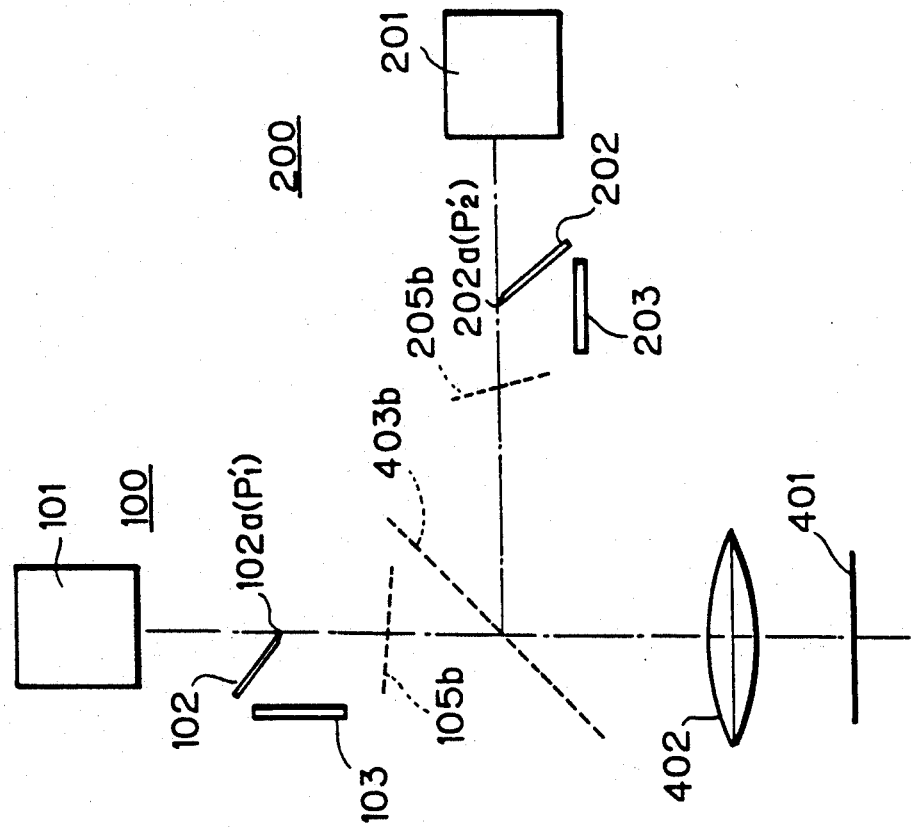
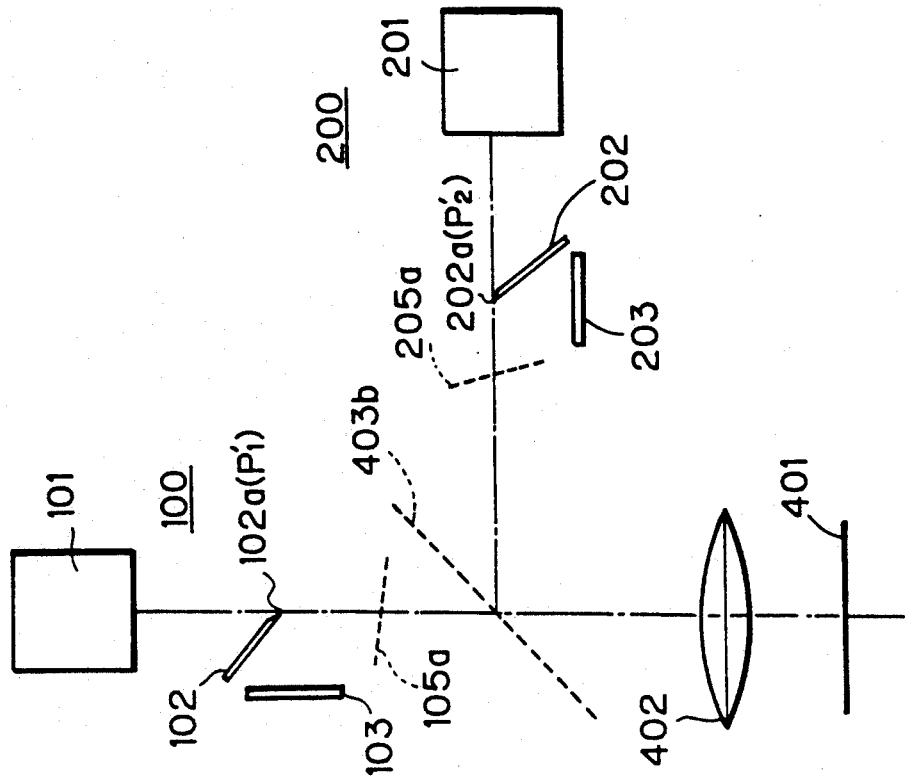

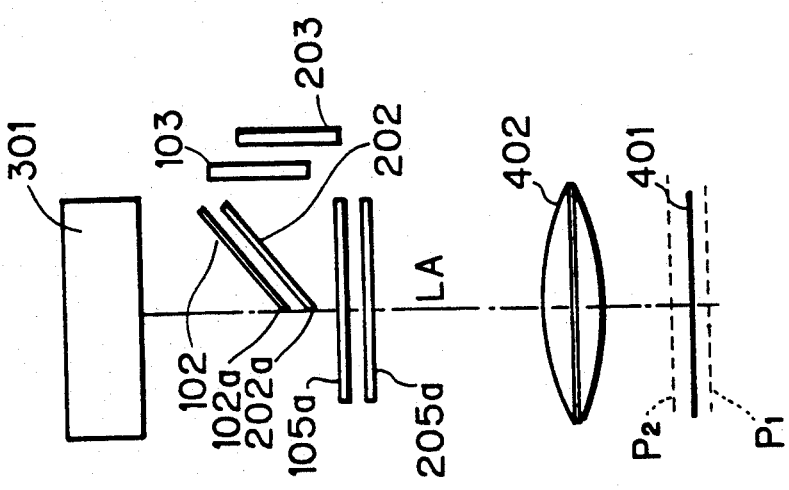
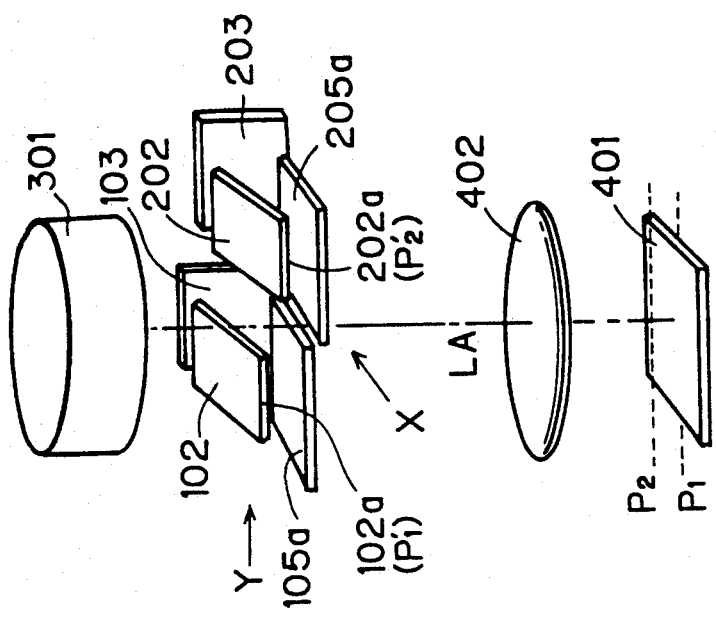

DISPLACEMENT DETECTION SYSTEM

This is a continuation of application Ser. No. 07/546,409, filed on Jun. 28, 1990 now abandoned.

BACKGROUND OF THE INVENTION

1. Field of the Invention

The present invention relates to a system for detecting displacements of a sample surface from a reference point, and may be used, for instance, with autofocusing systems to focus a microscope to determine the thickness of films stretching over substrates and the width of wiring lines over circuit patterns or to position a laser head of an optical disk drive against an optical disk for reading and/or writing.

2. Description of the Prior Art

FIG. 1 is a schematic diagram of a conventional defocus detection system disclosed in Japanese Patent Laying Open Gazette 60-76035 (1985).

In this prior art system (hereinafter referred to as the "first prior art system", flux of light from a light source 21 is reflected by a half mirror 22, and travels through lenses 23 and 24 to form a spot on an optical disk 25. Flux reflecting from the spot travels through lenses 24 and 23 and the half mirror 22, forms an image, and finally reaches photo-sensors $D_1$ and $D_2$ which are obtained by dividing a single sensor into two parts.

An anterior louver 26 and a posterior louver 27, each with a knife edge and offset against the optical axis, are located symmetrically on both sides of point $P_{10}$ at which an image is formed when the flux from the light source 21 is focused on the optical disk 25. When the optical disk 25 is on the focus, the light path is as illustrated by solid lines and the reflecting flux is not prevented by the louvers 26 and 27 from reaching the divided photo-sensors $D_1$ and $D_2$ and giving the photo-sensors $D_1$ and $D_2$ equal amount of light. Consequently, it is concluded that the optical disk 25 is on the focus when the photo-sensors $D_1$ and $D_2$ receive equal amounts of light, under which circumstances the imaging point $P_{10}$ falls right in the middle of the louvers 26 and 27.

If the optical disk 25 is displaced off the lens 24 from the focus, an image is formed, for instance, at a point $P_{11}$, as illusrated by broken lines in FIG. 1. The point $P_{11}$ is closer to the anterior louver 26 than the point $P_{10}$ and a part of the flux travelling above the optical axis towards the sensor $D_1$ is blocked by the posterior louver 27. It is therefore concluded that the optical disk 25 is displaced off the lens 24 from the focus when the sensor $D_1$ receives a decreased amount of light. Signals generated by the sensor $D_1$ are fed back to an autofocusing mechanism to restore the optical disk 25 to the focus.

Contrarily, if the optical disk 25 is displaced towards lens 24 from the focus, an image is formed, for instance, at a point $P_{12}$, as illusrated by two-dot chain lines in FIG. 1, the point $P_{12}$ is closer to the posterior louver 27 than the point $P_{10}$ and a part of the flux travelling above the optical axis towards the sensor $D_2$ is blocked by the anterior louver 26. It is therefore concluded that the optical disk 25 is displaced towards the lens 24 from the focus when the sensor $D_2$ receives decreased amount of light. Signals generated by the sensor $D_2$ are fed back to the autofocusing mechanism to restore the optical disk 25 to the focus.

FIG. 2 is a schematic view of another conventional defocus detection system disclosed in Japanese Patent Laying open Gazette 58-60433 (1983).

In this prior art system (hereinafter referred to as the "second prior art system"), flux of light from a light source 31 travels through a beam splitter 32 and a lens 33 to form a spot on an optical disk 34. Flux reflecting from the spot travels through the lens 33 and reflects upon the beam splitter 32 towards an edge of a flat mirror 35. The flat mirror 35 is inclined at an angle of 45 degrees from the optical axis of the reflecting flux with the edge located at the convergent point of the light from the beam splitter 32. The reflecting light is diffracted at and radiated from the edge of the flat mirror 35.

Photo-sensors $D_5$ and $D_6$ receive a first set of equal amounts of light from the reflecting flux and photo-sensors $D_7$ and $D_8$ receive a second set of equal amounts of light when the optical disk 34 is on the focus. If the optical disk 34 is displaced off lens 33 from the focus, the sensors $D_5$ and $D_8$ receive decreased amounts of light. Signals thus generated are outputted to indicate that the optical disk 34 is displaced off lens 33 from the focus. Contrarily, if the optical disk 34 is displaced towards the lens 33 from the focus, the sensors $D_6$ and $D_7$ receive decreased amounts of light. Signals thus generated are outputted to indicate that the optical disk 34 is displaced towards lens 33 from the focus.

The first prior art system decides that a sample surface is on the focus when both sensors $D_1$ and $D_2$ receive equal amounts of light. However, if the sample surface has a high contrast reflectance which varies from place to place, as is the case with black and white stripe patterns, inequal amount of light may be incident on the sensors $D_1$ and $D_2$ even if the sample surface is on the focus. Therefore, there is a danger of concluding that the sample surface is not on the focus contrary to the fact.

The second prior art system decides that a sample surface is on the focus by comparing the amount of light received by the sensors $D_5$ and $D_6$ or $D_7$ and $D_8$ with each other. Again, there is a danger for a sample with a high contrast surface of misdetecting the focal state.

Both prior art systems also share the danger of mistake with transparent samples. Suppose a sample is a substrate made of a transparent material like glass. Then, undersired reflection from the back side of the sample (hereinafter referred to as back side reflection 11) may confuse sensors employed by the prior art systems and lead them to erroneous decisions. In other words, even if the front side of the sample is on the focus and reflection therefrom gives equal amounts of their light to each portion of respective sensors, the back side is off the focus and back side reflection is asymmetrically received by the sensors. Total amount of light received by each sensor concerned can not be equal. As long as comparison of the amount of light between two sensors provides the basis of decision, it is difficult to determine that the front surface of the sample is on the focus.

Other than these prior arts, which are referred to as "knife-edge methods", various other methods are known in the art. "Phase methods", which are disclosed in Japanese Patent Laying Open Gazettes 48-60645 (1973) and 60-37509 (1985), have a disadvantage in that it is difficult to defect objects having periodic patterns. In "contrast methods", which are disclosed in Japanese Patent Laying Open Gazette 59-232306 (1984), for example, astigmatism methods" which are disclosed in Japanese Patent Open Laying Gazette 50-99561 (1975), for example, "active methods" which are disclosed in Japanese Patent Open Gazette 58-217909 (1983) for example, and other methods, their are similar disadvantage.

SUMMARY OF THE INVENTION

The present invention is directed to a system for detecting a displacement of a sample surface from a predetermined reference position. According to the present invention, the system comprises: (a) a light source to project light towards the sample surface; (b) an objective lens located between the light source and the sample surface, wherein the light is projected onto the sample surface through the objective lens and is reflected upon the sample surface to thereby obtain a reflecting light travelling through the objective lens; (c) a light blocking member located between the light source and the objective lens, wherein the light blocking member has a first surface that faces the objective lens, and an edge of the light blocking member is located on a first position which is conjugate with the reference position across the objective lens; and (d) photo-sensor means for detecting an amount of the reflecting light which travels towards the first surface, the displacement being detected as a function of the amount of the reflecting light.

Since the light blocking member is located between the objective lens and the light source with an edge aligned at a conjugate position of the reference position, the reflecting light from the sample surface illuminating the sample side of the light blocking member changes as the sample surface becomes displaced from the reference position.

When a virtual line perpendicular to the optical axis is drawn through the edge, the light blocking member exists on one side of the line (hereinafter, this side is referred to as the "photo-blocked area" and the other as the "photo-transmissible area)". The only flux from the light source that reaches the sample surface is one that passes through the photo-transmissible area. When the sample surface stays on the reference position, the surface and the virtual line are conjugate and reflecting light from the surface also passes through the photo-transmissible area. Therefore, as long as the sample surface stays on the reference position, the reflecting light does not illuminate the sample side of the light blocking member.

When the sample surface is displaced from the reference position, light from the light source passes through the photo-transmissible area and reflects from the surface, too. This time, however, the reflecting light diffuses broader and part thereof travels toward the photo-blocked area and reaches the sample side of the light blocking member since the sample surface is not conjugate with the virtual line.

The amount of light received by the sample side of the photo-blocking member is minimized when the sample surface is on the reference position. It increases as the sample surface becomes displaced and the conjugate relation between the surface and the edge becomes impaired.

Accordingly, signals can be obtained corresponding to displacements of the sample surface from the reference position using an optical sensor to detect the amount of light upon the sample side of the light blocking member. Unlike the prior art system where comparison of the amounts of light upon two sensors is taken as basis of decision, the present invention employs the amount of light itself detected by an optical sensor and, therefore, can avoid the danger of making mistakes in detecting displacement of samples with high contrast.

In an aspect of the present invention, the system has two subsystems each having a light blocking member. First and second fixed positions are defined across the reference position, and respective edges of the light blocking members in the two subsystems are located at positions which are conjugate with the first and second fixed positions. First and second light sources are provided in the first and second subsystems, respectively. First and second lights which are emitted from the first and second light sources are projected onto and reflected upon the sample surface.

The reflected first and second lights are split from each other through a beam splitter and are received by first and second photo-sensors after being reflected by respective light blocking members. The respective detection signals which are obtained by the first and second photo-sensors are jointly used for detecting the displacement.

In another aspect of the present invention, one or more elements in the device are vibrated in a direction parallel to the optical axis of the objective lens. The output of a photo-sensor is an AC signal and the frequency thereof varies depending upon whether the sample surface is at the reference position or not.

Accordingly, an object of the present invention is to provide a system to detect displacement of sample surfaces from a reference position which is not affected by contrast on the sample surfaces, and is valid even when the surfaces belong to transparent substrates.

These and other objects, features, aspects and advantages of the present invention will become more apparent from the following detailed description of the present invention when taken in conjunction with the accompanying drawings.

BRIEF DESCRIPTION OF DRAWINGS

FIG. 8 illustrates rays coming from a light source in the second embodiment;

FIG. 9 shows details of the edge of a louver illustrating rays coming from the light source, in the second embodiment;

FIG. 10 illustrates rays illuminating the sample surface when it is on the focus, in the second embodiment;

FIG. 11 illustrates rays illuminating the sample surface when it is behind the focus, in the second embodiment;

FIG. 12 illustrates rays illuminating the sample surface when it is before the focus in the second embodiment;

FIG. 16 illustrates rays coming from the light source, in a third preferred embodiment;

FIG. 17 shows details of the edge of the louver illustrating rays coming from the light sources, in the third embodiment;

FIG. 18 illustrates rays illuminating the sample surface when it is on the focus, in the third embodiment;

FIG. 19 illustrates rays illuminating the sample surface when it is behind the focus, in the third embodiment;

FIG. 20 illustrates rays illuminating the sample surface when it is before the focus, in the third embodiment;

FIG. 21 illustrates rays coming from the light sources, in a fourth preferred embodiment;

FIG. 22 shows details of the edge of the louver illustrating rays coming from the light source, in the fourth embodiment;

FIG. 27 is a schematic diagram showing another preferred embodiment which installs a half mirror between the stage lens and the louver and aligns a photo-sensor in a position conjugate with the sample side of the louver;

FIG. 28 is a schematic diagram of a configuration showing another embodiment in which a photo-sensor is fixed on the louver;

FIG. 29 is a schematic diagram of a configuration showing another preferred embodiment in which a photo-sensor also serves as a louver;

FIG. 42 is a schematic configuration diagram of a ninth preferred embodiment;

FIG. 43 is a schematic configuration diagram of a tenth preferred embodiment;

FIG. 50 is a schematic perspective view drawing of a fourteenth preferred embodiment;

FIG. 51 is a schematic side view of the fourteenth embodiment;

FIG. 52 is a schematic configuration diagram of a fifteenth preferred embodiment.

DESCRIPTION OF PREFERRED EMBODIMENTS

§1. First Embodiment

Figure 1:
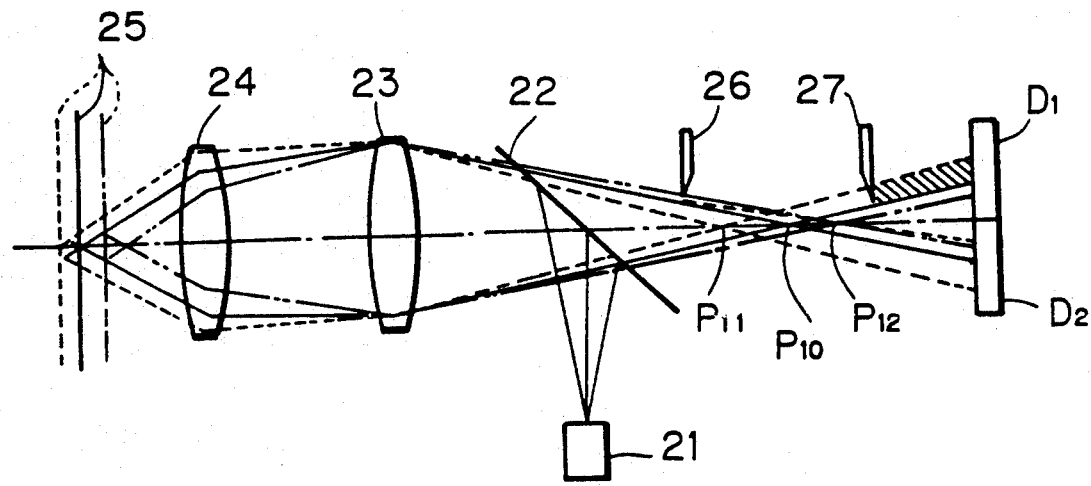
FIG. 1 is a schematic diagram depicting a first prior art system.
Figure 2:
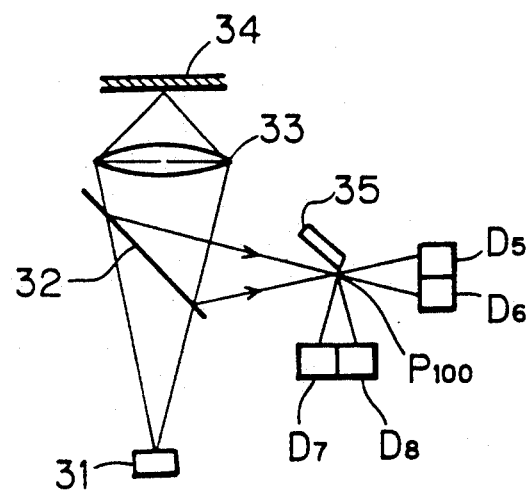
FIG. 2 is a schematic diagram depicting a second prior art system.
Figure 3:
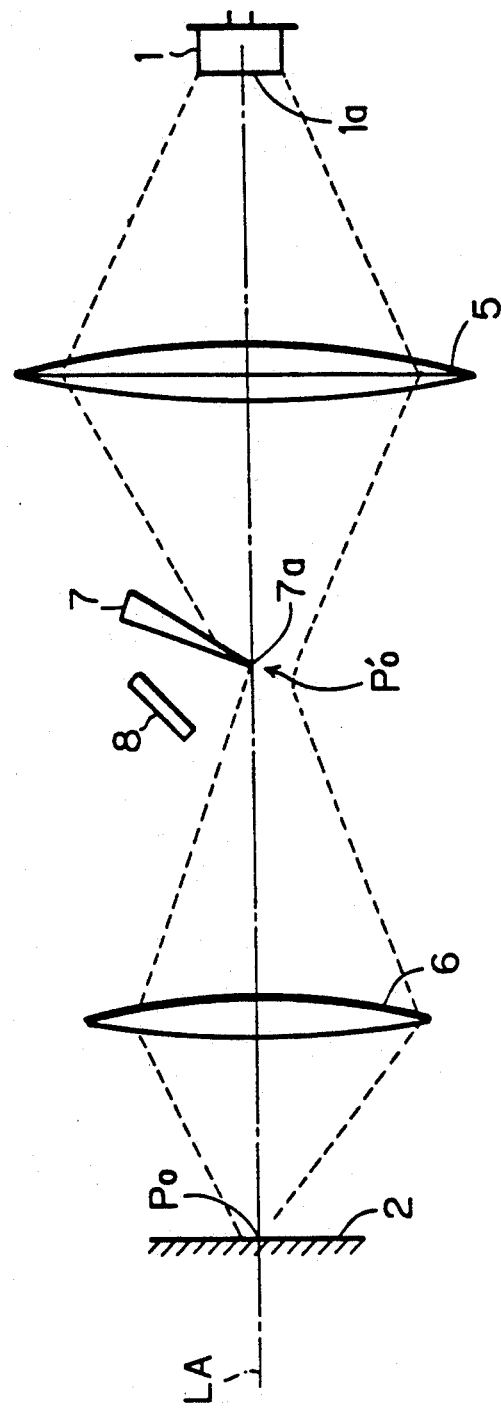
FIG. 3 is a schematic diagram of the configuration of a first preferred embodiment of the present invention.

FIG. 3 is a schematic diagram depicting the configuration of a displacement detection system in accordance with a first preferred embodiment of the present invention. In FIG. 3, the envelope illustrated by broken lines represents flux from a light source 1 illuminating a sample surface 2.

The light source 1 may be a laser, an LED, a tungsten lamp, a disharge tube, or the like. It should be noted in the drawings that the photo-emitting plane 1a of the light source 1 is illustrated larger than it actually is. The sample surface 2 is a surface of an object whose displacement is to be detected. The object may be a semiconductor wafer, an optical disk, etc. A converging lens or an imaging lens 5 is positioned between the light source 1 and an objective lens 6 and converges light from the light source 1. The objective lens 6 is aligned between the sample surface 2 and the light source 1, and the light from the light source 1 illuminates the sample surface 2 through the objective lens 6. The objective lens 6 also works as a component of an optical system to form an image on a means of observation (not shown) such as various types of image detectors or eyes of observers. When the image of the sample surface 2 is formed on the means of observation via the objective lens 6, the sample surface 2 is said to be on the focus. In the first preferred embodiment, a reference position $P_0$ is defined on the position of the sample surface 2 which is on the focus for the means of observation, the position being called the "on-focus position". The objective lens 6 comprises, together with the converging lens 5, an optical path to direct the light from the light source 1 to the sample surface 2.

A photo-blocking plate or a louver 7 is provided between the lenses 5 and 6, with a knife edge 7a of the louver 7 being located at a point $P_0'$ which is conjugate with the reference position $P_0$ across the objective lens 6. The louver 7 has a photo-reflective surface on the side of the sample surface 2. The photo-reflective surface may be either a regular or specular reflective surface or a diffuse reflective surface. This surface of the louver 7 will be called as the "sample side surface" or the "sample side of the louver 7". The edge 7a is on an optical axis LA which is a common optical axis of the lens 5, 6 and the light source 1.

A photo-sensor 8 facing the sample side of the louver 7 detects the amount of the light reflecting from the sample surface 2 displaced from the focus. It is only required for the sensor 8 to be able to detect the amount of the light. Devices such as photodiodes and PSDs can meet the requirement, and use of CCDs are also allowed.

Figure 4:
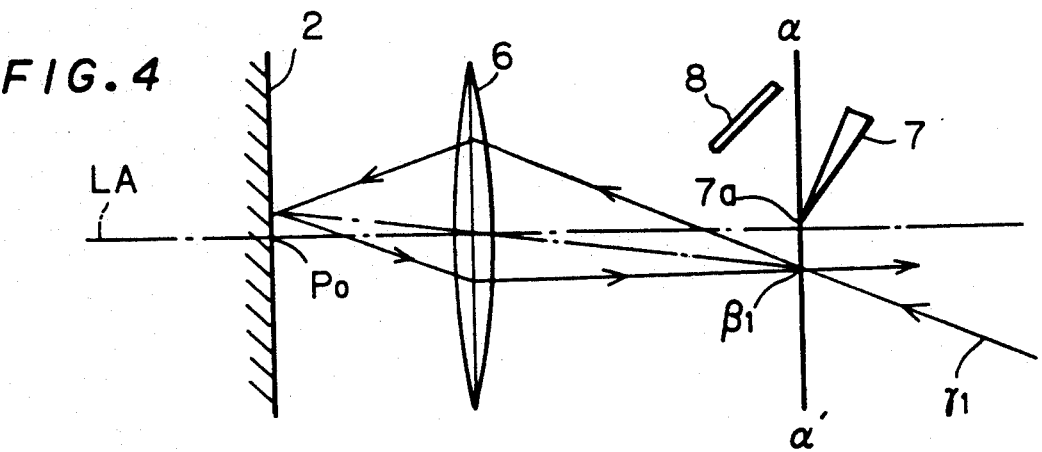
FIG. 4 illustrates rays reflecting from a sample surface when it is on a focus, in the first embodiment.
Figure 5:
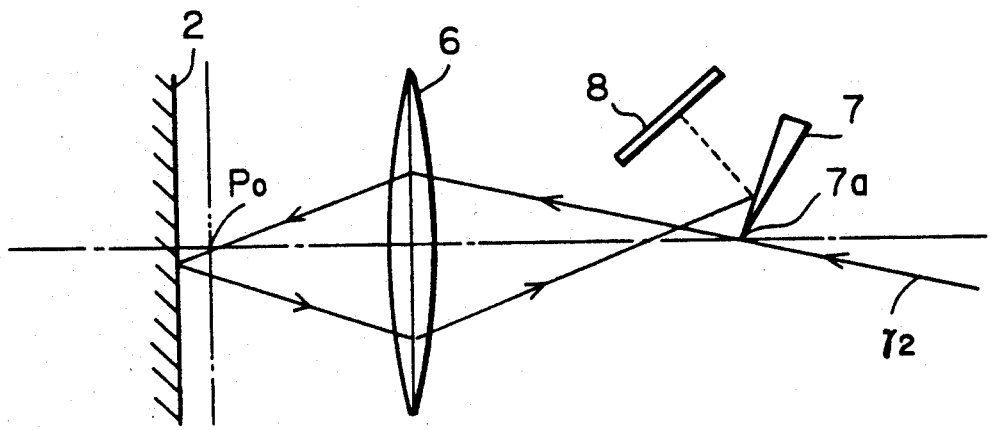
FIG. 5 illustrates rays reflecting from a sample surface when it is behind the focus, in the first embodiment.
Figure 6:
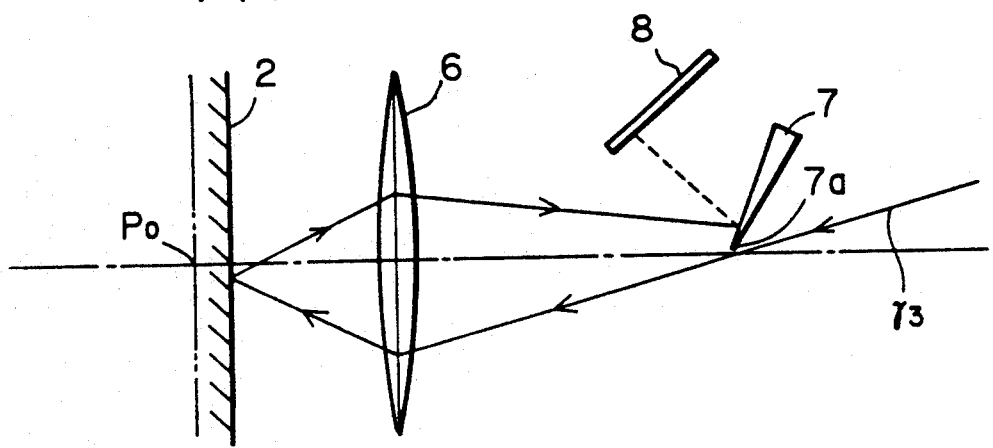
FIG. 6 illustrates rays reflecting from a sample surface when it is before the focus, in the first embodiment.

FIGS. 4 through 6 depict the operation of the defocus detection system in accordance with the first preferred embodiment and show specific rays emitted from the light source 1 and reflected by the sample surface 2 indifferent situations. Specifically the surface 2 is on the focus in FIG. 4, displaced from the focus in a direction away from the louver 7 in FIG. 5 (hereinafter referred to as being "behind the focus)", and displaced from the focus in a direction towards the louver 7 in FIG. 6 (hereinafter referred to as being before the focus). In these FIGS. 5 and 6, two-dot chain lines drawn parallel to sample surfaces 2 show the on-focus position.

FIG. 4 shows the situation where the sample surface 2 is on the focus, that is, when the sample surface 2 and the edge 7a of louver 7 are on the conjugate positions. A line $\alpha$-$\alpha'$ is drawn through the edge 7a perpendicularly to the optical axis LA. The sample side surface of the louver 7 is inclined from the line $\alpha$-$\alpha'$. A ray which passes through an arbitrary point $\beta_1$ on the line $\alpha$-$\alpha'$ reflects from the sample surface 2 and travels through the point $\beta_1$ again, as is illustrated by the solid line $\gamma_1$. If the ray reflecting from the sample surface 2 is to illuminate the sample side of the louver 7, this ray must have crossed line $\alpha$-$7a$ after it has been emitted from the light source 1 and travelled through the converging lens 5. Obviously, however, such a ray does not exist since the optical path thereof is blocked by the louver 7. In other words, as long as the sample surface 2 and the edge 7a of the louver 7 are on the conjugate positions, no rays emitted from the light source 1 and then reflected from the sample surface 2 illuminate the sample side of the louver 7.

FIGS. 5 and 6 show the situation where the sample surface 2 and the edge 7a of are not on the conjugate positions. Rays $\gamma_2$ and $\gamma_3$ from the light source 1 pass by the edge 7a of the louver 7 and then reflect from the sample surface 2 to reach the sample side of the louver 7. In other words, when the surface 2 and the edge 7a of the louver 7 are not on the conjugate positions, some rays emitted from the light source 1 and then reflected from the sample surface 2 always illuminate the sample side of the louver 7.

The amount of light received by the sample side of the louver 7 is minimized when the sample surface 2 and the edge 7a of the louver 7 are on the conjugate positions. The received amount of light increases as the sample surface 2 becomes displaced and the conjugate relation between the surface and the edge becomes impaired.

Figure 7:
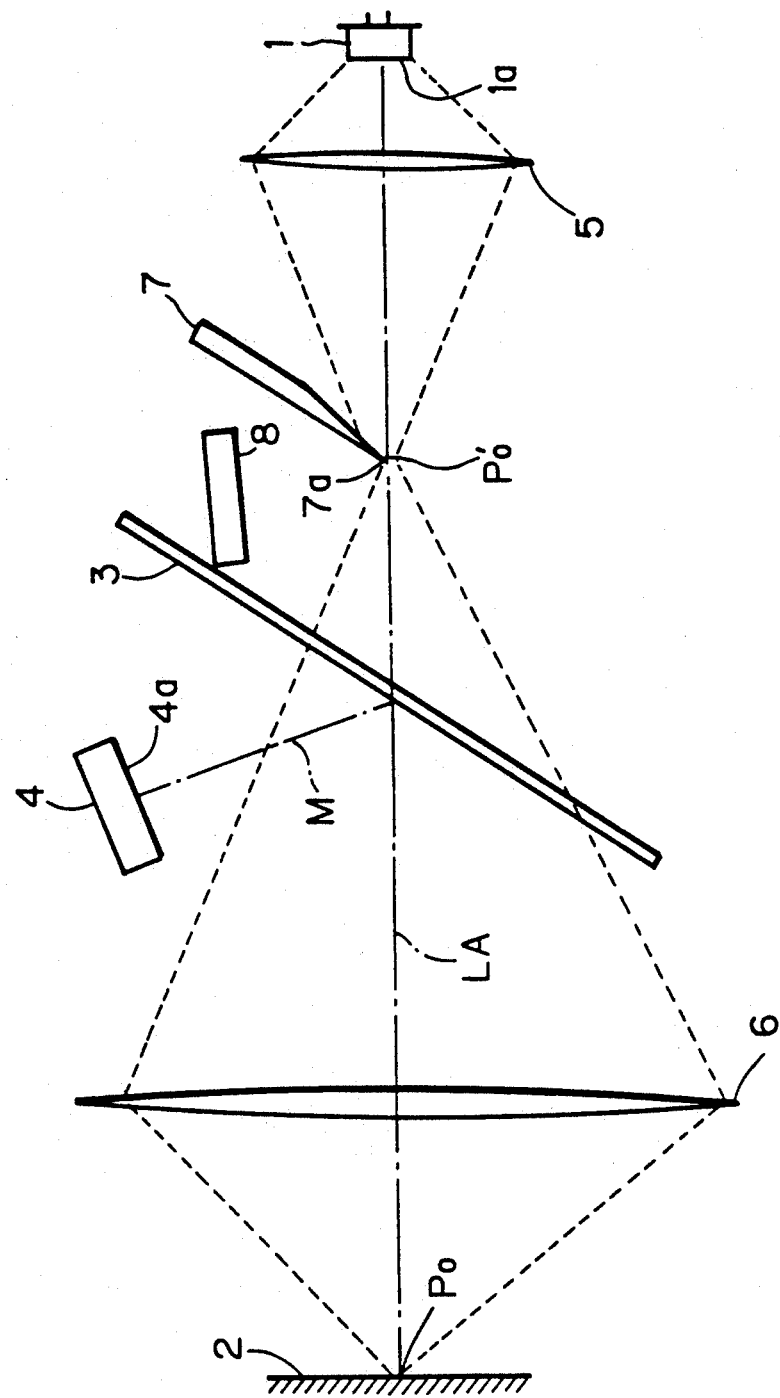
FIG. 7 is a schematic diagram of the configuration of a second preferred embodiment.

Accordingly, signals can be obtained corresponding to displacements of the sample surface 2 from the on-focus position using the photosensor 8 to detect the amount of the light reflecting or diffusing from the sample side of the louver 7. §2. Second Embodiment FIG. 7 is a schematic diagram depicting the configuration of a displacement detection system in accordance with a second preferred embodiment of the present invention, which is more specific than the first preferred embodiment. Same or corresponding elements in respective drawings are provided with the same reference numerals, and the definitions thereof are not repeated in the following description.

In FIG. 7, the envelope illustrated by broken lines represents flux from a light source 1 illumminating a sample surface 2. A half mirror 3, together with an objective lens 6, comprises an optical system for observation of the sample surface 2. Through this optical system, an image of the sample surface 2 is formed upon the observation plane 4a of an image detector 4 which works as a means of observation. Preferably, the observation plane 4a is perpendicular to an axis M of the reflecting light from the half mirror 3. It must be noted, however, that the half mirror 3 and the image detector 4 are not components of the displacement detection system in accordance with the present invention. Configuration of actual displacement detection systems in accordance with the second preferred embodiment, therefore, is not limited to the configuration illustrated in FIG. 7.

A converging lens 5 is so aligned that an image of the photo-emitting plane 1a of a light source 1 is formed at a point $P_0'$ which is the conjugate position of the sample surface 2 across the objective lens 6. In other words, the converging lens 5 and the light source 1 are so aligned that when the sample surface 2 is on the focus the photo-emitting plane 1a is in the conjugate positions.

FIGS. 8 through 12 depict the operation of the defocus detection system in accordance with the second preferred embodiment. Hereinafter, words to express spatial relations such as high and low, above and below, up and down, top and bottom, etc. are used relative to the drawings.

FIG. 8 shows optical paths of rays emitted from the light source 1. In FIGS. 8 through 12, broken lines $L_{11}$ and $L_{12}$ represent rays coming from the top end of the photo-emitting plane 1a of the light source 1; two-dot chain lines $L_{13}$ and $L_{14}$ represent those from bottom end thereof; and solid lines $L_{15}$ and $L_{16}$ represent those passing the vicinity of an edge 7a of a louver 7.

FIG. 9 shows details of optical paths about the edge 7a of the louver 7. A dashed line LA represents the optical axis. A broken line $L_{17}$ drawn perpendicular to the optical axis LA represents an image $I_1$, or part thereof, of the photo-emitting plane 1a of the light source 1 which is formed by the converging lens 5. A solid line $L_{18}$ adjoining $L_{17}$ represents the rest of the image $I_1$ which is not actually formed because the light corresponding thereto is blocked by the louver 7. Therefore, the combination of the broken line $L_{17}$ and the solid line $L_{18}$ represents the entire image $I_1$ which would be formed if the louver 7 were removed.

FIGS. 10 through 12 show details of optical paths about the sample surface 2 relative to rays $L_{11}$, $L_{12}$, $L_{15}$ and $L_{16}$, where the sample surface 2 is: on the focus in FIG. 10, behind the focus in FIG. 11, and before the focus in FIG. 12. FIG. 10 shows the situation where the sample surface 2 is on the focus, that is, when the sample surface 2 and the edge 7a of the louver 7 are on the conjugate positions. Rays coming from the photo-emitting plane 1a of the light source 1 form the image $I_1$, or part thereof, of the photo-emitting plane 1a. As shown in FIGS. 9 and 10 with solid lines $L_{15}$ and $L_{16}$, rays passing through the vicinity of the edge 7a of the louver 7 form an image in the vicinity of the point $P_0$ on the sample surface 2 which is conjugate with the edge 7a. Rays passing below the edge 7a of the louver 7 form an image at an area above the point $P_0$, as represented by broken lines $L_{11}$ and $L_{12}$ in FIGS. 9 and 10. The area below the point $P_0$ on the sample surface 2 is conjugate with the area above the edge 7a of the louver 7. Consequently, the area below the point $P_0$ remains dark since rays which might have come through the conjugate region are blocked by the louver 7.

In other words, the sample surface 2 is divided into two parts when it is on the focus with a boundary at the point $P_0$. One part above the point $P_0$ is bright and the other below the point $P_0$ is dark as it stays in the shadow of the louver 7.

To summarize, when the sample surface 2 is on the focus, rays reflect only upon that part of the surface 2 above the point $P_0$, which is conjugate with the edge 7a of the louver 7. An arbitrary point $A_1$ is defined in the area above the point $P_0$.

Figure 13:
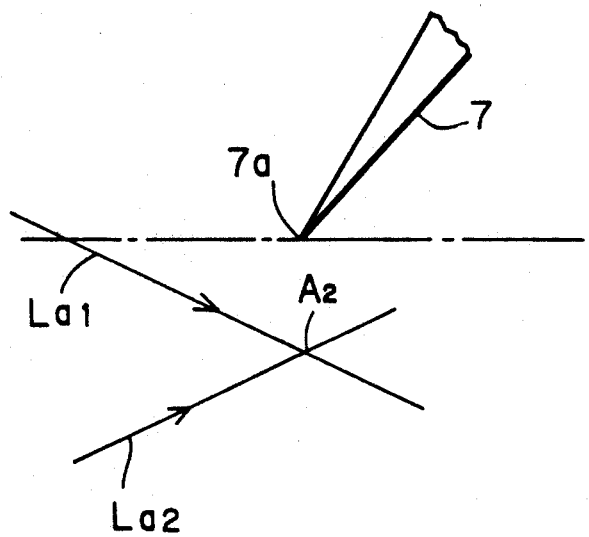
FIG. 13 shows details of the edge of the louver illustrating rays reflecting from the sample surface when it is on the focus, in the second embodiment.

FIGS. 13 is an optical diagram showing the reflecting light from the point $A_1$ on the sample surface 2 with solid lines $L_{a1}$ and $L_{a2}$ at the neighborhood of the edge 7a of the louver 7. In FIG. 13, the rays represented by the solid lines $L_{a1}$ and $L_{a2}$ pass through a position $A_2$ below the edge 7a which is conjugate with the point $A_1$.

FIG. 11 shows the situation where the sample surface 2 is behind the focus, that is, when the sample surface 2 and the edge 7a of the louver 7 are not on the conjugate positions. As shown in FIGS. 9 and 11 with solid lines $L_{15}$ and $L_{16}$ light passing by the edge 7a of the louver 7 forms an image in the vicinity of the point $P_0$ before the sample surface 2 and then diffuses as it approaches to the sample surface 2. The diffused light illuminates the surface 2 with reduced intensity. It gives a dim area between the bright and the dark areas on the sample surface 2 when the surface 2 is behind the focus.

A virtual line parallel to optical axis LA is drawn through the point $P_0$ which is conjugate with the edge 7a of the louver 7. The virtual line, which happens to coincide with the axis LA in FIG. 11, meets the sample surface 2 at a point $S_1$. If the edges 7a of the louver 7 is aligned off the optical axis LA, the virtual line deviates in parallel from the axis LA. Given an arbitrary point $B_1$ in an areas towards the dark side of the dim area, the point $B_1$ always stays below the point $S_1$.

Figure 14:
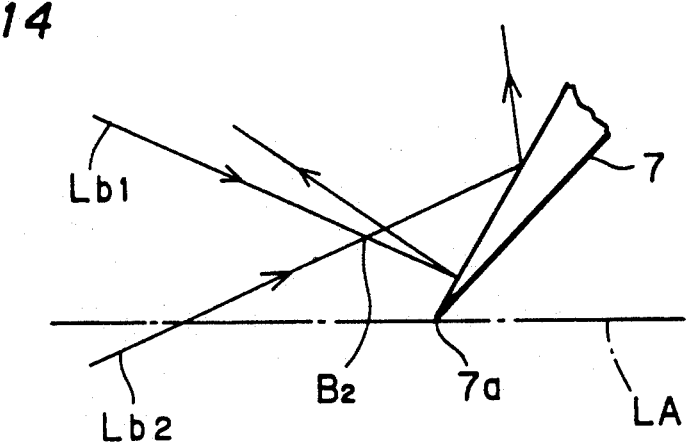
FIG. 14 shows details of the edge of the louver illustrating rays reflecting from the sample surface when it is behind the focus, in the second embodiment.

FIG. 14 is an optical diagram showing the reflecting light from the point $B_1$ with solid lines $L_{b1}$ and $L_{b2}$ at the vicinity of the edge 7a of the louver 7. The point which is conjugate with the point $B_1$ is represented as a point $B_2$, and is closer to the sample surface 2 than the edge 7a of the louver 7 is in the direction of the optical axis LA and higher than the edge 7a is in the direction perpendicular to the optical axis LA. Consequently, specific rays reflecting from the point $B_1$ represented by solid lines $Lb_1$ and $Lb_2$ in FIG. pass through the conjugate point $B_2$ about the edge 7a of the louver 7. 14.

To summarize, when the sample surface 2 is behind the focus, some rays reflecting from the sample surface 2 always illuminate the sample side of the louver 7.

FIG. 12 shows the situation where the sample surface 2 is before the focus, that is, when the sample surface 2 and the edge 7a of the louver 7 are not on the conjugate positions. Light passing by the edge 7a of the louver 7 reaches the sample surface 2 before it forms an image at the point $P_0$, that is, before it is fully focused. It also gives a dim area between a bright and a dark areas on the sample surface 2. In FIGS. 9 and 12, such rays of the light are represented by solid lines $L_{15}$ and $L_{16}$. The virtual line meets the sample surface 2 at a point $S_2$. Given an arbitrary point $B_3$ in an area towards the dark side of the dim area, point $B_3$ always stays below the point $S_2$.

Figure 15:
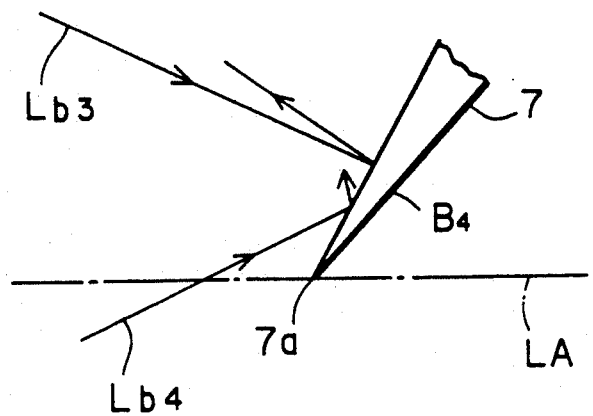
FIG. 15 shows details of the edge of the louver illustrating rays reflecting from the sample surface when it is before the focus, in the second embodiment.

FIG. 15 is an optical diagram showing the reflecting light from the point $B_3$ with solid lines $L_{b3}$ and $L_{b4}$ at the vicinity of the edge 7a of the louver 7. The point which is conjugate with the point $B_3$ is represented as a point $B_4$, and is closer to the light source 1 than the edge 7a of the louver 7 is in the direction of the optical axis LA and higher than the edge 7a is in the direction perpendicular to said axis LA. Consequently, specific rays reflecting from the point $B_3$ represented by solid lines $Lb_3$ and $Lb_4$ in FIG. 15, reach the sample side of the louver 7 before they reach the conjugate $B_4$.

To summarize, when the sample surface 2 is before the focus, some rays reflecting from the sample surface 2 always illuminate the sample side of the louver 7, too.

Hence, it is concluded that the amount of light travelling toward the sample side of the louver 7 and received thereby is less when the sample surface 2 is on the focus than when it is off the focus.

§3. Third Embodiment

FIG. 16 is a schematic diagram depicting the configuration of a displacement detection system in accordance with a third preferred embodiment of the present invention, which has different alignment of a converging lens 5 compared with the foregoing second preferred embodiment. In the second preferred embodiment, the converging lens 5 is aligned so that the image $I_1$ of the photo-emitting plane $1a$ of the light source 1 is formed at a first position, the point $P_0$, which is the conjugate position of the sample surface 2 when the surface 2 is on the focus. In this third preferred embodiment, however, it is aligned so that an image $I_2$ of the photo-emitting plane $1a$ of the light source 1 is formed at a second position which is closer to the sample surface 2 than the point $P_0$.

FIGS. 16 through 20 depict the operation of a defocus detection system in accordance with the third preferred embodiment. FIG. 16 shows optical paths of rays emitted from the light source 1. In FIGS. 16 through 20, broken lines $L_{21}$ and $L_{22}$ as well as a solid line $L_{25}$ represent rays coming from the top end of the photo-emitting plane $1a$ of the light source 1; two-dot chain lines $L_{23}$ and $L_{24}$ as well as a solid line $L_{26}$ represent those from the bottom end thereof; and solid lines $L_{25}$ and $L_{26}$ represent those passing the vicinity of the edge $7a$ of the louver 7.

FIG. 17 shows details of optical paths in the vicinity of the edge $7a$ of the louver 7. A dashed line in FIG. 17 represents the optical axis LA. A broken line $L_{27}$ drawn perpendicular to the optical axis LA represents an image $I_2$ of the photo-emitting plane $1a$ of the light source 1 which is formed by the converging lens 5. Unlike the case of the second preferred embodiment, the image $I_2$ is not impaired since it is not formed at the position of the edge $7a$ of the louver 7.

FIGS. 18 through 20 show details of optical paths in the vicinity of the sample surface 2 relative to rays $L_{22}$, $L_{24}$, $L_{25}$ and $L_{26}$, where the sample surface 2 is: on the focus in FIG. 18, behind the focus in FIG. 19, and before the focus in FIG. 20.

FIG. 17 shows the situation where the sample surface 2 is on the focus. Rays come from the top end of the photo-emitting plane $1a$ of the light source 1, as represented by the lines $L_{21}$, $L_{22}$ and $L_{25}$. Some of them are blocked by the louver 7, as represented by the line $L_{21}$, while others reach the sample surface 2, as represented by the line $L_{22}$ and $L_{25}$. Rays also come from the bottom end of the photo-emitting plane $1a$ of the light source 1, as represented by the lines $L_{23}$, $L_{24}$ and $L_{26}$. Some of them are blocked by the louver 7, as represented by the line $L_{23}$, while others reach the sample surface 2, as represented by the lines $L_{24}$ and $L_{26}$.

Among the rays that reach the sample surface 2, those which have passed by the edge $7a$ of the louver 7, as represented by solid lines $L_{25}$ and $L_{26}$ in FIGS. 17 and 18, form an image in the vicinity of the point $P_0$ on the sample surface 2 which is conjugate with the edge $7a$. The rays which have passed way below the edge $7a$ of the louver 7, as represented by the lines $L_{22}$ and $L_{24}$, arrive in the area higher than the point $P_0$ on the surface 2.

Consequently, the sample surface 2 is divided into two parts when it is on the focus. One part above the point $P_0$, which is conjugate with the edge $7a$ of the louver 7, is bright, while the other below the point $P_0$ is dark as it stays in the shadow of the louver 7. To summarize, when the sample surface 2 is on the focus, rays reflect only upon that part of the surface 2 above the point $P_0$, which is conjugate with the edge $7a$ of the louver 7 and the rays cannot illuminate the sample side of the louver 7 as the same pass through an area below the edge $7a$. Remember, the same discussion applied to FIG. 13 that depicts the foregoing embodiment where reflecting rays are represented by the solid lines $L_{a1}$ and $L_{a2}$ through $A_2$.

FIG. 19 shows the situation where the sample surface 2 is behind the focus. Light passing by the edge $7a$ of the louver 7 forms an image in the vicinity of the point $P_O$ before the sample surface 2. The light then diffuses as it approaches the sample surface 2 and finally illuminates the surface 2 with reduced intensity. It gives a dim area between bright and dark areas on the sample surface 2 when the surface 2 is behind the focus. In FIGS. 17 and 19, such rays of the light are represented by solid lines $L_{25}$ and $L_{26}$. Given an arbitrary point $B_5$ in an area towards the dark side of the dim area then, specific rays reflecting from the point $B_5$ will reach the sample side of louver 7. Remember, the same discussion applied to FIG. 11 where the rays reflect from the point $B_1$ instead of $B_5$.

To summarize, when the sample surface 2 is behind the focus, some rays reflecting from the sample surface 2 always illuminate the sample side of the louver 7.

FIG. 20 shows the situation where the sample surface 2 is before the focus. Light passing by the edge $7a$ of the louver 7 reaches the sample surface 2 before it forms an image in the vicinity of the point $P_O$, that is, before it is fully condensed. It also gives a dim area between a bright and a dark areas on the sample surface 2. In FIGS. 17 and 20, such rays of the light are represented by solid lines $L_{25}$ and $L_{26}$. Given an arbitrary point $B_6$ in an area towards the dark side of the dim area then, specific rays reflecting from the point $B_6$ will reach the sample side of the louver 7. Remember, the same discussion applied to FIG. 12 where the rays reflected from the point $B_3$ instead of $B_6$.

To summarize, when the sample surface 2 is before the focus, some rays reflecting from the sample surface 2 always illuminate the sample side of the louver 7.

Hence, it is concluded that the amount of light received by the sample side of the louver 7 is less when the sample surface 2 is on the focus than when it is off the focus.

§4. Fourth Embodiment

FIG. 21 is a schematic diagram depicting the configuration of a displacement detection system in accordance with a fourth preferred embodiment of the present invention, which has different alignment of a converging lens 5 compared with the foregoing second and third preferred embodiments. In the third preferred embodiment, the converging lens 5 is aligned so that an image $I_2$ of the photo-emitting plane $1a$ of the light source 1 is formed at a position which is closer to the sample surface 2 than the point $P_0'$ which is the conjugate position of the sample surface 2 when the surface 2 is on the focus. In this fourth preferred embodiment, however, it is aligned so that an image $I_3$ of the photo-emitting plane $7a$ of the light source 7 is formed at a position which is closer to the light source 1 than the point $P_0'$.

FIGS. 21 and 22 depict the operation of a defocus detection system in accordance with the fourth preferred embodiment. FIG. 21 shows optical paths of rays emitted from the light source 1. In FIGS. 21 and 22, broken lines $L_{31}$ and $L_{32}$ as well as a solid line $L_{35}$ represent rays coming from the top end of the photo-emitting plane 1a of the light source 1; two-dot chain lines $L_{33}$ and $L_{34}$ as well as a solid line $L_{36}$ represent those from the bottom end thereof; and solid lines $L_{35}$ and $L_{36}$ represent those passing the vicinity of the edge 7a of the louver 7.

FIG. 22 shows details of optical paths about the edge 7a of the louver 7. A dashed line represents the optical axis LA. A broken line $L_{37}$ drawn perpendicular to the optical axis LA represents an image $I_3$ of the photo-emitting plane 1a of the light source 1 which is formed by the converging lens 5. Unlike the case of the second preferred embodiment, the image $I_3$ is not impaired since it is not formed at the position of the edge 7a of the louver 7.

Rays come from the top end of the photo-emitting plane 1a of the light source 1 and pass the lower end of the image $I_3$, as represented by $L_{31}$, $L_{32}$ and $L_{35}$. Some of the rays are blocked by the louver 7, as represented by the line $L_{32}$, while others reach the sample surface 2, as represented by the lines $L_{31}$ and $L_{35}$. Rays also come from the bottom end of the photo-emitting plane 1a of the light source 1 and pass the upper end of the image $I_3$, as represented by the lines $L_{33}$, $L_{34}$ and $L_{36}$. Some of the rays are blocked by the louver 7, as represented by the line $L_{34}$, and others reach the sample surface 2, as represented by the lines $L_{33}$ and $L_{36}$.

Among the rays that reach the sample surface 2, those which have passed by the edge 7a of the louver 7, as represented by the lines $L_{35}$ and $L_{36}$, form an image in the vicinity of the point $P_0$ on the sample surface 2 which is conjugate with the edge 7a, while those which have passed way below the edge 7a of the louver 7, as represented by the lines $L_{31}$ and $L_{33}$, arrive in an area higher than the point $P_0$ on the surface 2.

Consequently, the sample surface 2 is divided into two parts when it is on the focus, as is the cases with foregoing embodiments. One part above the point $P_0$, which is conjugate with the edge 7a of the louver 7, is bright; the other below the point $P_0$ is dark as it stays in the shadow of the louver 7.

To summarize, when the sample surface 2 is on the focus, rays reflect only upon that part of the surface 2 above the point $P_0$, which is conjugate with the edge 7a of the louver 7. The rays cannot illuminate the sample side of the louver 7 as they pass through an area below the edge 7a. Remember, the same discussion applied FIG. 13 that depicts the foregoing embodiment where reflecting rays are represented by solid lines $L_{a1}$ and $L_{a2}$ passing through the point $A_2$.

When the sample surface 2 is behind the focus, light passing by the edge 7a of the louver 7, as represented by the solid lines $L_{35}$ and $6_{36}$, forms an image in the vicinity of the point $P_0$ before the sample surface 2. The light then diffuses as it approaches the sample surface 2 and finally illuminates the surface 2 with reduced intensity. It gives a dim area between a bright and a dark areas on the sample surface 2 when the surface 2 is behind the focus.

Given an arbitrary point in an area towards the dark side of the dim area, then, specific rays reflecting from this point will reach the sample side of the louver 7. Remember, the same discussion applied to FIG. 11 where the rays are reflected from the point $B_1$.

To summarize, when the sample surface 2 is behind the focus, some rays reflecting from the sample surface 2 always illuminate the sample side of the louver 7.

When the sample surface 2 is before the focus, light passing by the edge 7a of the louver 7 reaches the sample surface 2 before it forms an image in the vicinity of the point $P_0$, that is, before it is fully condensed. It also gives a dim area between a bright and a dark areas on the sample surface 2. Given an arbitrary point in an area towards the dark side of the dim area, then specific rays reflecting from this point will reach the sample side of the louver 7. Remember, the same discussion applied to FIG. 12 where the rays are reflected from the point $B_3$.

To summarize, when the sample surface 2 is before the focus, some rays reflecting from the sample surface 2 always illuminate the sample side of the louver 7.

Hence, it is concluded that the amount of light received by the sample side of the louver 7 is less when the sample surface 2 is on the focus than when it is off the focus.

§5. Fifth Embodiment

Figure 23:
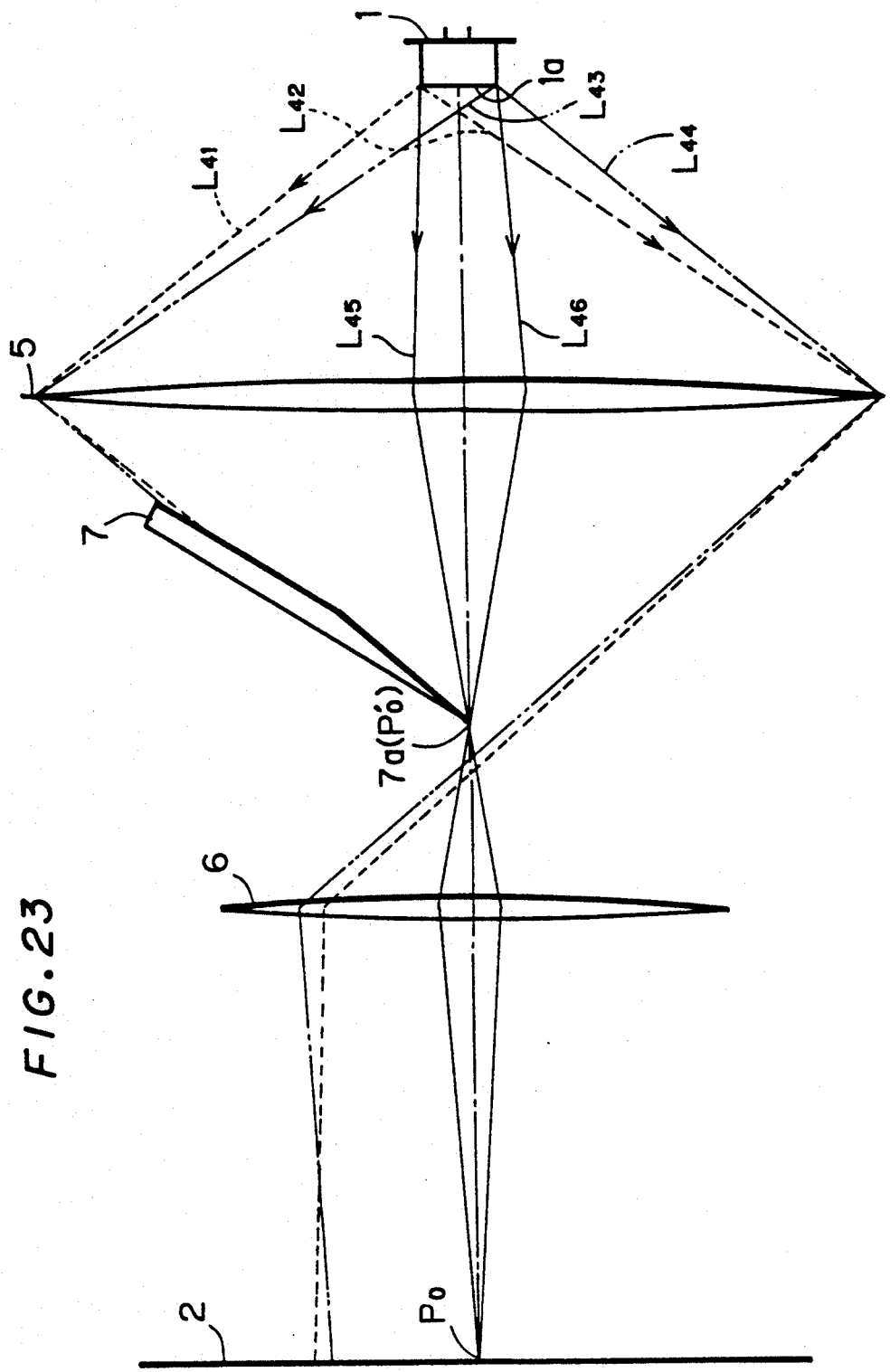
FIG. 23 illustrates rays coming from the light sources, in a fifth preferred embodiment.

FIG. 23 is a schematic diagram depicting the configuration of a displacement detection system in accordance with a fifth preferred embodiment of the present invention, which has different alignment of a converging lens 5 as compared with the foregoing second, third and fourth preferred embodiments.

In this fifth preferred embodiment, the converging lens 5 is aligned so that an image $I_4$ of the photo-emitting plane 1a of the light source 1 is formed at the focal point F (FIG. 24) of the objective lens 6. In other words, the converging lens 5 is aligned so that the focal point F of the objective lens 6 and the photo-emitting plane 1a of the light source 1 are in conjugate positions across the lens 5 and, as a result, light rays from each point of the light source 1 illuminates the sample surface 2 in the form of parallel beams.

Figure 24:
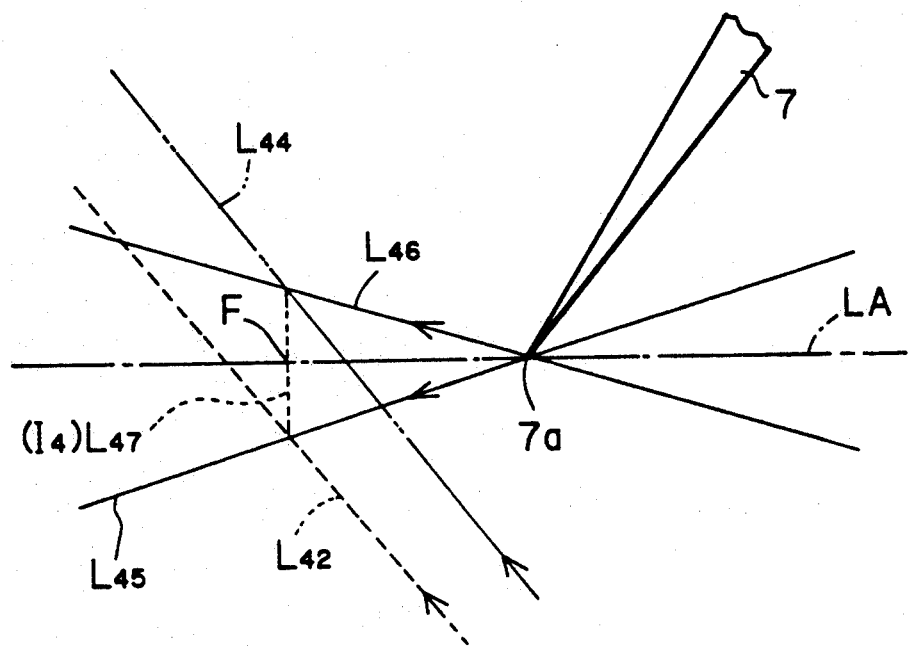
FIG. 24 shows details of the edge of the louver illustrating rays coming from the light sources, in the fifth embodiment.

FIGS. 23 and 24 depict the operation of a defocus detection system in accordance with the fifth preferred embodiment.

FIG. 23 shows optical paths of rays emitted from the light source 1. In FIGS. 23 and 24, broken lines $L_{41}$ and $L_{42}$ as well as a solid line $L_{45}$ represent rays coming from the top end of the photo-emitting plane 1a of the light source 1; two-dot chain lines $L_{43}$ and $L_{44}$ as well as a solid line $L_{46}$ represent those from bottom end thereof; and the solid lines $L_{45}$ and $L_{46}$ represent those passing the vicinity of the edge 7a of the louver 7.

FIG. 24 shows details of optical paths about the edge 7a of the louver 7. The dashed line represents the optical axis LA. A broken line $L_{47}$ drawn perpendicular to the optical axis LA represents an image $I_4$ of the photo-emitting plane 1a of the light source 1 which is formed by the converging lens 5. Unlike the case of the second preferred embodiment, an image $I_4$ is not impaired since it is not formed at the position of the edge 7a of the louver 7.

Rays come from the top end of the photo-emitting plane 1a of the light source 1. Some of the rays are blocked by the louver 7, as represented by the line $L_{41}$, while others pass the lower end of the image $I_4$ and reach the sample surface 2, as represented by the lines $L_{42}$ and $L_{45}$. Rays also come from bottom end of the photo-emitting plane 1a of the light source 1. Some of the rays are blocked by the louver 7, as represented by the line $L_{43}$, while others pass the upper end of the image $I_4$ and reach the sample surface 2, as represented by the lines $L_{44}$ and $L_{46}$.

Among the rays that reach the sample surface 2, those which have passed by the edge 7a of the louver 7, as represented by the lines $L_{45}$ and $L_{46}$, form an image in the vicinity of the point $P_0$ on the sample surface 2 which is conjugate with the edge 7a. The rays which have passed way below the edge 7a of the the louver 7, as represented by the lines $L_{42}$ and $L_{44}$, arrive in the area higher than the point $P_0$ on the surface 2.

Consequently, when the sample surface 2 is on the focus, the same is divided into two parts with a boundary at the point $P_0$ as is the cases with foregoing embodiments. One part above the position $P_0$, which is conjugate with the edge 7a of the louver 7, is bright, and the other below the position $P_0$ is dark as it stays in the shadow of the louver 7.

To summarize, when the sample surface 2 is on the focus, rays reflect only upon that part of the surface above the position $P_0$, which is conjugate with the edge 7a of the louver 7, and the rays cannot illuminate the sample side of the louver 7 as they pass through an area below the edge 7a. Remember, the same discussion applied to FIG. 13 that depicts the foregoing embodiment where reflecting rays are represented by the solid lines $L_{a1}$ and $L_{a2}$ through the point $A_2$.

When the sample surface 2 is behind the focus, light passing by the edge 7a of the louver 7, as represented by the solid lines $L_{45}$ and $L_{46}$, forms an image in the vicinity of the point $P_0$ before the sample surface 2. The light then diffuses as it approaches the sample surface 2 and finally illuminates the surface 2 with reduced intensity. The light gives a dim area between a bright and a dark areas on the sample surface 2 when the surface 2 is behind the focus. Given an arbitrary point in an area towards the dark side of the dim area, then, specific rays reflecting from this point will reach the sample side of the louver 7.

Remember, the same discussion applied to FIG. 11 where the rays reflect from the point $B_1$.

To summarize, when the sample surface 2 is behind the focus, some rays reflecting from the sample surface 2 always illuminate the sample side of the louver 7.

When the sample surface 2 is before the focus, light passing by the edge 7a of the louver 7 reaches the sample surface 2 before it forms an image in the vicinity of the point $P_0$, that is, before it is fully condensed. It also gives a dim area between a bright and a dark areas on the sample surface 2. Given an arbitrary point in an area towards the dark side of the dim area, then, specific rays reflecting from this point will reach the sample side of the louver 7. Remember, the same discussion applied to FIG. 12 where the rays are reflected from the point $B_3$.

To summarize, when the sample surface 2 is before the focus, some rays reflecting from the sample surface 2 always illuminate the sample side of the louver 7, too.

Hence, it is concluded that the amount of light received by the sample side of the louver 7 is less when the sample surface 2 is on the focus than when it is off the focus.

§6. Sixth Embodiment

Figure 25:
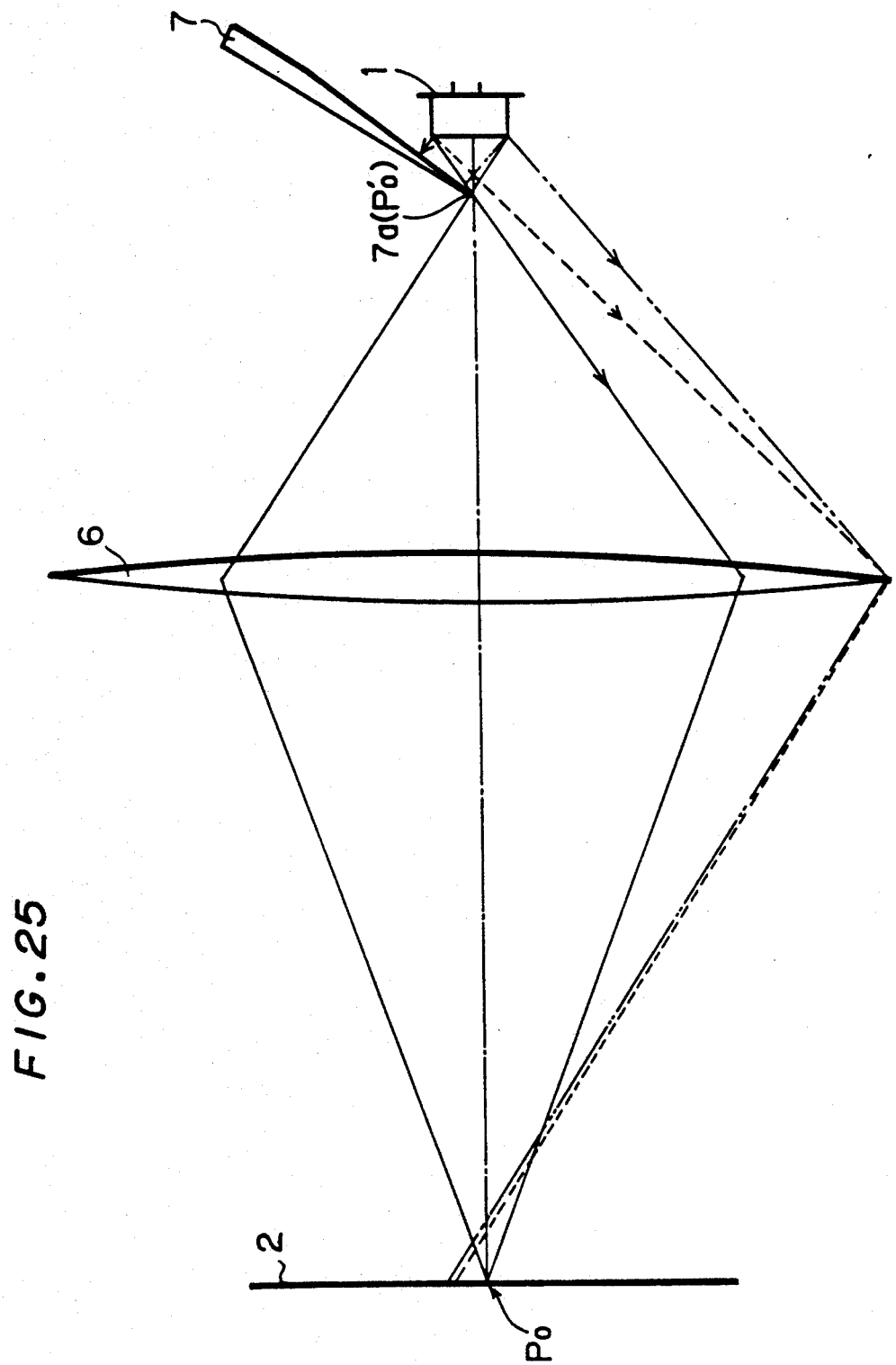
FIG. 25 illustrates rays coming from the light sources, in a sixth preferred embodiment.

FIG. 25 is a schematic diagram depicting the configuration of a displacement detection system in accordance with a sixth preferred embodiment of the present invention, which is different from the foregoing embodiments by the fact that it does not have any converging lenses.

Figure 26:
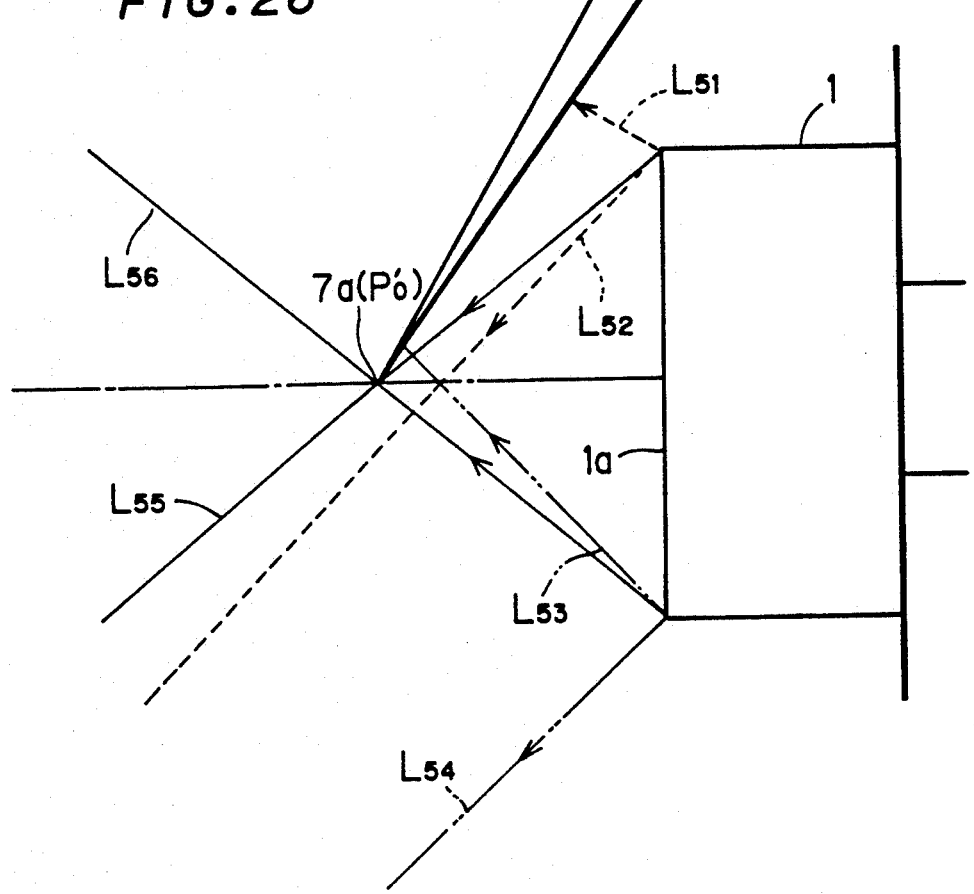
FIG. 26 shows details of the edge of the louver illustrating rays coming from the light sources, in the sixth embodiment.

FIG. 25 shows optical paths of rays emitted from the light source 1, while FIG. 26 shows details about the edge 7a of the louver 7. In FIGS. 25 and 26, broken lines $L_{51}$ and $L_{52}$ as well as a solid line $L_{55}$ represent rays coming from the top end of the photo-emitting plane 1a of the light source 1; two-dot chain lines $L_{53}$ and $L_{54}$ as well as a solid line $L_{56}$ represent those from the bottom end thereof; and solid lines $L_{55}$ and $L_{56}$ represent those passing the vicinity of the edge 7a of the louver 7.

This sixth preferred embodiment is optically equivalent to the foregoing fourth embodiment with a modification that the photo-emitting plane 1a of the light source 1 in this sixth embodiment is located at the position where the image $I_3$ of the photo-emitting plane 1a is formed in the fourth embodiment (FIGS. 21 and 22).

Hence, it is concluded that the amount of light received by the sample side of the louver 7 is less when the sample surface 2 is on the focus than when it is off the focus.

§7. Seventh Embodiment

A seventh preferred embodiment of the present invention is different from foregoing embodiments in that the edge 7a of the louver 7 touches the photo-emitting plane 1a of the light source 1. In order to accomplish such 1a configuration, the photo-emitting plane 1a of the light source 1 and the edge 7a of the louver 7 may be aligned contiguously. Alternatively, the light source 1 may be aligned upon the edge 7a of the louver 7 to allow the edge 7a partly cover the photo-emitting plane 1a.

This seventh embodiment is optically equivalent to the foregoing second embodiment with a modification that the photo-emitting plane 1a of the light source 1 in the seventh embodiment is aligned at the position where the image $I_1$ of the photo-emitting plane is formed in the second embodiment (FIGS. 7 through 15).

Hence, it is concluded that the amount of light received by the sample side of the louver 7 is less when the sample surface 2 is on the focus than when it is off the focus.

§8. Modification in First through Seventh Embodiments (1) Positions relative to the sample surface 2 at which the light source 1 and the converging lens 5 are aligned are not limited to examples set forth herein by the foregoing embodiments. Positions relative to the objective lens 6 at which the light source 1, the converging lens 5 are aligned are not limited to the examples, either. Moreover, the converging lens 5 is optional. What is required is that the edge 7a of the louver 7 falls between the light source 1 and the sample surface 2, and that the light source 1 is aligned so as to allow the louver 7 to block partly the light therefrom.

(2) As shown in FIG. 27, the photo-sensor 8 may be provided at the position conjugate with the sample side of the louver 7 along the light path of flux reflecting from the sample surface 2 and reflected by a half mirror 9 which is installed between the objective lens 6 and the louver 7. Such a configuration is also included in the present invention, since the amount of light travelling toward the sample side of the louver 7 can be equivalently detected by the photo-sensor 8.

(3) The photo-sensor 8 may be fixed upon the edge 7a of the louver 7, as is shown in FIG. 28. It does not matter where and how the photo-sensor 8 is installed as long as it can detect the amount of light reflecting from the sample surface 2 and travelling toward the sample side of the louver 7.

(4) The photo-sensor 8 may also serve as the louver 7. The back side of an arbitrarily shaped photo-sensor 8, for instance in an arc, as is shown in FIG. 29, may be adhered on a transparent plate 15. The back side of the photo-sensor 8 blocks rays coming from the light source 1 while the front side receives those reflecting from the sample surface 2.

Figure 30:
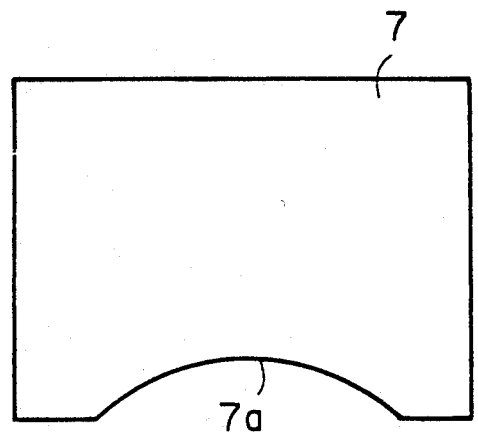
FIG. 30 is a schematic diagram of a configuration showing another preferred embodiment in which the edge of the louver is shaped in an arc.
Figure 31:
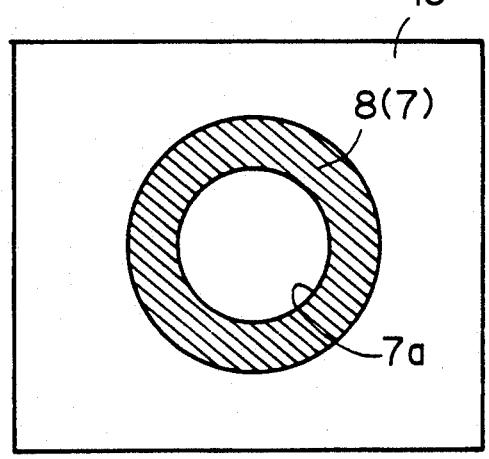
FIG. 31 is a schematic diagram of a configuration showing another preferred embodiment in which a photo-sensor also serves as a louver whose edge is shaped in a ring.

(5) The edge 7a of the louver 7 does not necessarily have to be shaped in a straight line. It may be shaped in a curved line as shown in FIG. 30, a crooked line like saw teeth or a ring as shown in FIG. 31.

With the edge 7a shaped in curved or crooked lines (such an edge is hereinafter referred to as a nonlinear edge), the following advantage can be obtained.

Displacement detection systems in accordance with the present invention detect displacements of the sample surface 2 from a reference point, an on-focus point in case of the foregoing embodiments, taking the conjugate relation between the sample surface 2 and the edge 7a of the louver 7. Therefore, an object upon the sample surface 2 whose displacement is to be detected is linear if the edge 7a of the louver 7 is linear, and the object is nonlinear if the edge 7a is nonlinear. As for a sample surface which has a high contrast pattern, as is the case with photomasks, it is preferred in improvement of signal noise ratio of outputs from the photo-sensor 8 to prevent dark parts of the pattern from occupying the object whose displacement is to be detected, since reflections from dark parts are weak. With the edge 7a of the louver 7 formed in a nonlinear edge, having the object to be detected being fully occupied by a straight dark part of the pattern is avoided.

In order to have the entire length of the nonlinear edge 7a of the louver 7 conjugate with the sample surface 2 located on the reference position, the sample side surface of the louver 7 is made parallel with the sample surface 2. It should be noted, however, when these two surfaces are parallel, optical paths of rays reflecting from the sample side surface of the louver 7 towards the photo-sensor 8 only have shallow inclinations against the optical axis. If the photo-sensor 8 is aligned in a position convenient to receive such rays, there is a possibility that the rays from the light source 1 towards the sample surface 2 is blocked by the photo-sensor 8. Such a possibility can be avoided by making the photo-sensor 8 also serve as the louver 7, as is mentioned above in paragraph (4) of this § 8.

(6) If the edge 7a of the louver 7 is linear, then an object upon the sample surface 2 whose displacement is to be detected is also linear. With a linear edge of the louver 7, it is expected that displacement from the reference position can be detected even if the sample surface 2 is inclined, since displacements are detected along a direction perpendicular to the inclination.

In case of the forementioned prior art systems where displacements from focus is detected through comparing the amounts of lights received by two divided sensors, an object of detection is the whole area illuminated by the light from the light source. Since the object of detection is not a line but a plane in these prior arts, it is difficult to detect displacement of inclined sample surfaces.

(7) Relative to the first to sixth preferred embodiments, in order to align the louver 7 and the photo-sensor 8 so that the photo-sensor 8 can efficiently receive the light reflecting from the sample surface 2, the following configuration may be employed.

Figure 32:
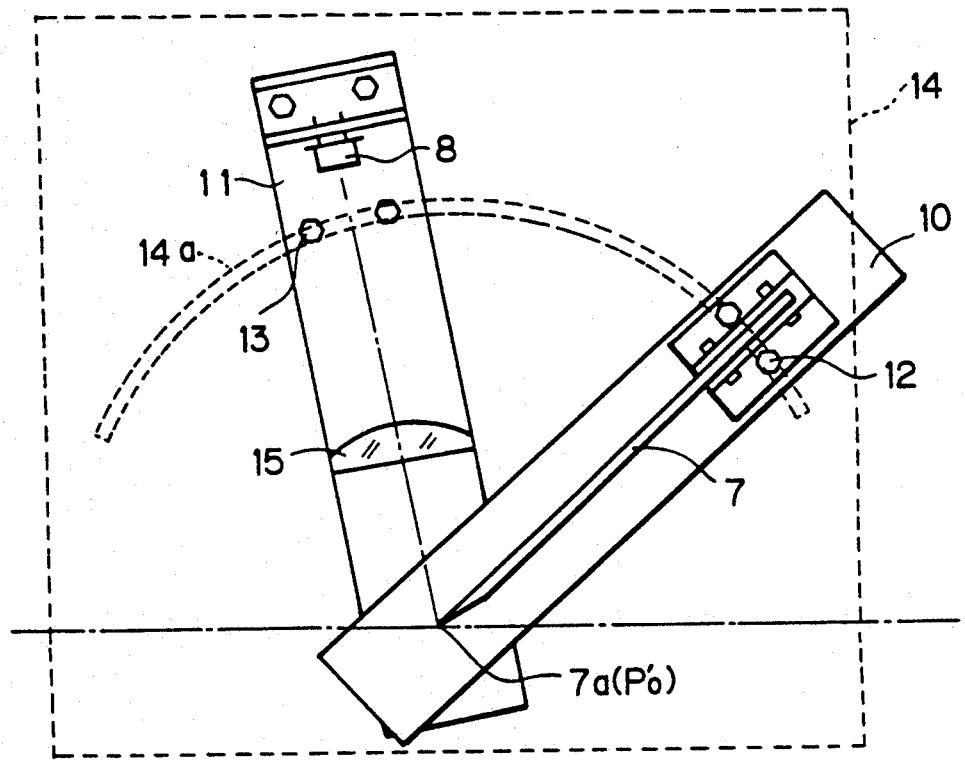
FIG. 32 is a schematic diagram of a sample assembly of the louver and the photo-sensor suitable to the first through to the fifth preferred embodiment.
Figure 33:
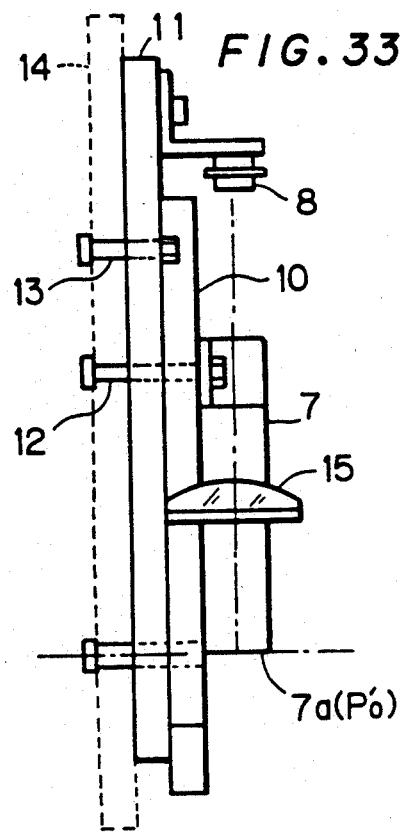
FIG. 33 is a left side view of the assembly shown in FIG. 32.
Figure 34:
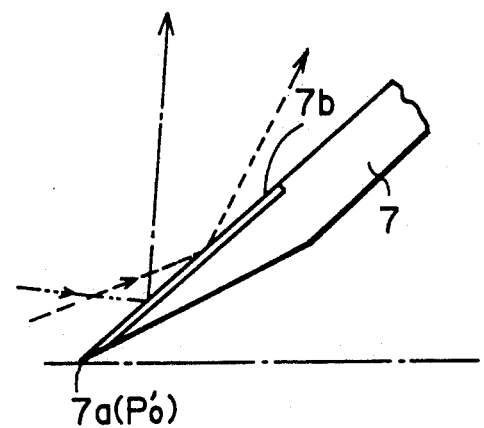
FIG. 34 shows details about a part of FIG. 32.

FIGS. 32 through 34 depict such a configuration, where FIG. 33 is a left side view of the mechanism shown in FIG. 32 and FIG. 34 is an enlarged view of the end portion of the louver 7. In this configuration, the louver 7 is fixed on a first holder means, i.e., the louver support 10, and the photo-sensor 8 is attached to a second holder means, i.e., the sensor support 11. A bolt 12 on the louver support 10 and a bolt 13 on the sensor support 11 are inserted into a guide groove 14a formed in a guide plate 14. The guide groove 14a has a shape of an arc having a center point at the position $P_0'$ which is conjugate with the reference position of the sample surface 2. The bolts 12 and 13 can move along the guide groove 14 around the point $P_0'$ to adjust the positional and angular relation of the louver 7 and the photo-sensor 8.

As shown in FIG. 34, the sample side surface of the louver 7 is finished in a mirror surface 7b in the vicinity of the edge 7a so as to direct light reflecting from the sample surface 2 efficiently to the photo-sensor 8. In FIGS. 32 and 33, a cylindrical lens 15 is attached to the sensor support 11 to receive the light from the mirror surface 7b efficiently. Such a lens 15, however, is optional.

Figure 35:
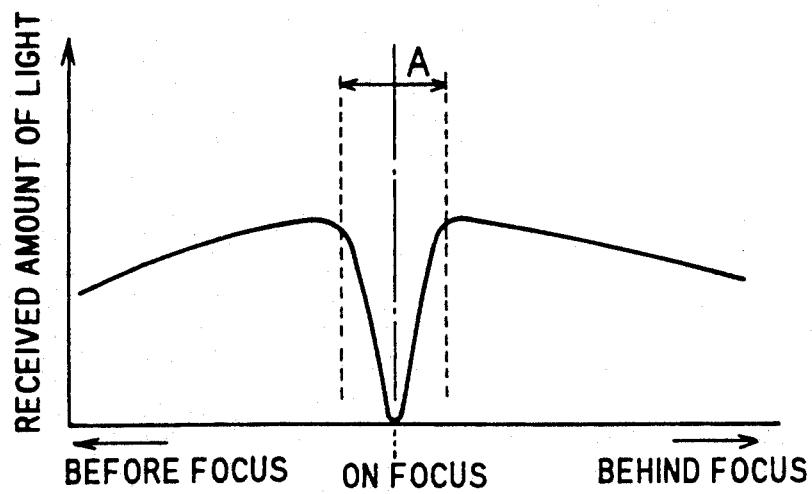
FIG. 35 shows a characteristic curve of the amount of light to be detected by the photo-sensor.

(8) FIG. 35 shows a characteristic curve of the photo-sensor 8 employed in the foregoing embodiments. When the minimum amount of light is received, it can be concluded that the sample surface 2 is on the focus. The area represented by the symbol A is hereinafter called a decision range.

In the foregoing embodiments, an operation to detect that an object is on the focus is initiated by making the sample surface 2 and the objective lens 6 approach relative to each other within the decision range A of the characteristic curve shown in FIG. 35. If this relative approach decreases the amount of light received by the photo-sensor 8, the sample surface 2 is before the focus. The approaching operation is continued and when the amount of light is minimized, the approaching operation is stopped because the surface 2 is on the focus at this moment to thereby complete the autofocusing operation.

If this relative approach increases the amount of light received by the photo-sensor 8, the sample surface 2 is behind the focus. The relative movement is reversed and the amount of light starts decreasing. When the amount of light is minimized, the relative movement is stopped because the surface 2 is on the focus at this moment.

Figure 36:
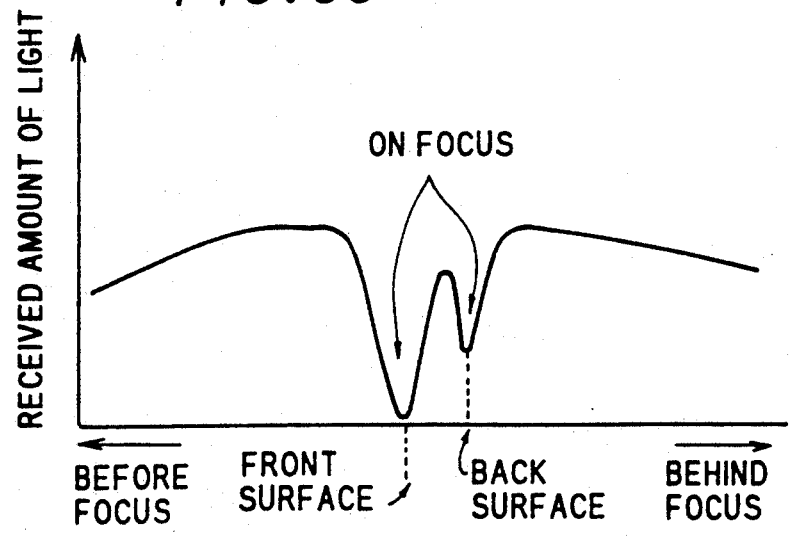
FIG. 36 shows a characteristic curve of the amount of light to be detected by the photo-sensor when the sample surfaces belong to a transparent substrates.

(9) Suppose a sample is a substrate made of a transparent material like glass. Then, back side reflection takes place. Under such circumstances, a characteristic curve of the photo-sensor 8 has two valleys; one deep, the other shallow, as is shown in FIG. 36. The deep valley corresponds to a state in which the sample surface 2, i.e. the front side surface of the transparent substrate, is on the reference position. The shallow valley corresponds to another state in which the back side surface of the transparent substrate is on the reference position. Thus, the present invention allows detection of displacements of a transparent substrate from the reference position.

(10) In the foregoing embodiments, the edge 7a of the louver 7 is provided at a conjugate position with the sample surface 2 located on the on-focus point. The edge 7a of the louver 7, however, may be at the position conjugate with a position which is deviated from the on-focus point in the direction before or behind the focus. If the edge 7a is so arranged, the valley bottom of the characteristic curve of the photo-sensor 8, as is shown in FIG. 35, does not correspond to the sample surface 2 on the on-focus point. In the event that the edge 7a is conjugate with a position $P_x$ (not shown) which is off the on-focus point in the direction before the focus, the valley bottom of the characteristic curve of the photo-sensor 8 corresponds to the position $P_x$. The on-focus point falls in a position displaced in the direction behind the focus from the valley bottom of such a characteristic curve.

With the edge 7a of the louver 7 being conjugate with a position off the on-focus point, it becomes easier to detect in which direction the sample surface 2 is displaced, i.e., in the direction before the focus or the direction behind the focus. If the edge 7a of the louver 7 is at a conjugate position with the on-focus point and the reference point is at the on-focus point, the amount of light detected by the photo-sensor 8 increases as the sample surface 2 is displaced from the reference point irrespective of the direction. In other words, if the edge 7a and the on-focus point are conjugate, the direction of displacement can hardly be detected without relatively moving the sample surface 2 and the objective lens 6. On the contrary, if the edge 7a is conjugate with a point off the on-focus point, as the sample surface 2 is displaced from the reference point, the amount of light detected by the photo-sensor 8 either increases or decreases depending upon the direction of the displacement. Thus, the direction of displacement can be easily detected, under the condition where displacement occurs on one slope inside of the valley of the characteristic curve (FIG. 35). The condition is required because amount of light received by the photo-sensor 8 turns from decrease to increase if the displacement occurs across the bottom of the valley.

To summarize, a reference point defined by the configuration of the present invention may include not only the position in which the sample surface 2 is on the focus but also positions in which the surface 2 is off the focus.

(11) The edge 7a of the louver 7 is not necessarily located on the optical axis LA of the objective lens 6. The louver 7 may be set off the optical axis LA or across it. What is required is that the louver 7 falls between the objective lens 6 and the light source 1, and that the louver 7 can partly block the flux illuminating the sample surface 2.

(12) In the foregoing embodiments, the louver 7 is aligned with certain inclinations against the optical axis LA. The inclination is directed conveniently to receive reflecting light from the sample surface 2 located off the reference point as well as to redirect the light efficiently to the photo-sensor 8. If the photo-sensor 8 also serves as the louver 7, as is shown in FIG. 29, the louver 7 may be aligned perpendicular to the optical axis LA. To summarize, no specific inclinations are required between the louver 7 and the optical axis LA.

(13) Relative to the edge 7a of the louver 7 the entire length of the edge 7a is not necessarily conjugate with the reference position. Comparison between two events in which the entire length of the edge 7a is not conjugate with the reference position and it is conjugate with the reference position only reveals a slight increase of the amount of light in the former when the sample surface 2 is on the reference point. In both events, the amount of light to be received is lower when the sample surface 2 is on the reference point than when it is not on the reference point.

(14) The sample surface 2 is not necessarily a mirror surface, because the displacement detection system in accordance with the present invention detects displacement of the sample surface 2 from a reference point by detecting whether or not the edge 7a of the louver 7 is conjugate with the part of the sample surface 2 illuminated brightly or dimly by the light from the light source 1. Therefore, the sample surface 2 may be a surface of polysilicon films on semiconductor wafers, metal films, resists, paints, glass, polished metals, etc. as well as silicon oxide films upon silicon wafers.

(15) In the foregoing embodiments, the reference position is defined as the on-focus position to apply the present invention to defocus detection systems. However, the present invention is not limited to defocus detection systems. For instance, by attaching means to move the sample surface in the direction perpendicular to the optical axis LA of the objective lens, the configuration in accordance with the present invention can also provide a system to detect undulations on the sample surface. When an arbitrary point is selected on the sample surface as the reference point and local displacements of the sample surface in the direction of the optical axis are detected while moving the surface in the direction perpendicular to the axis, altitude of any part of the surface is measured reletive to the selected point which is defined as a reference. Thus, the configuration in accordance with the present invention provides a system to detect undulations on sample surfaces.

To summarize, application of the configuration in accordance with present invention is not limited to systems to detect displacement of sample surfaces from a focus. It can be used, in general, to detect displacements of sample surfaces from certain reference points.

§9. Advantage of First through Seventh Embodiments

Unlike the prior art systems where comparison of the amounts of light upon two divided sensors is taken as basis to detect displacements of sample surfaces from a reference point, the present invention employs the amount of light itself received by a photo-sensor and, therefore, can avoid influences of contrast upon the sample surfaces. It also allows employment of a single photo-sensor.

If a sample is a transparent substrate, the characteristic curve of the photo-sensor has two valleys; one deep and the other shallow. The deep valley corresponds to a state in which the sample surface, or front side of the transparent substrate, is on the reference point. The shallow valley corresponds to another state in which the back side of the transparent substrate is on the reference point. Thus, the present invention allows distinguishing as well as to detecting, displacements of the front and the back sides of transparent substrates from the reference point. A problem with the prior art systems, that is that displacements of transparent substrates are not easily detected because of the influence of back side reflections, is solved. The present invention allows detecting displacements of the back side, as well as the front side, of transparent substrates.

§10. Eighth Embodiment

Figure 37:
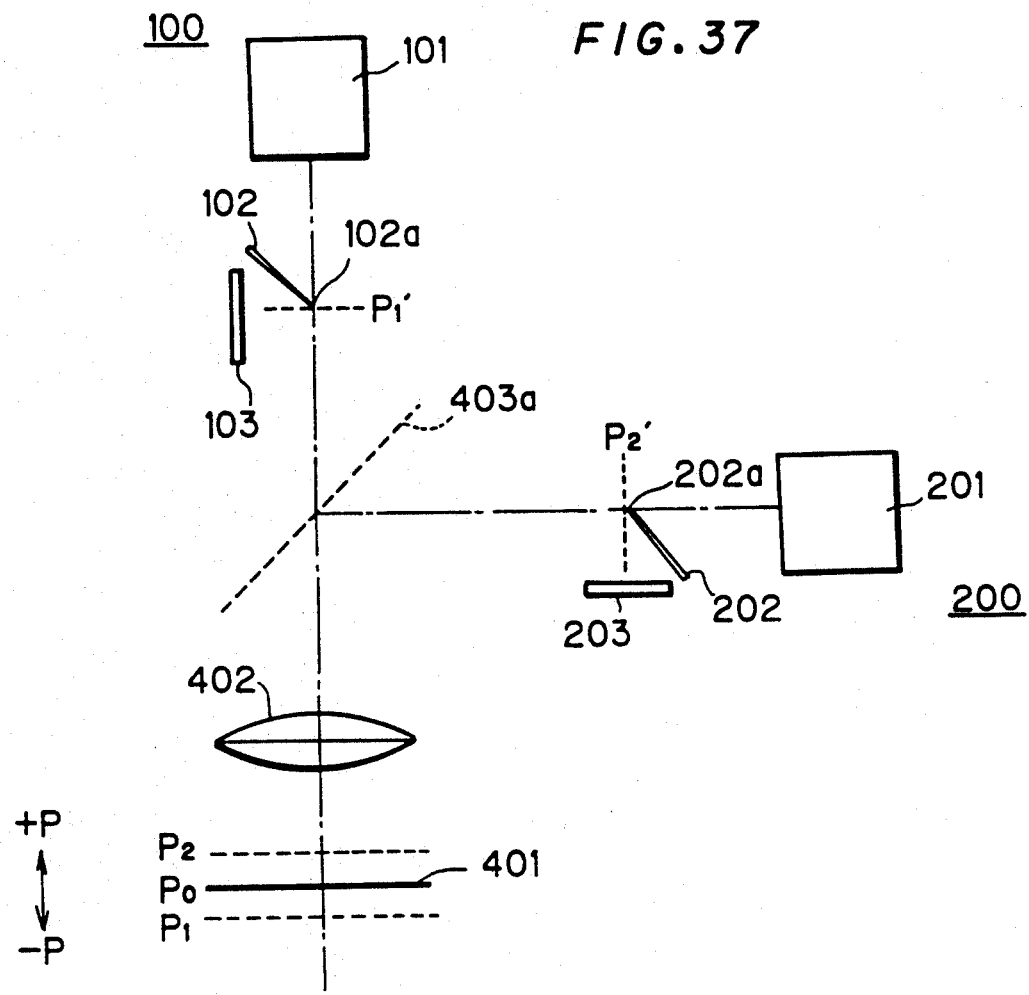
FIG. 37 is a schematic configuration diagram of an eighth preferred embodiment.

FIG. 37 is a schematic diagram depicting the configuration of a position detection system in accordance with an eighth embodiment of the present invention.

A first light source 101, a first louver 102 and a first photo-sensor 103 jointly comprise a first position detection subsystem 100, while a second light source 201, a second louver 202 and a second photo-sensor 203 comprise a second position detection subsystem 200.

A sample surface 401 which is the object of positioning may be a surface of a semiconductor wafer or a surface of an optical disk.

An objective lens 402 works as a component of an optical system to transmit an image to a means of observation. When an image of the sample surface 401 is formed on the means of observation via the objective lens 402, the sample surface 401 is said to be on the focus. The on-focus position $P_0$ is a reference position in this preferred embodiment.

A half mirror 403a of wavelength selective type is located between an objective lens 402 and the first position detection subsystem 100 and, at the same time, between the objective lens 402 and the second position detection subsystem 200. Light which is emitted from the first light source 101 and transmitted through the half mirror 403a illuminates the sample surface 401 through the objective lens 402. Light which is emitted from the second light source 201 and reflected from the half mirror 403a illuminates the sample surface 401 through the objective lens 402. This half mirror 403a serves as a beam splitter for splitting respective incident lights into transmissible components and reflective components according to wavelength thereof.

The first and second light sources 101 and 201 may be lasers, LEDs, incandescent lamps, discharge tubes, etc.

A first louver 102 is located between the half mirror 403a and the first light source 101, while a second louver 202 is located between the half mirror 403a and the second light source 201. An edge 102a of the first louver 102 is located at a position $P_1'$ which is conjugate with a first set position $P_1$ across the lens 403a. An edge 202a of second louver 202 is located at a position $P_2'$ which is conjugate with the second set position $P_2$ across the lens 403a. The first set position $P_1$ belongs to one side of the on-focus position $P_0$ which is farther from the position detection system along a direction $(-P)$. The second set position $P_2$ belongs to the other side of the on-focus position $P_0$ nearer to the position detection system along the direction $(+P)$. Both the first and second set positions $P_1$ and $P_2$ are set and fixed at positions whose spatial relations, i.e. distances, with the on-focus position $P_0$ are clearly defined.

The first photo-sensor 103 and second photo-sensor 203 are devices to detect the amounts of lights reflecting from the sample surface 401 displaced from the focus. It is only required for the sensors to be able to detect the amounts of lights. Devices such as photodiodes and photoelectric tubes can meet the requirement, and use of CCDs are also allowed. Light reflecting from the sample surface 401 illuminates the sample sides of the first and second louvers 102 and 202 when the surface 401 is off the focus. The photo-sensor 103 detects the amount of the light illuminating the sample side of the first louver 102 and the photo-sensor 203 detects the amount of the light illuminating the sample side of the second louver 202.

The half mirror 403a is an optical device to pass lights having wavelength in a specific band through itself and reflect lights having other wavelength.

Only the flux of light that is emitted from the first light source 101 and passes through the half mirror 403a can be reflected from the sample surface 401, then re- enter and pass the half mirror 403a and reach the sample side of the louver 102. The flux is reflected at the sample side of the louver 102 and is received by the first photo-sensor 103. Likewise, only the flux of light that is emitted from the second light source 201 and reflects upon the half mirror 403a can reflect upon the sample surface 401, then reflect upon the half mirror 403a again and reach the sample side of the louver 202. The flux is reflected at the sample side of the louver 202 and is received by the second optical sensor 203. Thus, of the fluxes being reflected from the sample surface 401, one from the first light source 101 is detected exclusively by the first photo-sensor 103 and the other from the second light source 201 is detected exclusively by the second photo-sensor 203. These correspondences between the first light source 101 and the first photo-sensor 103 and between the second light source 201 and the photo-sensor 203, that is, the first photo-sensor 103 detects the flux only from the first light source 101 while the second optical sensor 203 detects one only from the second light source 201, is hereinafter referred to as "separation of fluxes to be detected".

Figure 40:
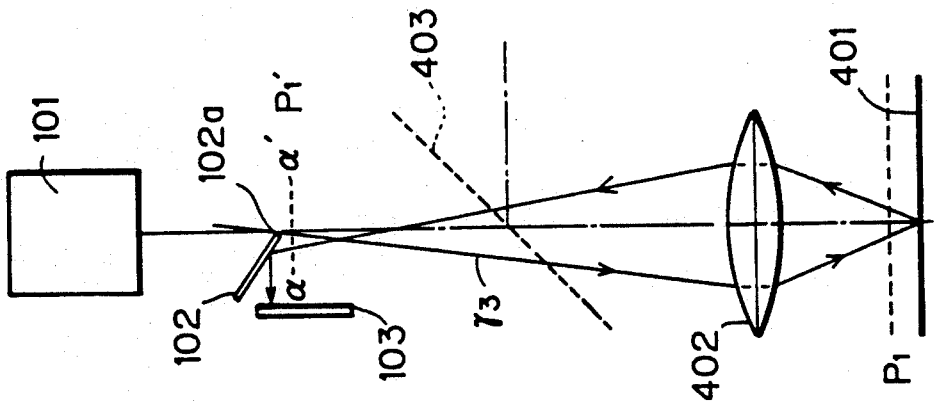
FIG. 40 illustrates, concerning the first position detection subsystem, rays reflecting from the sample surface when it is before the focus, in the eighth embodiment.
Figure 39:
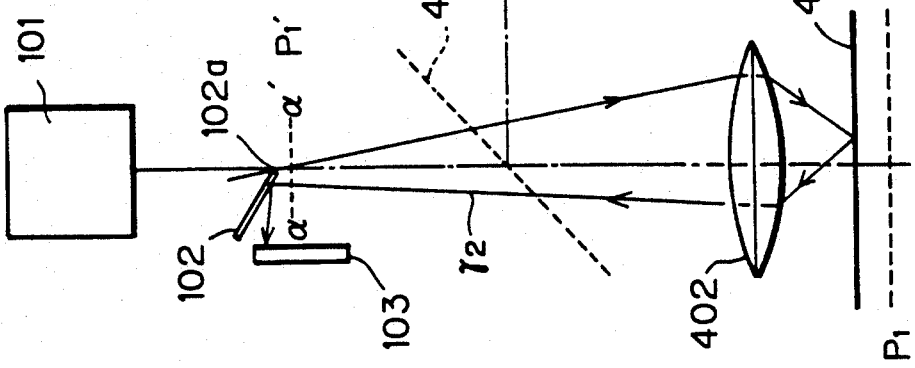
FIG. 39 illustrates, concerning the first position detection subsystem, rays reflecting from the sample surface when it is behind the focus, in the eighth embodiment.
Figure 38:
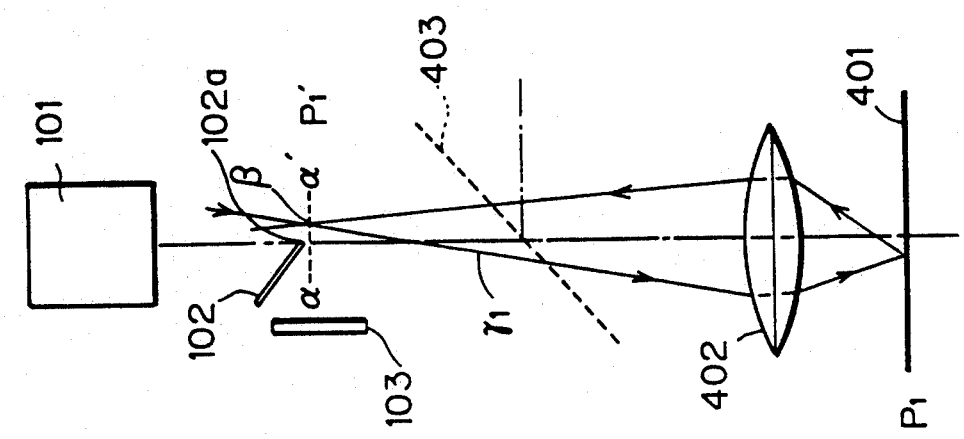
FIG. 38 illustrates, concerning a first position detection subsystem, rays reflecting from a sample surface when it is on the focus, in the eighth embodiment.

FIGS. 38-40 depict the operation of a position detection system in accordance with the eighth preferred embodiment and show specific rays emitted from the first light source 101 and reflected by the sample surface 401 in different situations. The elements 201-203 are omitted for convenience of illustration and the sample surface 401 is:

on the first set point $P_1$ in FIG. 38,
displaced from set point $P_1$ in a direction $(+P)$ in FIG. 39, and
displaced from set point $P_1$ in a direction $(-P)$ in FIG. 40.

In FIGS. 39 and 40, broken lines drawn parallel to the sample surfaces 401 are virtual lines representing the first set position $P_1$.

FIG. 38 shows the situation where the sample surface 401 is on the first set position $P_1$, that is, when the sample surface 401 and the edge 102a of the first louver 102 are on the conjugate positions. When a line $\alpha$-$\alpha'$ through the edge 102a is drawn perpendicularly to the optical axis LA, a ray which passes through an arbitrary point $\beta$ on the line $\alpha$-$\alpha'$ reflects upon the sample surface 401 and travels through the point again $\beta$, as is illustrated by a solid line $\gamma_1$. If a ray reflecting from the sample surface 401 is to illuminate the sample side of the first louver 102, this ray must have crossed line $\alpha$-$\alpha'$ after it is emitted from the first light source 101. Obviously from FIG. 38, however, that particular ray does not exist since the optical path thereof is blocked by the first louver 102. In other words, as long as the sample surface 401 is located on the conjugate position with edge 102a of the first louver 102, i.e. on the first set position $P_1$, rays which are emitted from the first light source 101 and then reflected on the sample surface 401 never illuminate the sample side of the first louver 102.

FIGS. 39 and 40 show the situation where the sample surface 401 is not located on the conjugate position with the edge 102a of the first louver 102, i.e. when it is not on the first set position $P_1$. Rays $\gamma_2$ and $\gamma_3$ from the first light source 101 pass by the edge 102a of the first louver 102. The rays then reflect on the sample surface 401 and reach the sample side of the first louver 102. In other words, when the sample surface 401 and the edge 102a of the first louver 102 are not in the conjugate positions, some rays which are emitted from the first light source 101 and then reflected on the sample surface 401 always illuminate the sample side of the first louver 102.

The amount of light travelling toward the sample side of the first louver 102 is minimized when the sample surface 401 is located on the conjugate position with edge 102a of the first louver 102, i.e. when it is on the first set position $P_1$. The amount of light increases as the sample surface 401 becomes displaced and the conjugate relation between the surface 401 and the edge 102a turns impaired.

Likewise, the amount of light travelling toward the sample side of the second louver 202 is minimized when the sample surface 401 is located on the conjugate position with the edge 202a of the second louver 202, i.e. when it is on the second set position $P_2$. The amount of light increases as the sample surface 401 becomes displaced and the conjugate relation between the surface 401 and the edge 202a turns impaired.

Figure 41:
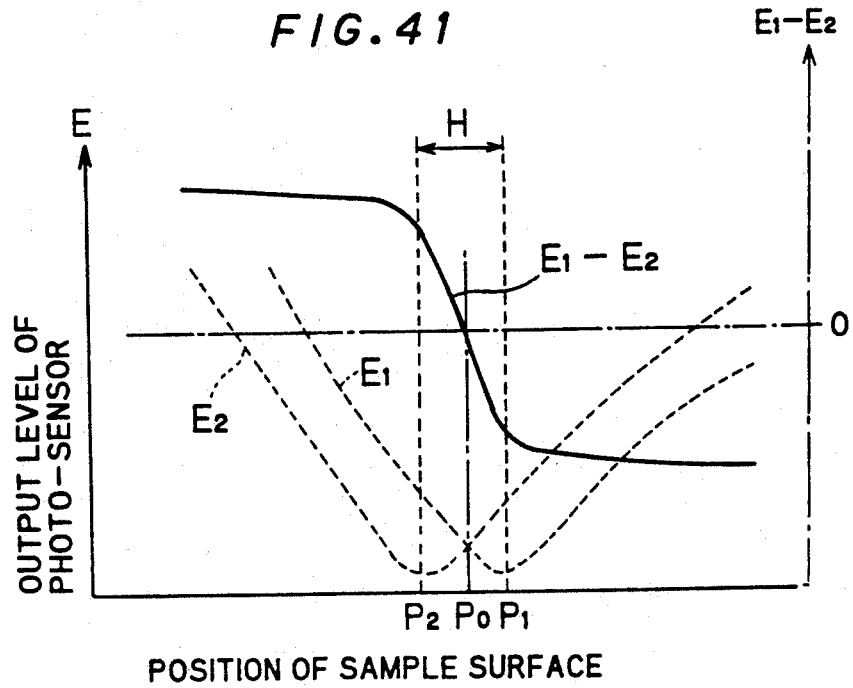
FIG. 41 shows characteristic curves of outputs $E_1$ and $E_2$ respectively from first and the second photo-sensors.

FIG. 41 shows characteristic curves of outputs $E_1$ and $E_2$ respectively from the first photo-sensor 103 and the second photo-sensor 203 relative to the sample surface 401, where the vertical axis represents output level E from the photo-sensors and the horizontal axis represents position of the sample surface 401. In FIG. 41, lines represent:

output from the first photo-sensor in a broken line $E_1$,
output from the second photo-sensor in a broken line $E_2$, and
difference between the outputs from the first and the second photo-sensors 103 and 203 in a solid line $E_1$-$E_2$.

The region H designated by an arrow reveals that there is a unique relation between the difference $E_1$-$E_2$ and the position of the sample surface 401. Consequently, as long as the sample surface 401 falls within the region H, its position can be definitely detected by the difference $E_1$-$E_2$. Not only that, even if the sample surface 401 is located outside the region H, polarity of the difference $E_1$-$E_2$, i.e. whether the difference is positive or negative, enables decision as to whether it is located in (+P) or (-P) direction relative to the first and the second set positions $P_1$ and $P_2$. Given:

the on-focus position $P_0$ is taken for the reference point, the first and the second set points $P_1$ and $P_2$ are set on either side of the reference point exclusively from each other, the distance of each set point from the reference point is clearly defined, and a constant K that satisfies an equation $E_1 - E_2 + K = 0$ at the on-focus position is measured and determined.

Then, by calculating the value of a function F(G) defined as $F(G) = E_1 - E_2 + K$, it is decided that the sample surface 401 is:

on the focus if $F(G) = 0$,
is displaced from the focus towards the first set point $P_1$ if $F(G) < 0$, and
is displaced from the focus towards the second set point $P_2$ if $F(G) > 0$.

Thus, the quantity and the direction of displacement from the focus, i.e. from the reference point, can be detected while the sample surface 401 stays still relative to the position detection system.

Table 1 shows the relation between the position of the surface 401 and the change of the detected amounts of lights in the photo-sensors 103 and 203 when the sample surface 401 is moved, where:

the symbol $E_1 \uparrow$ represents increase in the output $E_1$ of the first photo-sensor 103, the symbol $E_1 \downarrow$ represents decrease in the output $E_1$ of the first photo-sensor 103, the symbol $E_2 \uparrow$ represents increase in the output $E_2$ of the second photo-sensor 203, the symbol $E_2 \downarrow$ represents decrease in the output $E_2$ of the second photo-sensor 203, and the position $P_{1-2}$ is the position of the sample surface 401 at which the respective amounts of lights detected by the sensors 103 and 203 coincide with each other.

TABLE 1

| | The (-P) Side From $P_1$ | Between $P_1$ and $P_{1-2}$ | Between $P_2$ and $P_{1-2}$ | The (+P) Side From $P_2$ |
|---|---|---|---|---|
| Sample surface is moved in the direction (-P) | $E_1 \uparrow$ $E_2 \uparrow$ $E_1 < E_2$ | $E_1 \downarrow$ $E_2 \uparrow$ $E_1 < E_2$ | $E_1 \downarrow$ $E_2 \uparrow$ $E_1 > E_2$ | $E_1 \downarrow$ $E_2 \downarrow$ $E_1 > E_2$ |
| Sample surface is moved in the direction (+P) | $E_1 \downarrow$ $E_2 \downarrow$ $E_1 < E_2$ | $E_1 \uparrow$ $E_2 \downarrow$ $E_1 < E_2$ | $E_1 \uparrow$ $E_2 \downarrow$ $E_1 > E_2$ | $E_1 \uparrow$ $E_2 \uparrow$ $E_1 > E_2$ |

As will be understood from Table 1, the position of the sample surface 401 can be decided by moving the surface 401. For example, if the output $E_1$ increases and the output $E_2 (>E_1)$ decreases under the condition that the surface 401 is moved in the direction (+P), it can be concluded that the surface 401 is in the region between the points $P_2$ and $P_{1-2}$.

§11. Ninth Embodiment

FIG. 42 is a schematic configuration diagram depicting a displacement detection system in accordance with a ninth preferred embodiment of the present invention, which is partly modified from the eighth embodiment. In this and the other FIGS. that follow, the same reference numerals are used as in the foregoing FIGS. depicting the eighth embodiment, as long as they represent the same elements.

Unlike the eighth embodiment which employs the wavelength selective half mirror 403a to separate lights to be detected by the first and the second position detection subsystems 100 and 200, this ninth embodiment employs:

a half mirror 403b without wavelength selective characteristics, a first wavelength selective filter 105a installed between the first louver 102 and the half mirror 403b, and a second wavelength selective filter 205a installed between the second louver 202 and the half mirror 403b.

A wavelength selective filter is a filter which passes light having wavelength which belongs to a specific band through itself and rejects lights having other wavelength. The first and the second wavelength selective filters 105a and 205a pass lights of different bands.

Only the light that is emitted from the first light source 101 and passes through the first wavelength selective filter 105a can reflect upon the sample surface 401, then re-enter and pass the filter 105a and finally reach the first photo-sensor 103. Likewise, only the light that is emitted from the second light source 201 and passes through the second wavelength selective filter 205a can reflect upon the sample surface 401, then re-enter and pass the filter 205a and finally reach the second photo-sensor 203.

Thus, the lights which belong to the first and the second position detection subsystems 100 and 200 can be separated.

§12. Tenth Embodiment

FIG. 43 is a schematic configuration diagram depicting a displacement detection system in accordance with a tenth preferred embodiment of the present invention, which is partly modified from the ninth embodiment.

Unlike the ninth embodiment which employs the first and second wavelength selective filters 105a and 205a to separate lights to be detected by the first and the second position detection subsystems 100 and 200, this tenth embodiment employs:

a first polarizing filter 105b installed between the first louver 102 and the half mirror 403b and a second polarizing filter 205b installed between the second louver 202 and the half mirror 403b.

A polarizing filter is a filter which passes light of a specific polarization angle through itself and rejects lights of the other polarization angle. The first and the second polarizing filters 105b and 205b pass lights of different polarization angles, respectively.

Only the light that is emitted from the first light source 101 and passes through the polarizing filter 105b can reflect upon the sample surface 401, then re-enter and pass the filter 105b and finally reach the first photo-sensor 103. Likewise, only the light that is emitted from the second light source 201 and passes through the polarizing filter 205b can reflect upon the sample surface 401, then re-enter and pass the filter 205b and finally reach the second photo-sensor 203.

Thus, the lights which belong to the first and the second position detection subsystems 100 and 200 can be separated from each other.

§13. Eleventh Embodiment

Figure 44:
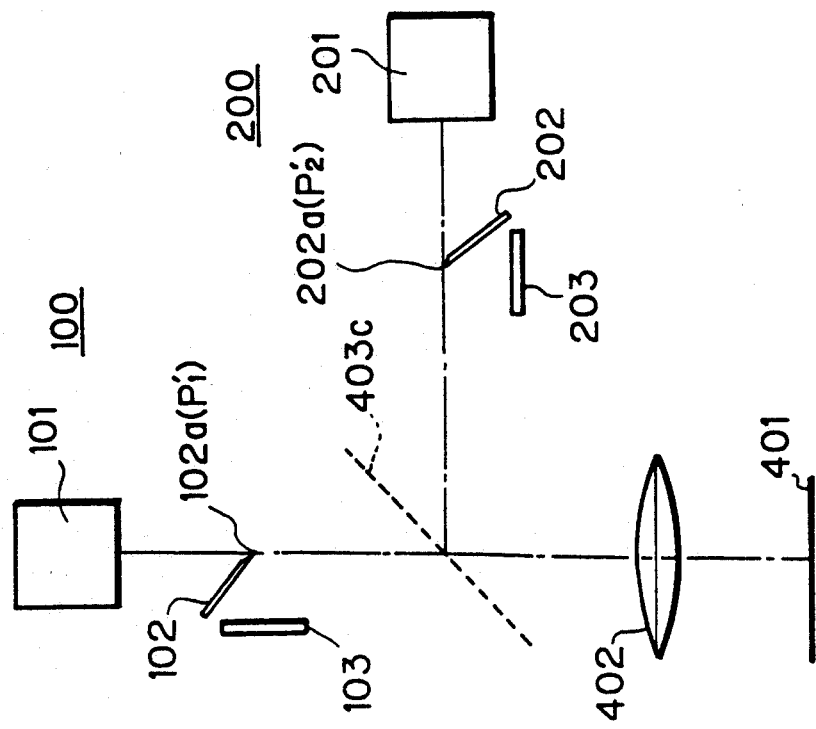
FIG. 44 is a schematic configuration diagram of a eleventh preferred embodiment.

FIG. 44 is a schematic configuration diagram depicting a displacement detection system in accordance with an eleventh preferred embodiment of the present invention, which is partly modified from the eighth embodiment.

Unlike the eighth embodiment which employs the wavelength selective half mirror 403a to separate lights to be detected by the first and the second position detection subsystems 100 and 200, this eleventh embodiment employs a polarizing beam splitter 403c.

A polarizing beam splitter is an optical device which passes light of a specific polarization angle through itself and reflects lights of the other polarization angle.

Only the light that is emitted from the first light source 101 and passes through the polarizing beam splitter 403c can reflect upon the sample surface 401, then re-enter and pass the beam splitter 403c and finally reach the first photo-sensor 103. Likewise, only the light that is emitted from the second light source 201 and reflected upon the polarizing beam splitter 403c can reflect upon the sample surface 401, then re-enter and reflect upon the beam splitter 403c again and finally reach the second photo-sensor 203.

Thus, the lights which belong to the first and the second position detection subsystems 100 and 200 can be separated from each other.

§14. Twelfth Embodiment

Figure 45:
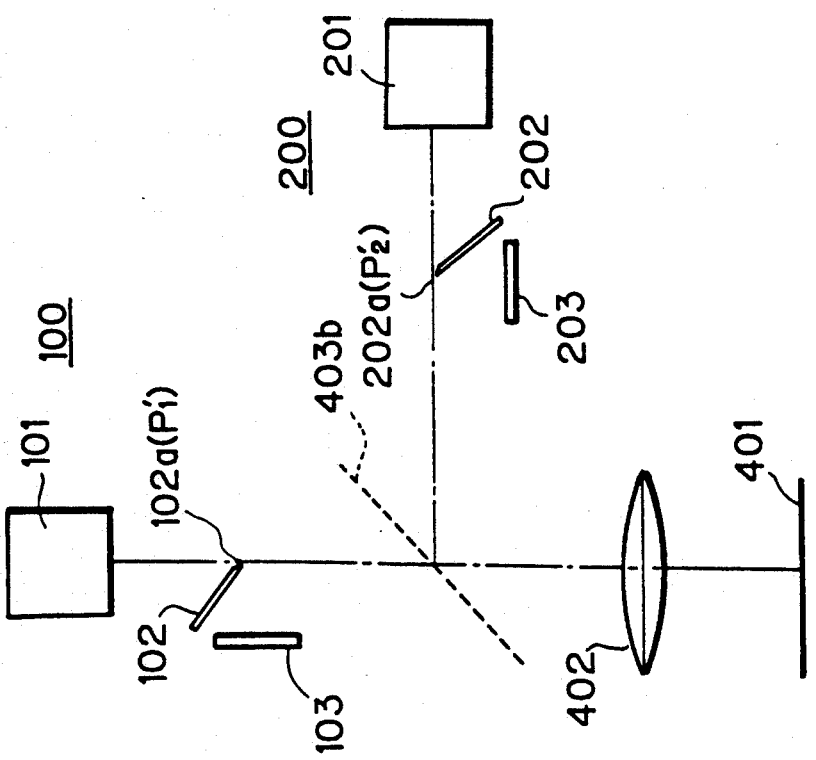
FIG. 45 is a schematic configuration diagram of a twelfth preferred embodiment.

FIG. 45 is a schematic configuration diagram depicting a displacement detection system in accordance with a twelfth preferred embodiment of the present invention.

Figure 46:
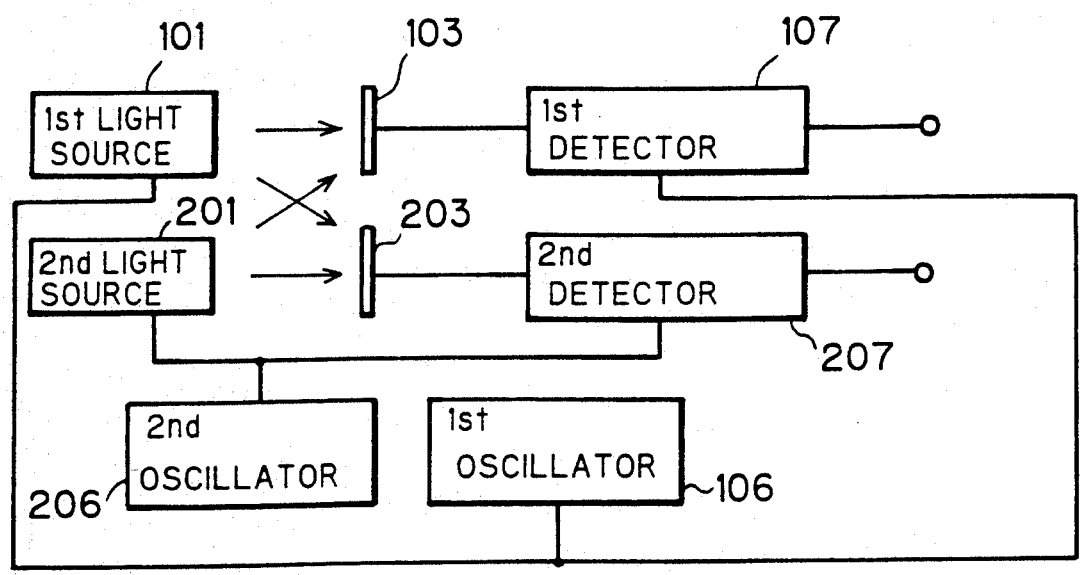
FIG. 46 is a block diagram of a control unit for synchronous detection to separate signals which originate in first and the second position detection sybsystems of the twelfth embodiment.

Unlike the foregoing embodiments which take advantage of optical devices to separate lights to be detected by the first and second position detection subsystems 100 and 200, this twelfth embodiment obtains an equivalent effect using an electrical device. Although it employs a half mirror 403b which does not have a function of wavelength selection, as is the case with the ninth embodiment, it does not employ wavelength selective filters nor polarizing filters. As shown in FIG. 46, which is a block diagram of such an electrical device, the device is constructed as a synchronous detection device.

The device has first and second oscillators 106 and 206 which generate electric oscillation signals of different frequencies, respectively. These oscillation signals are transmitted to the first and second light sources 101 and 201 to modify the respective intensity of lights the light sources 101 and 102 emit. The respective output signals of the photo-sensor 103 and 203 are delivered to first and second detectors 107 and 207, and are synchronously detected with the frequencies of the oscillation signals which are transmitted from the oscillators 106 and 206, respectively. Through this process, the lights originating the first and second light sources 101 and 201 are individually recognized in the form of electric signals.

§15. Thirteenth Embodiment

Figure 47:
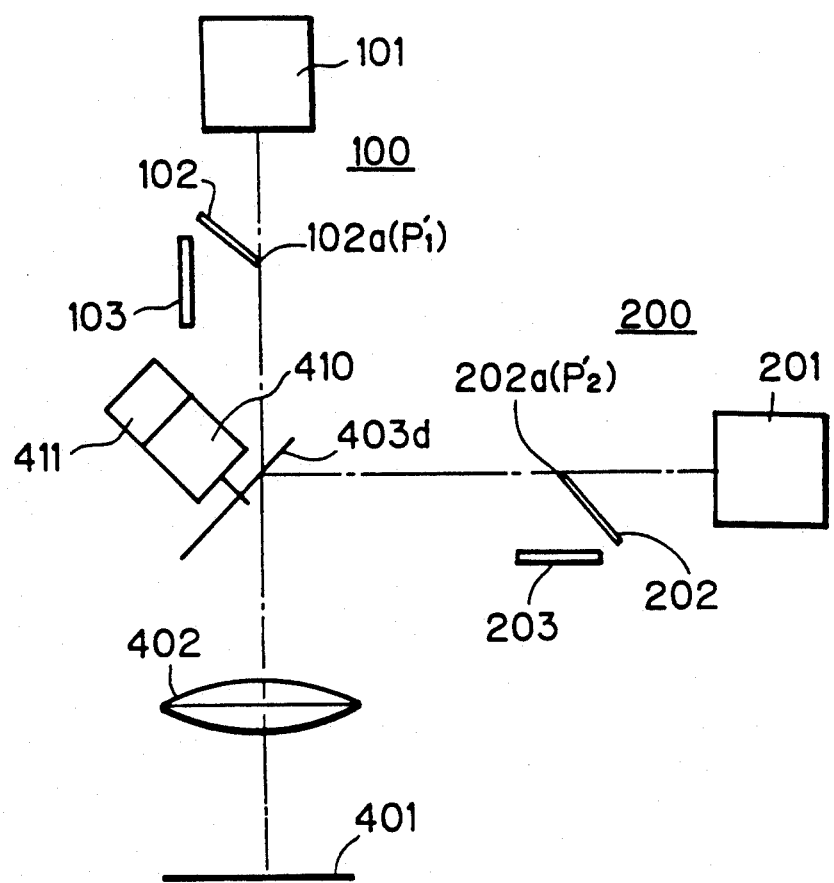
FIG. 47 is a schematic configuration diagram of the thirteenth preferred embodiment.

FIG. 47 is a schematic configuration diagram depicting a displacement detection system in accordance with a thirteenth preferred embodiment of the present invention, which is characterized in its use of a mechanical device to separate lights to be detected by the first and second position detection subsystems 100 and 200.

Figure 48:
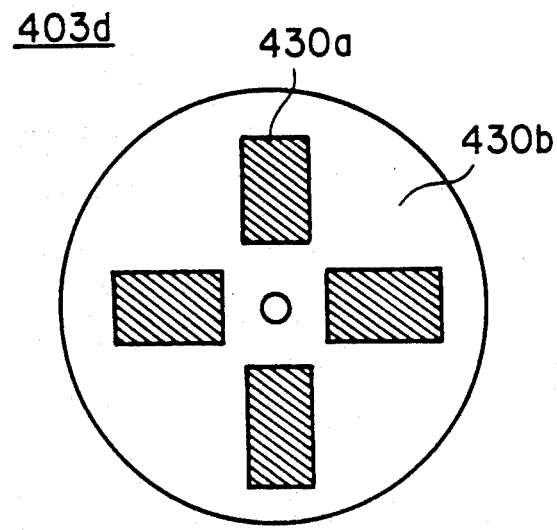
FIG. 48 is a schematic plane view of a rotary mirror of the thirteenth embodiment.

Unlike the eighth embodiment which employed the wavelength selective half mirror 403a, this thirteenth embodiment employs a rotary mirror 403d revolved by a motor 410. As shown in FIG. 48 in the form of a schematic plane view, the rotary mirror 403d is constructed such that reflectors 430a and a transparent area 430b are alternately inserted into the light path.

When the optical axis LA of the objective lens 403 crosses the rotary mirror 403d at the transparent area 430b, the light that is emitted from the first light source 101 can pass through the rotary mirror 403d and reflect upon the sample surface 401, then re-enter and pass the rotary mirror 403d and finally reach the first photo-sensor 103. In this occasion, the light that is emitted from the second light source 201 is not reflected by the rotary mirror 403d, and does not illuminate the sample surface 401.

On the other hand, only when the optical axis LA of the objective lens 402 meets the rotary mirror 403d at one of the reflectors 403a, the light that is emitted from the second light source 201 reflects upon the rotary mirror 403d. This light is reflected upon the sample surface 401, and is again reflected upon the rotary mirror 403d. This light reaches the second photo-sensor 203. In this occasion, the light that is emitted from the first light source 101 cannot pass through the rotary mirror 403d, and does not illuminate the sample surface 401.

The motor 410 which drives the rotary mirror 403d is provided with an angle sensor 411 to detect the rotation angle of the disk 403d, whereby it may be determined which of the reflectors 430a and the transparent parts 430b is on the optical axis LA of the objective lens 402.

Figure 49:
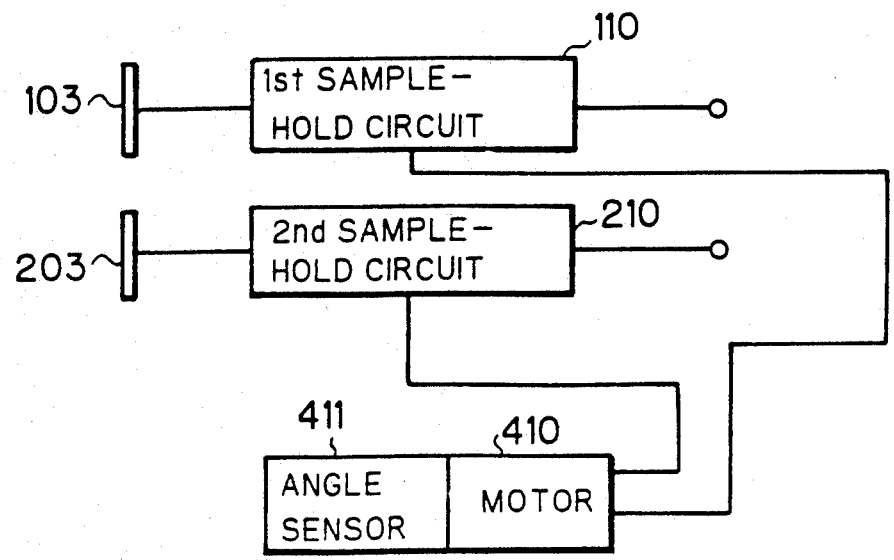
FIG. 49 is a block diagram of a control unit for sampling and holding outputs from the first and the second photo-sensors.

As shown in FIG. 49, the angle detection signal which is obtained in the angle sensor 411 is delivered to first and second sample holding circuits 110 and 120. In synchronism with the angle detection signal, the first sample holding circuit 110 samples and holds the output signal from the first photo-sensor 103, and the second sample holding circuits 210 samples and holds the output signal from the second photo-sensor 203.

Thus, the lights which belong to the first and the second position detection subsystems 100 and 200 can be separated in a time-sharing scheme.

§16. Fourteenth Embodiment

FIG. 50 is a schematic configuration diagram and FIG. 51 is a schematic side view jointly depicting a displacement detection system in accordance with a fourteenth preferred embodiment of the present invention.

Unlike the foregoing embodiments, this fourteenth embodiment does not employ any beam splitter like a half mirror. Instead, it employs first and second louvers 102 and 202 between a common light source 301 and an objective lens 402.

The two louvers 102 and 103 are aligned side by side when observed from the direction of an arrow X in FIG. 50 and one is hidden behind the other when observed from the direction of an arrow Y in the FIG. 50. An edge 102a of the first louver 102 is located at a position $P_1'$ which is conjugate with a first set position $P_1$, and an edge 202a of the second louver 202 is located at a position $P_2'$ which is conjugate with a second set position $P_2$. Therefore, the louvers 102 and 202 are staggered along the direction of the optical axis LA.

A first wavelength selective filter 105a is provided between the first louver 102 and the objective lens 402, and a second wavelength selective filter 205a is provided between the second louver 202 and the objective lens 402. The first and the second wavelength selective filters 105a and 205a pass lights of different wavelength bands.

Only the light that is emitted from the common light source 301 and passes through the first wavelength selective filter 105a can reflect upon the sample surface 401, then re-enter and pass the filter 105a and finally reach the first photo-sensor 103. Likewise, only the light that is emitted from the common light source 301 and passes through the second wavelength selective filter 205a can reflect upon the sample surface 401, then re-enter and pass the filter 205a and finally reach the second photo-sensor 203. Thus, the lights which belong to the first and the second position detection subsystems can be separated.

First and second polarizing filters with different polarization angles may be substituted for the first and the second wavelength selective filters 105a and 205a, respectively.

§17. Fifteenth Embodiment

FIG. 52 is a schematic configuration diagram depicting a displacement detection system in accordance with a fifteenth preferred embodiment of the present invention, which is partly modified from the seventh embodiment.

In this fifteenth embodiment, an edge 102a of the first louver 102 and an edge 202a of the second louver 202 are arranged across the optical axis LA with some clearances from the axis LA.

The edge 102a of the first louver 102 is located at a position $P_1'$ which is conjugate with a first set position $P_1$ across the lens 402, and the edge 202a of the second louver 202 is located at a position at $P_2'$ which is conjugate with a second set position $P_2$. Therefore, the louvers 102 and 202 are staggered along the direction of the optical axis LA. A first wavelength selective filter 105a is provided between the first louver 102 and the objective lens 402, and a second wavelength selective filter 205a is provided between the second louver 202 and the objective lens 402. The first and the second wavelength selective filters 105a and 205a pass lights of different wavelength bands, and are in contact with each other on the optical axis LA.

Only the light that is emitted from the common light source 301 and passes through the first wavelength selective filter 105a can reflect upon the sample surface 401, then re-enter and pass the filter 105a and finally reach the first photo-sensor 103. Likewise, only the light that is emitted from the common light source 301 and passes through the second wavelength selective filter 205a can reflect upon the sample surface 401, then re-enter and pass the filter 205a and finally reach the second photo-sensor 203. Thus, the lights which belong to the first and the second position detection subsystems can be separated.

First and second polarizing filters 105b and 205b with different polarization angles may be substituted for the first and the second wavelength selective filters 105a and 205b, respectively.

§18. Modifications in Eighth through Fifteenth Embodiments (1) The first light source 101 may be equipped with a converging lens. If the rays emitted from the first light source 101 once converges at a point and then diverges therefrom, the convergent point may fall upon the edge 102a of the louver 102. It may also fall closer to the objective lens 402, or closer to the first light source 101. Likewise, the second light source 201 may be equipped with a converging lens, too. If the rays emitted from the second light source 101 once converges at a point and then diverges therefrom, the convergent point may fall anywhere.

(2) The modifications which has been described for the first through seventh embodiments can be also applied to the eighth through fifteenth embodiments.

§19. Advantage of Eighth through Fifteenth Embodiments

Each of the eighth through fifteenth embodiments employs the amount of light itself as the basis to detect displacements of sample surfaces and, therefore, can avoid influences of contrast upon the sample surfaces. It also allows detection of the quantity and the direction of displacement from the reference point while the sample surface stays still relative to the position detection system.

As compared with the first through seventh embodiments, the eighth through fifteenth embodiments have an advantage in that the direction of the displacement is easily detected without relatively moving the sample surface and the objective lens. Although the first through seventh embodiments can be modified so as to detect the direction of the displacement without any movement, as decribed in §8, the detection range is only a half of the range A (FIG. 35). The eighth through fifteenth embodiments have a relatively wide range H (FIG. 41) for the detection.

§20. Sixteenth Embodiment

Figure 53:
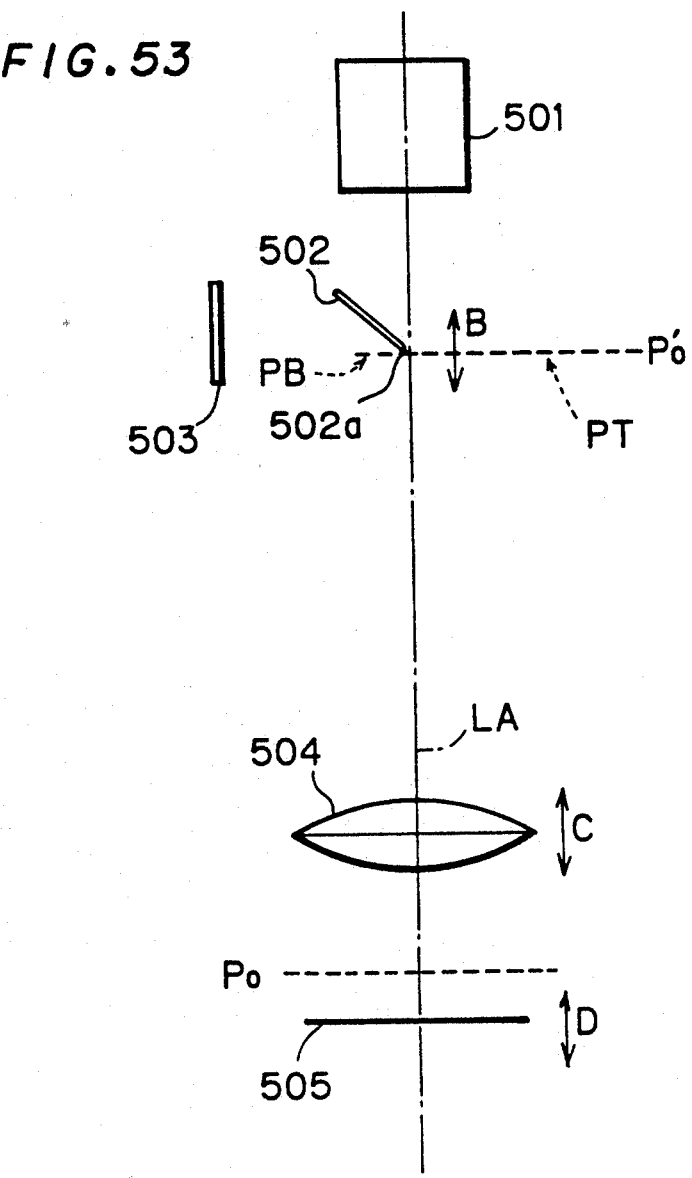
FIG. 53 is a schematic configuration diagram of a sixteenth preferred embodiment of the present invention.
Figure 55:
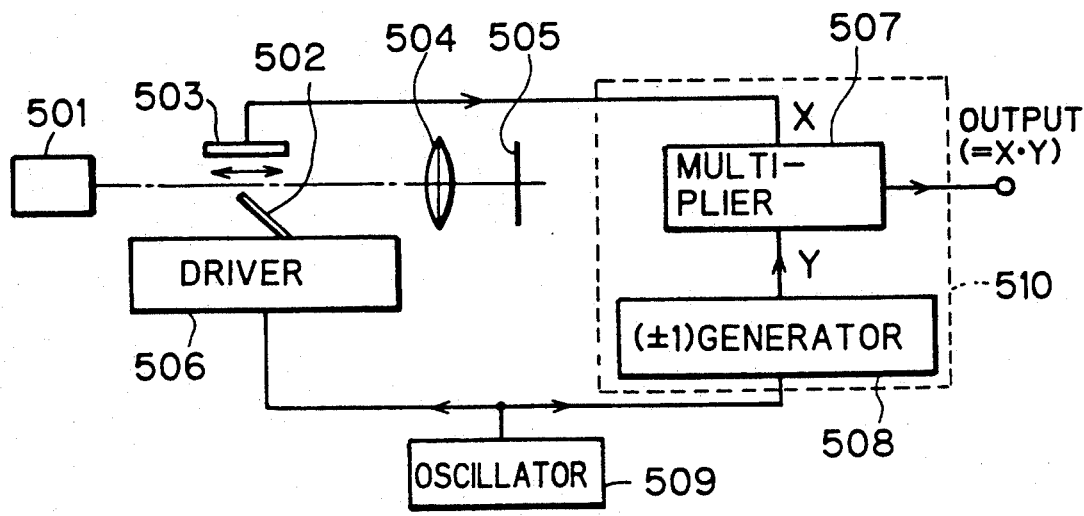
FIG. 55 is a block diagram of a signal processing unit employed in the sixteenth embodiment.

FIG. 53 and FIG. 55 are schematic diagrams depicting a position detection system in accordance with a sixteeth preferred embodiment of the present invention. The system comprises an optical projector 501 which illuminates a sample surface 505 through an objective lens 504. A louver 502 is provided between the projector 501 and the lens 504. An edge 502a of the louver 502 is located at a position $P_0'$ which is conjugate with a reference position $P_O$ across an image forming optical system formed by the objective lens 504.

The louver 502 is coupled to a driver 506 which vibrates the louver 502 in a direction parallel to the optical axis LA of the objective lens 504. A photo-sensor 503 is so provided as to detect the amount of light which is reflected upon the sample side surface of the louver 502. The output signal of the photo-sensor 503 is transmitted to a phase detector circuit 510. An oscillator 509 generates an oscillating signal having a predetermined frequency, and supplies the signal to the driver 506 and the phase detector circuit 510.

Suppose a virtual plane which is parallel to the sample surface 505 and passes through the edge 502a. The plane is divided into two parts by the edge 502a, one of which is a "photo-blocking side" PB and the other is a "photo-transmissible side" PT.

When the sample surface 505 stays on the reference position $P_0$, the sample surface 505 and the virtual plane are conjugate with each other. A ray which crosses, on its way from the projector 501, the photo-transmissible side PT of the virtual plane at a point reflects upon the sample surface 505. On its return path, it never fails to cross the virtual plane at same point. In other words, as long as the sample surface 505 stays on the reference position $P_0$, no rays reflecting from the sample surface 505 intersect the photo-blocking side PB of the virtual plane. Consequently, the reflecting light does not illuminate the sample side surface of the louver 502.

When the sample surface 505 is displaced from the reference position $P_0$, the sample surface 505 and the virtual plane are not conjugate with each other. A ray which crosses, on its way from the projector 501, the photo-transmissible side PT of the virtual plane at a first point reflects upon the sample surface 505. On its way from the sample surface 505, it crosses the virtual plane at a second point which is different from the first point. Distance between the first and second intersecting points becomes wider as displacement of the sample surface 505 from the reference position $P_0$ becomes larger. In other words, as the displacement of the sample surface 505 from the reference point $P_0$ becomes larger, the probability that the light will intersect the photo-blocking side PB on the return way thereof increases. Consequently, the light has more chances to illuminate the sample side surface of the louver 502.

Figure 54:
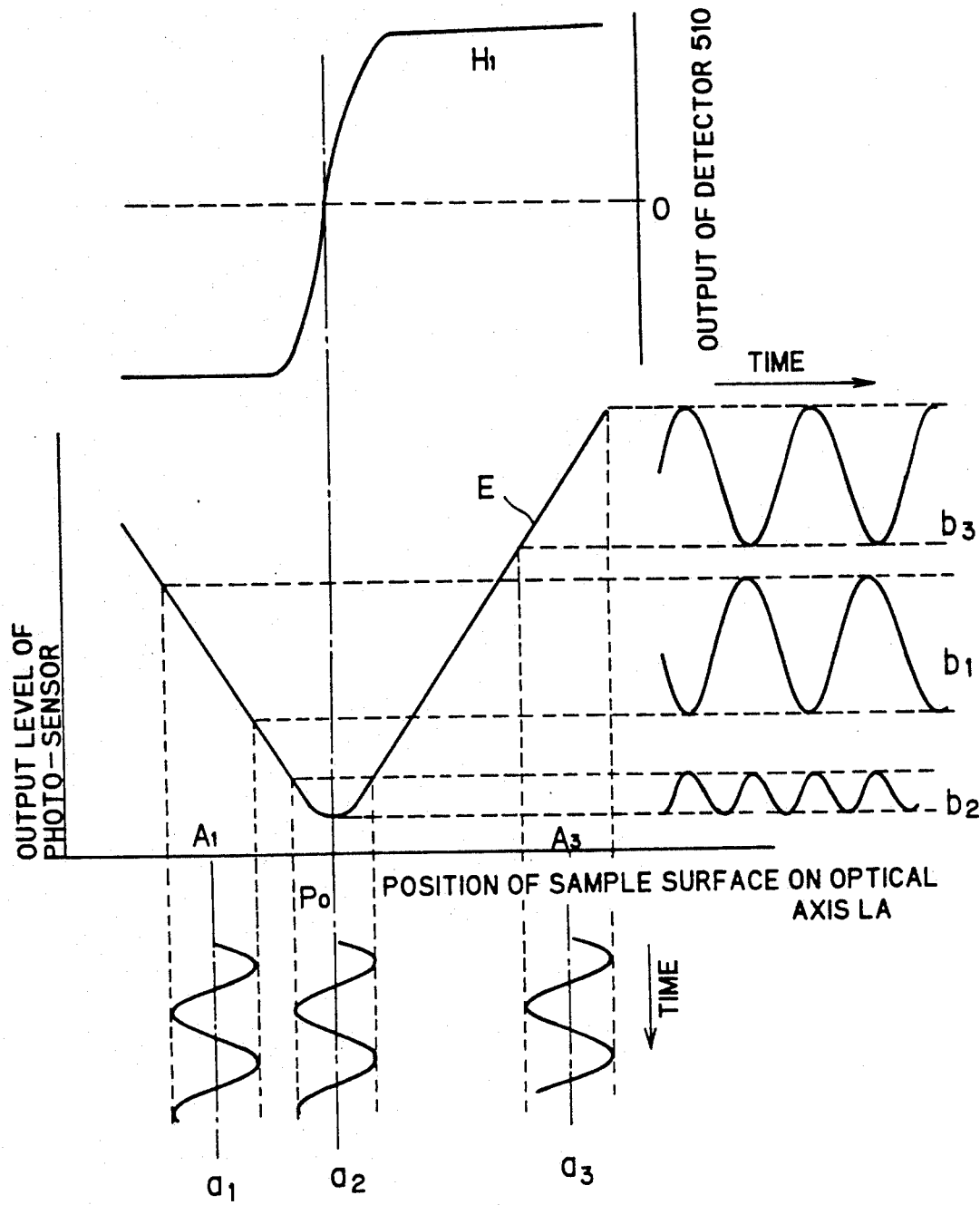
FIG. 54 is a diagram showing output characteristics of a photo-sensor of the sixteenth embodiment of the present invention.

As illustrated in FIG. 53, light which illuminates the sample side of the louver 502 and reflected therefrom is received by the photo-sensor 503. Relation between outputs from the photo-sensor 503 and displacements of the sample surface 505 from the reference position $P_O$ is illustrated by curve E in FIG. 54. In FIG. 54, the vertical axis represents the output of the sensor 503, while the horizontal axis represents the position of the sample surface 505 on the optical axis LA.

The output from the photo-sensor 503 is minimized when the sample surface 505 is on the reference position $P_0$. It increases as the sample surface 505 becomes displaced within the vicinity of the reference position $P_0$.

The louver 502 is vibrated with the driver 506 in the direction parallel to the optical axis LA, as is indicated by an arrow B. The center of the vibration is at the position $P_0'$, which is conjugate with the reference position $P_0$. Suppose a state where the sample surface 505 stays still on the reference position $P_0$, while the louver 502 vibrates about the position $P_0'$. This state is optically equivalent to another state in which the louver 502 stays still upon the position $P_0'$, while the sample surface 505 vibrates about the position $P_0$ according to a vibration pattern represented by a curve $a_2$ in FIG. 54. Change in the amount of light received by the photo-sensor 503 draws a curve $b_2$ in FIG. 54.

Also suppose the louver 502 vibrates about the position $P_0'$, while the sample surface 505 stays still upon a position $A_1$ or $A_3$ in FIG. 54. This state is optically equivalent to another state in which the louver 502 stays still upon the position $P_0'$, while the sample surface 505 vibrates about a position $A_1$ or $A_3$ according to a vibration pattern represented by the curve $a_1$ or $a_3$ in FIG. 54. Change in the amount of light received by the photo-sensor 503 draws a curve $b_1$ or $b_3$ in FIG. 54. These curves $a_1$-$a_3$ and $b_1$-$b_3$ are drawn on planes representing the relation between the time and the amount of light received by the sensor 503.

It should be noted that the curve $b_1$ and $b_2$ have opposite phases, or they are out-of-phase by 180°. That is, changes in the amount of light received by the photo-sensor 503 have opposite phases between when the sample surface 505 is displaced from the reference position $P_0$ towards the near side of the objective lens 504 and when it is displaced towards the far side. It should also be noted that period of change in the amount of light received by the photo-sensor 503 when the sample surface 505 is on the position $P_0$ is a half of the period when the surface 505 is displaced from the position $P_0$.

Accordingly, whether the sample surface 505 is on the reference point $P_0$ or not and, if it is not, in which direction it is displaced are detected by comparing the period or the phase of vibration of the louver 502 with those of the amount of light illuminating the sample side of the louver 502.

Changes in the phases and the periods can be detected using a signal processor illustrated in FIG. 55:

The oscillator 509 supplies the driver 506 with the oscillation signal to inform the driver 506 of the periods and phases with which the louver 502 is vibrated.

The signal generator 508 generates alternating signal +1 and −1 synchronized with the oscillation signal from the oscillator 509.

The output signal from the photo-sensor 503 is fed to one input terminal of the multiplier 507 and the alternating signal from the signal generator 508 if fed to the other input terminal of the multiplier 507.

The multiplier 507 and the signal generator 508 comprise the phase detector circuit 510. The phase detector circuit 510 is operable to detect a component of the input signal having the same phase with the other input signal. More particularly, the phase detector circuit 510 generates positive output when the input signals X and Y are in phase, and a negative output when the input signals X and Y are out-of-phase by 180°.

When signals, as are represented by the curves $b_1$, $b_2$ and $b_3$ in FIG. 54, are fed to the phase detector 510, the output of the phase detector 510 draws a characteristic curve $H_1$. Relative to the curve $H_1$, the horizontal axis represents the position of the sample surface 505 on the optical axis LA, while the vertical axis represents the output from the phase detector circuit 510. Therefore, the output is zero when the sample surface 505 is on the reference position $P_0$. It deviates from zero in either positive or negative direction corresponding to displacements of the sample surface 505 from the reference position $P_0$.

Amount and direction of displacements of the sample surface 505 can be obtained by calculating the following function $F(G)$, where a constant K is introduced to arbitrarily determine the reference position $P_0$.

$$F(G) = H_1 + K$$

Figure 65:
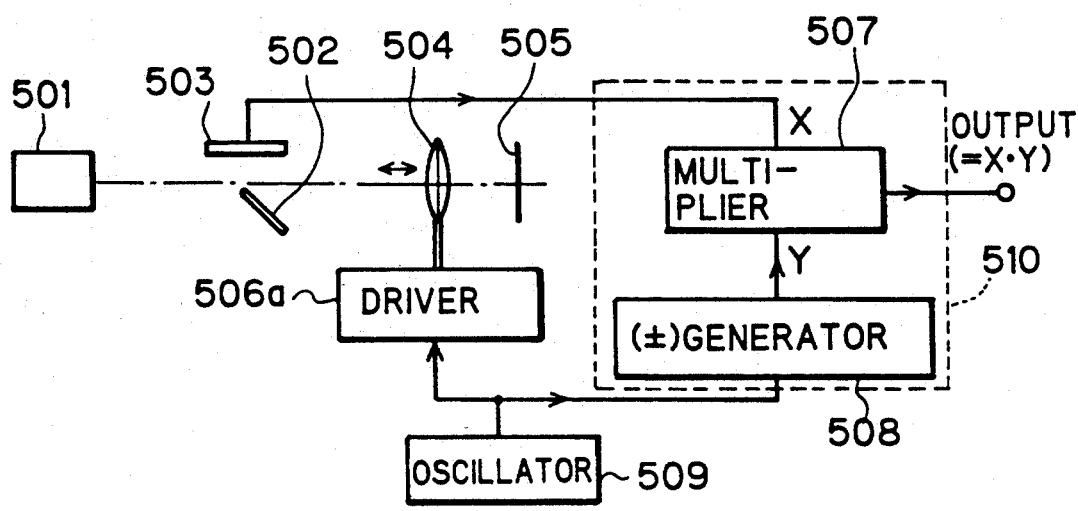
FIGS. 65-68 are schematic diagrams showing other preferred embodiments.
Figure 66:
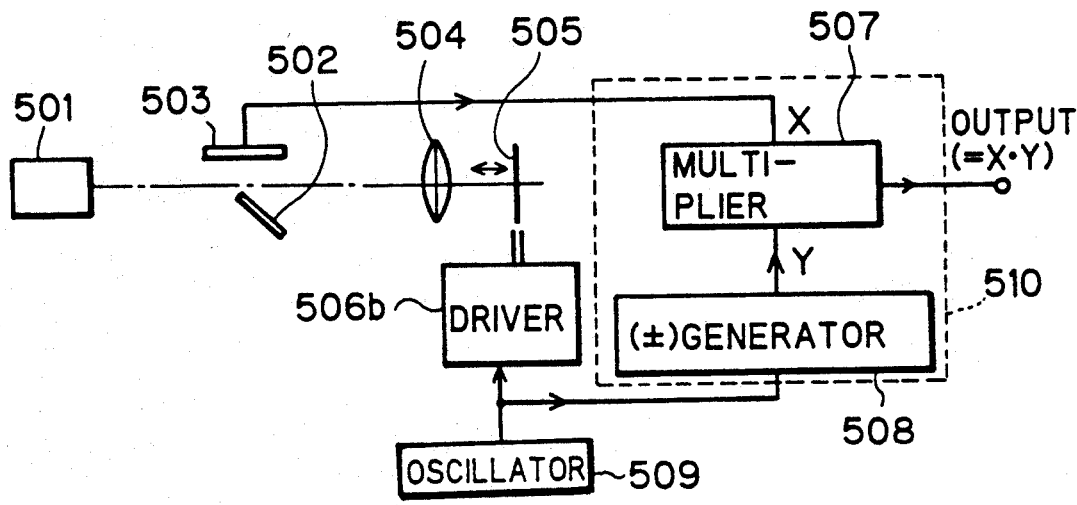

For modified embodiments, the objective lens 504 or the sample surface 505 or even a table upon which the sample is held may be vibrated by a driver, as are designated by arrows C and D in FIG. 53, because they are optically equivalent to the sixteenth embodiment in which the louver 502 is vibrated. These modifications are shown in FIGS. 65 and 66, where drivers 506a and 506b are those for oscillating the lens 504 and the sample surface 505 in response to the signal from the oscillator 509, respectively. In the device shown in FIG. 66, the "displacement" of the sample surface 505 is defined by the distance between the reference position and the center of vibration of the sample surface 505. In any case, equivalent curves as are shown in FIG. 54 can be obtained.

§ 21. Seventeenth Embodiment

Figure 56:
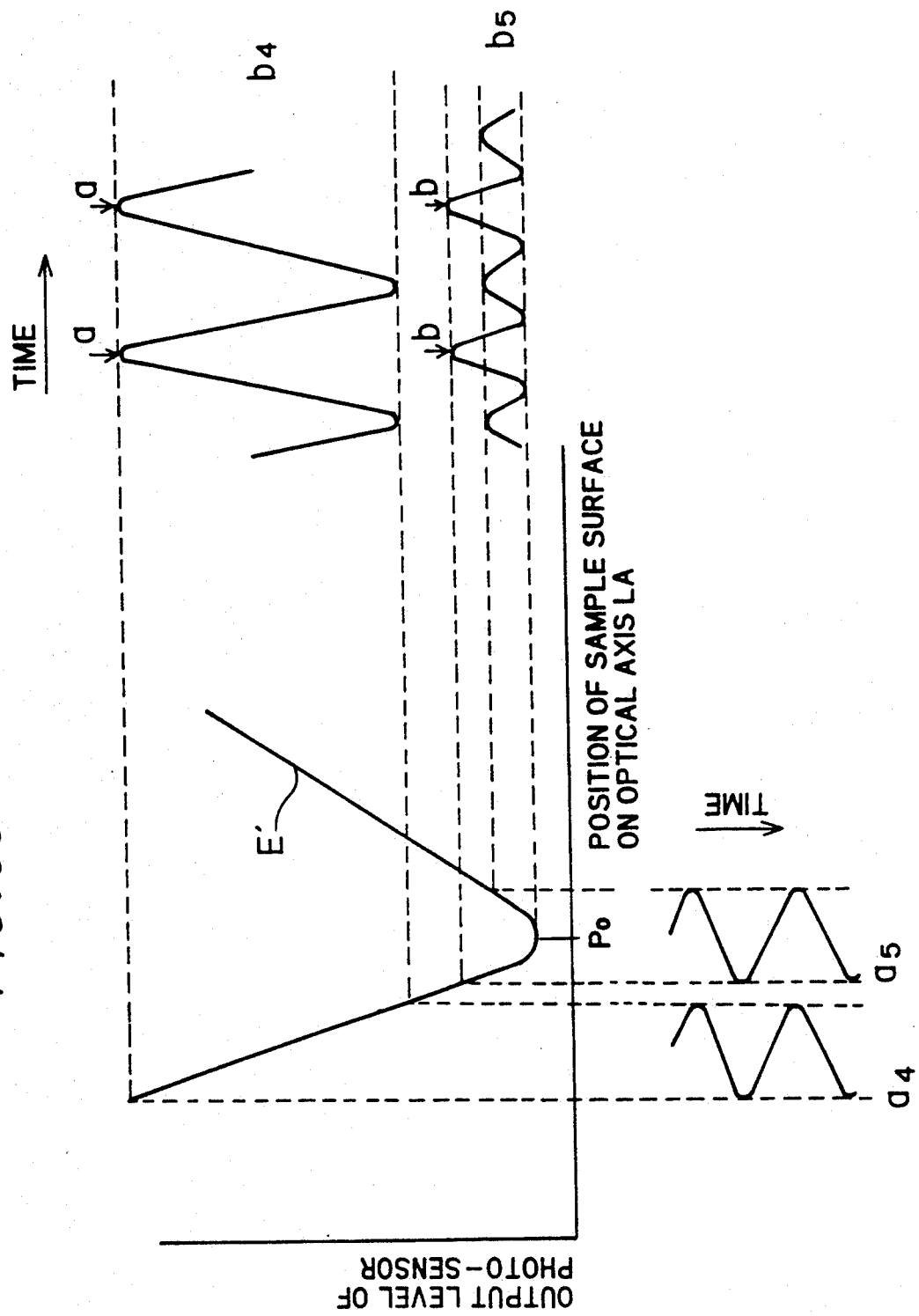
FIG. 56 is a diagram showing output characteristics of a photo-sensor when a sample surface is inclined.

When the sample surface 505 is inclined, the characteristic curve becomes asymmetrical upon either side of the reference position $P_0$ as illustrated by a curve E' in FIG. 56, where the vertical axis represents the output from the photo-sensor 503, while the horizontal axis represents the position of the sample surface 505 on the optical axis LA. Suppose the sample surface 505 stays still on the reference position $P_0$ while the edge 502a of the louver 502 vibrates about the position $P_0'$, as illustrated in FIG. 53, according to a vibration pattern represented by the curve $a_5$ in FIG. 56. The amount of light received by the photo-sensor 503 draws a curve $b_5$. Components of the curve $b_5$ designated by arrows b on the curve $b_5$ have the identical periods and phases with their counterparts of the curve $b_4$ designated by arrows a. As was mentioned earlier, the curve $b_4$ is obtained under circumstances, or optical equivalents thereto, where the sample surface 505 is displaced from the reference position $P_0$ and vibrates according to a vibration pattern represented by the curve $a_4$. In FIG. 56, the vertical and the horizontal axes for the curves $a_4$ and $a_5$ respectively represent:

the time and the position of the sample surface 505, on the optical axis LA relative to the curves $a_4$ and $a_5$, and the output from the photo-sensor 503 and the time relative to the curves $b_4$ and $b_5$.

Since the sample surface 505 is on the reference position $P_0$, the output from the phase detector circuit 510 is expected to be zero. Inconveniently, however, the output is not zero, because the sample surface 505 is inclined.

Figure 57:
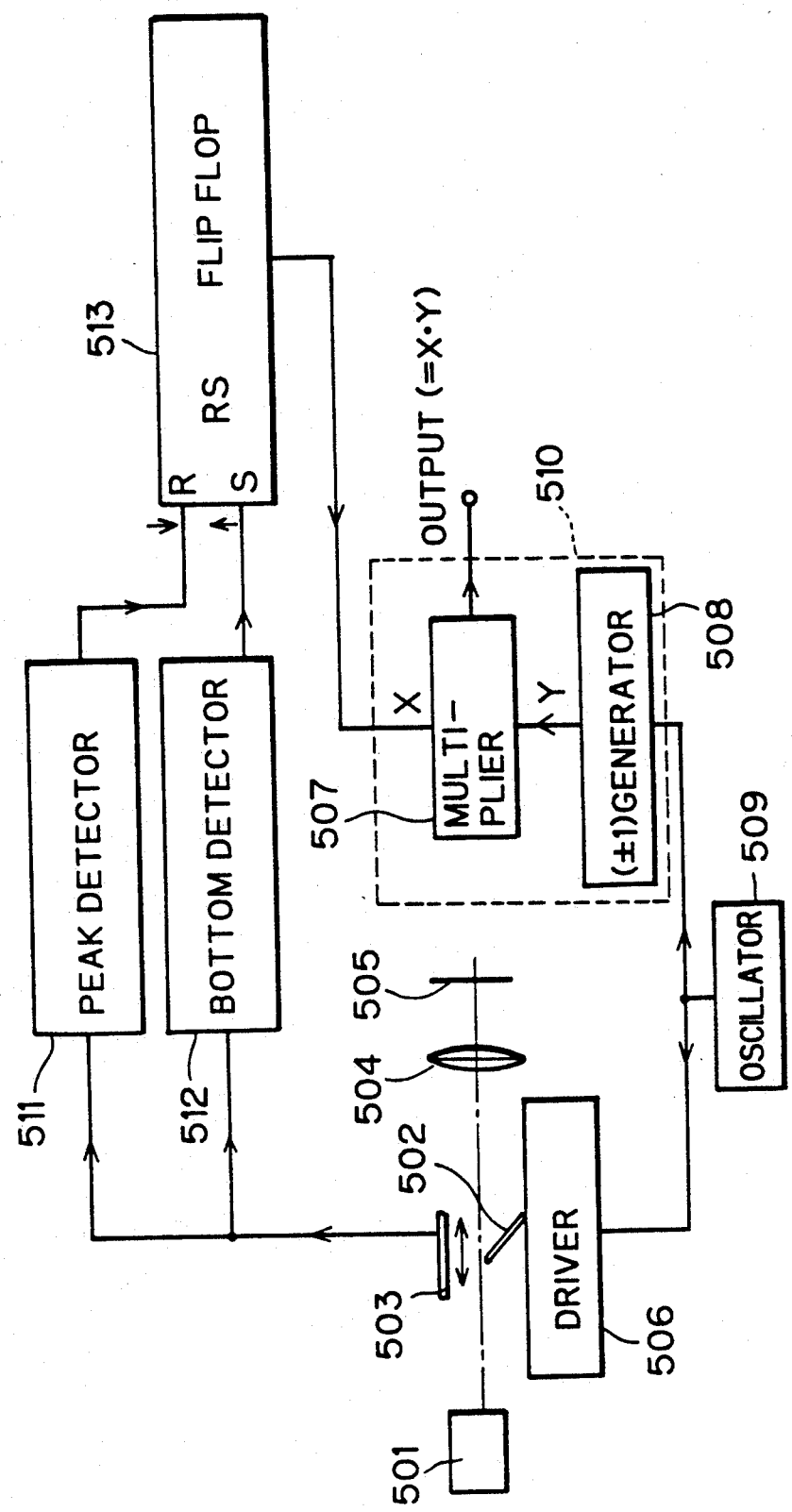
FIG. 57 is a block diagram of a signal processing unit employed in a seventeenth preferred embodiment.

Such inconvenience can be avoided using a processor illustrated in FIG. 57, where outputs from the photo-sensor 503 are supplied to a peak detector 511 and a bottom detector 512. Outputs from the the peak detector 511 and the bottom detector 512 are transmitted and fed to an RS flip-flop 513 through a reset terminal R and a set terminal S.

Figure 59:
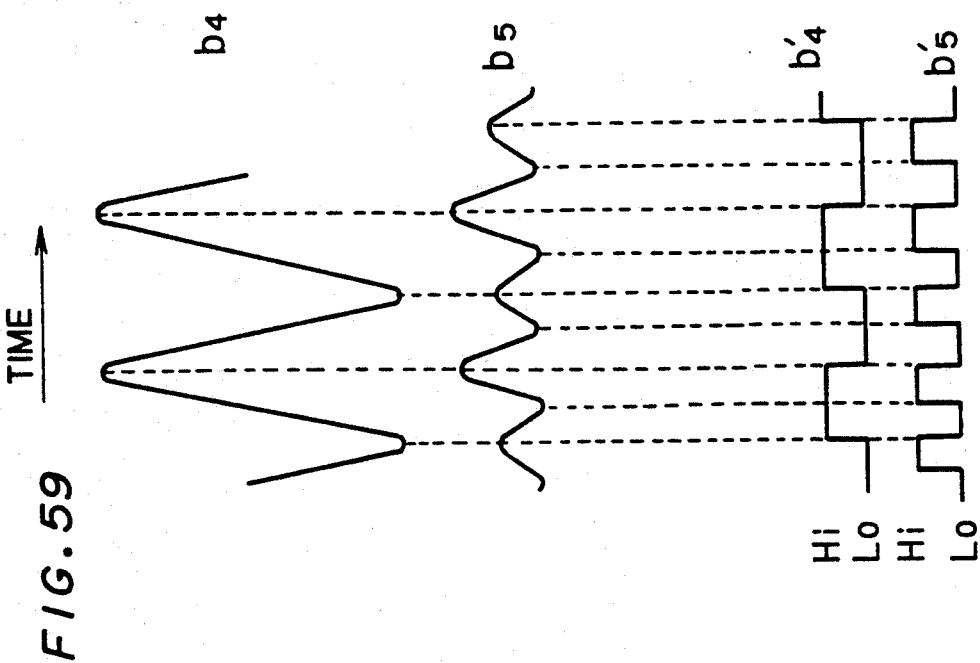
FIGS. 58 and 59 are explanatory diagrams showing waveforms in a signal processing unit.
Figure 58:
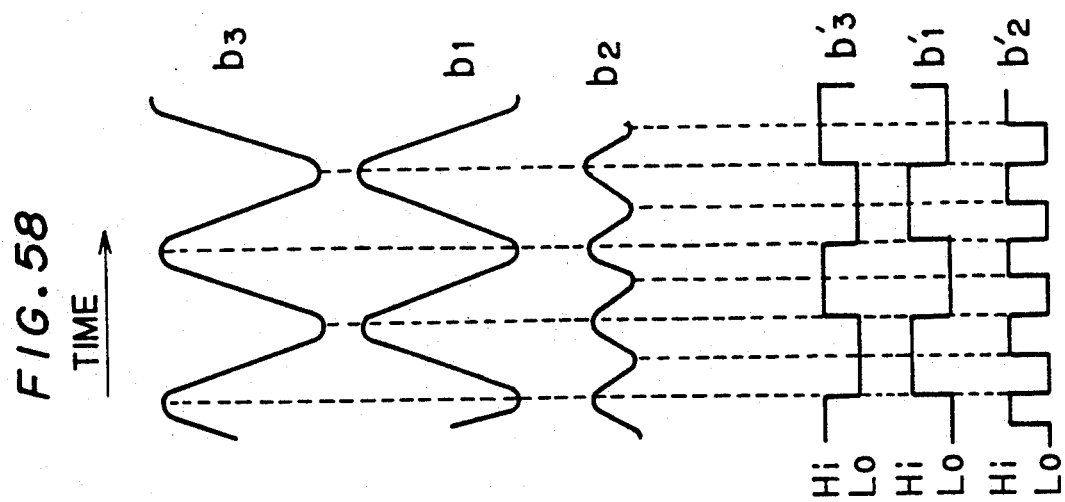

FIGS. 58 and 59 show respective waveforms in the processor, where:

curves $b_3$, $b_1$ and $b_2$ in FIG. 58 are the same as those shown in FIG. 54, curves $b_4$ and $b_5$ in FIGS. 59 are the same as those shown in FIG. 56, curves $b_3$, $b_1$ and $b_2$ as well as $b_4$ and $b_5$ represent outputs from the photo-sensor 503, and binary waveforms $b'_3$, $b'_1$, $b'_2$, $b'_4$ and $b'_5$ represent outputs from the RS flip-flop 513 corresponding to the condition where the outputs $b_3$, $b_1$, $b_2$, $b_4$ and $b_5$ are transmitted the processor, respectively.

Also in FIGS. 58 and 59, the vertical and the horizontal axes respectively represent:

the output from the photo-sensor 503 and the time relative to the curves $b_1$, $b_2$, $b_3$, $b_4$ and $b_5$, and the output from the RS flip-flop 513 and the time relative to the binary waveforms $b'_1$, $b'_2$, $b'_3$, $b'_4$ and $b'_5$.

The curve $b_3$ is taken for an example. When the curve $b_3$ is observed from left to right, a peak is found at a turning point upon which the output changes from an up to a down. The peak detector 511 shown in FIG. 57 detects the peak and generates a trigger pulse. The trigger pulse is fed to the RS flip-flop 513 through the reset terminal R. Upon reception of the trigger pulse, the output from the flip-flop 513 turns to a Lo state, which corresponds to a Lo state of the binary waveform $b'_3$.

When the curve $b_3$ is further observed to the right, a bottom is found. The bottom detector 512 shown in FIG. 57 detects the bottom and generates a trigger pulse. The trigger pulse is fed to RS flip-flop 513 through the set terminal S. Upon reception of the trigger pulse, the output from the flip-flop 513 turns to a Hi state, which corresponds to a Hi state of the binary waveform $b'_3$.

To summarize, even when the signals are processed using a processor depicted in FIG. 57 instead of the processor in FIG. 55, the binary waveforms $b'_3$, $b'_1$ and $b'_2$ shown in FIG. 58 have the same periods and phases as the curves $b_3$, $b_1$ and $b_2$ shown in FIG. 54.

When the signals represented by the curves $b_4$ and $b_5$ in FIG. 56 are processed using the processor depicted in FIG. 57, outputs represented by the binary waveforms $b'_4$ and $b'_5$ in FIG. 59 are obtained. Although the curve $b_5$ contains components which have the same periods and phase as the curve $b_4$, the waveform $b'_5$ does not contain components which have the same periods as the curve $b_4$. Thus, inconvenience with inclined sample surfaces shown in FIG. 56 is avoided by processing signals using the processor depicted in FIG. 57.

§22. Eighteenth Embodiment

Figure 60:
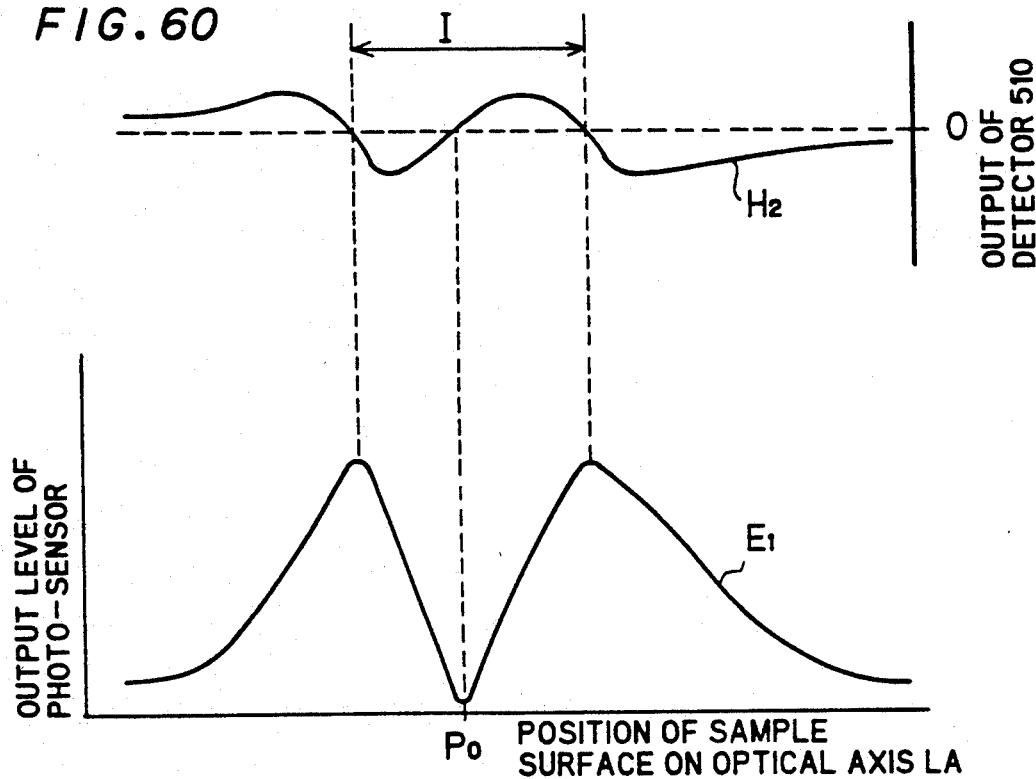
FIG. 60 is a diagram showing output characteristics of a photo-sensor when a sample surface is displaced far from a reference position 3.

The curve E shown in FIG. 54 represents the condition where the sample surface 505 is in the vicinity of the reference position $P_0$. If the sample surface 505 is displaced far from the reference position $P_0$, the curve E shown in FIG. 54 changes to a curve $E_1$ shown in FIG. 60. The plane on which the curve $E_1$ is provided is defined by a vertical axis representing the output of the photo-sensor 503 and a horizontal axis representing the position of the sample surface 505 on the optical axis LA. A curve $H_2$ in FIG. 60 is obtained by converting the curve $E_1$ through the same process as the curve $H_1$ (FIG. 54) is obtained from the curve E. Relative to the curve $H_2$ in FIG. 60, the vertical axis represents the output from phase detector 510, while the horizontal axis represents the position of the sample surface 505 on the optical axis LA.

FIG. 60 reveals that:
inside the area designated by an arrow I, polarity of the curve $H_2$ and direction of displacement of the sample surface 505 have the same signs, as is the case with the curve $H_1$, but
outside the area I, the polarity and the direction have different signs.

This inconsistency causes some inconvenience in control of a process to move the sample surface 505 closer to the reference position $P_0$ based upon the curve $H_2$. Such inconvenience can be avoided using the following method.

The curve $E_1$ is obtained when the flux emitted from the projector 501 converges at the edge 502a of the louver 502, as is illustrated in FIG. 53. In other words, it assumes that an image of the photo-emitting plane of the light source is formed at the edge 502a.

Figure 62:
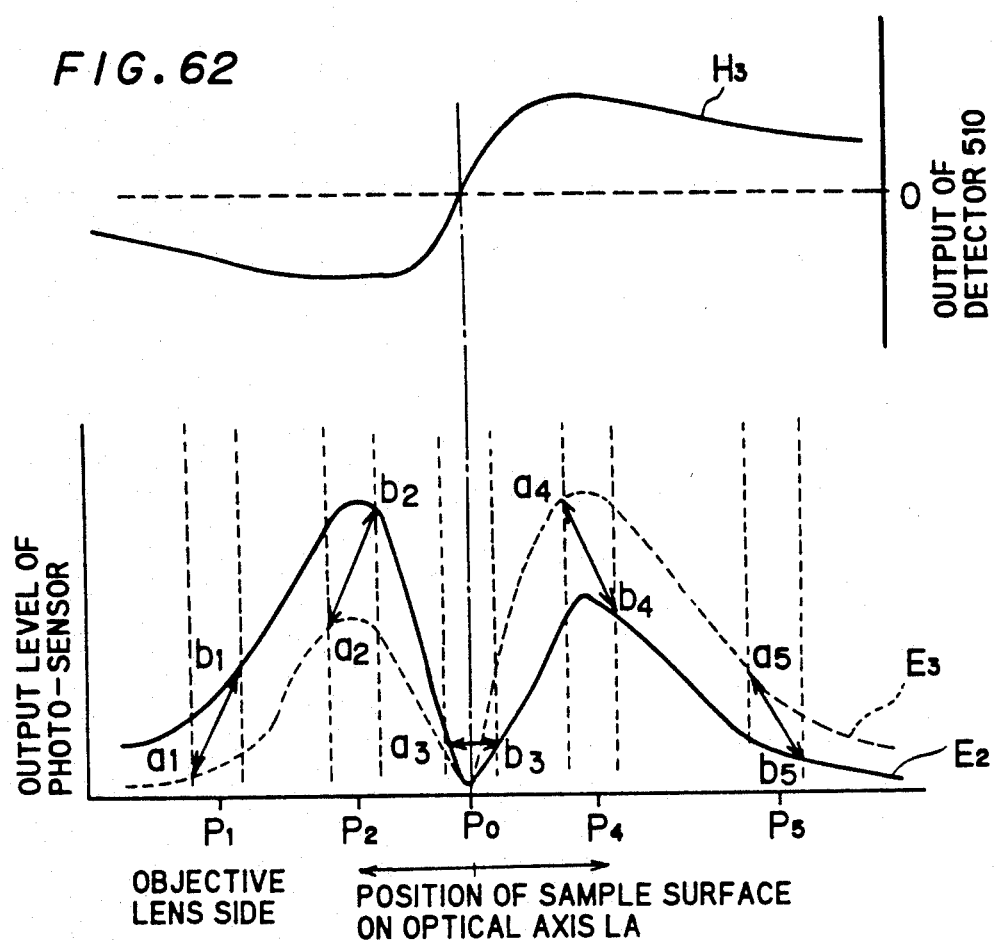
FIG. 62 is a diagram showing output characteristics of a photo-sensor in the eighteenth embodiment.
Figure 61:
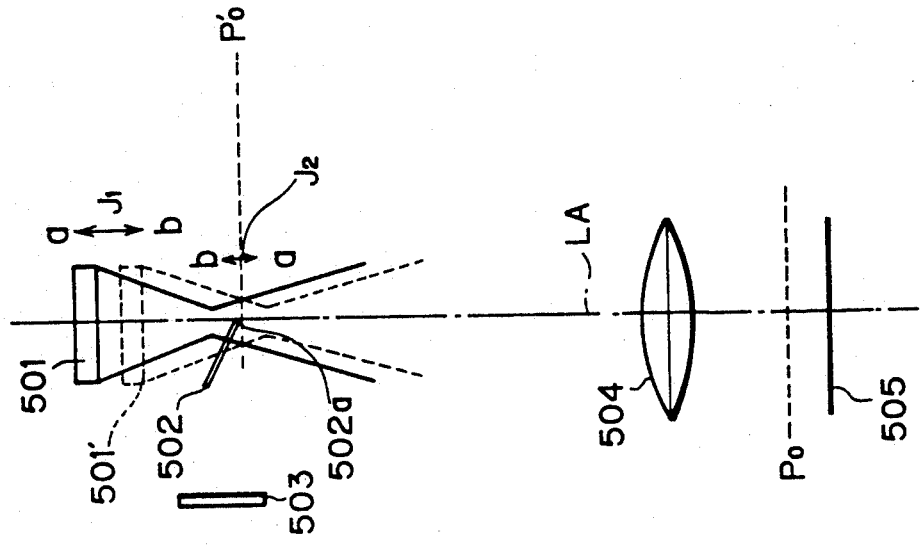
FIG. 61 is a schematic configuration diagram of a eighteenth preferred embodiment of the present invention.

Suppose the convergent point of the rays from the projector 501 is displaced from the edge 502a towards the projector 501, as is illustrated by solid lines in FIG. 61, and the curve $E_1$ is transformed into an asymmetrical curve $E_3$. As illustrated in FIG. 62, the curve $E_3$ is asymmetrical upon either side of the reference position $P_0$.

Also suppose the convergent point of the rays from a projector 501 is displaced from the edge 502a towards the objective lens 504, as is illustrated by broken lines in FIG. 61, and the curve $E_1$ is transformed into an asymmetrical curve $E_2$. As illustrated in FIG. 62, the curve $E_2$ is a mirror image of the curve $E_3$ upon either side of the reference position $P_0$. Relative to the curves $E_2$ and $E_3$ in FIG. 62, the vertical axis represents the output from the photo-sensor 503, while the horizontal axis represents the position of the sample surface 505 on the optical axis LA.

When the louver 502 and the projector 501 are vibrated as designated by arrows $J_1$ and $J_2$ in FIG. 61, respectively, with a common period and opposite phases, the following notable phenomenon is observed.

Suppose that the sample surface 505 is located upon a position $P_5$ in FIG. 62, i.e., the sample surface 505 is displaced from the reference position $P_0$ towards far side of the objective lens 504, and the louver 502 and the projector 501 shown in FIG. 61 are vibrated in 180° out-of-phase.

Under this circumstances, there is a moment in time at which the louver 502 and the projector 501 have the longest distance from each other, i.e., the louver 502 is located upon the position a of an arrow $J_2$ and the projector 501 is located upon the position a of an arrow $J_1$. Since the projector 501 is represented by the solid lines at this moment, the outputs from the photo-sensor 503 draw a curve $E_3$ in FIG. 62, as is mentioned earlier. The condition that the louver 502 is located at the side a of the arrow $J_2$ is equivalent to that the louver 502 has a character to maintain the conjugate relation with the sample surface 505. Consequently, the output at this particular moment is on the curve $a_5$ in FIG. 62.

There is another moment intime at which the louver 502 and the projector 501 have the shortest distance from each other, i.e., the louver 502 is located upon the position b of the arrow $J_2$ and the projector 501 is located upon the position b of the arrow $J_1$. According to the same reason as the above, the output at this particular moment is on the curve $b_5$ in FIG. 62.

To summarize, when the sample surface 505 is located upon the position $P_5$ in FIG. 62, with the louver 502 and the projector 501 vibrating as designated by arrows $J_2$ and $J_1$ in FIG. 61, the output from the photo-sensor 503 shuttles between the curves $a_5$ and $b_5$.

Likewise, when the sample surface 505 is located on positions $P_1$, $P_2$, $P_0$ and $P_4$ in FIG. 62, the output from the photo-sensor 503 shuttles between the curves $a_1$ and $b_1$, $a_2$ and $b_2$, $a_3$ and $b_3$, and $a_4$ and $b_4$, respectively.

Figure 64:
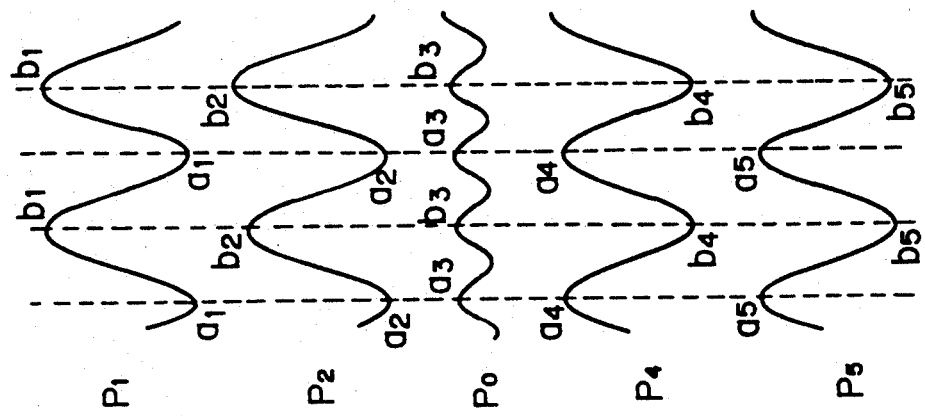
FIG. 64 is a diagram depicting outputs from a photo-sensor in the eighteenth embodiment of the present invention.

FIG. 64 illustrates the waveforms of the output of the photo-sensor 503 under the conditions that the projector 501 and the louver 502 are vibrated in the directions $J_1$ and $J_2$ respectively, with the sample surface 505 being located at the positions $P_1$, $P_2$, $P_0$, $P_4$ and $P_5$ in FIG. 62. The extremes corresponding to $a_1$-$a_5$ and $b_1$-$b_5$ are designated using the same notations. In FIG. 64, the curve $P_1$ represents the output from the photo-sensor 503 when the sample surface 505 is located upon the position $P_1$. The other curves $P_2$, $P_0$, $P_4$ and $P_5$ are drawn according to a similar rule. The vertical axis thereof represents the output from the photo-sensor 503, while the horizontal axis thereof represents the time.

From FIG. 62, it is understood that:
the waveforms $P_1$ and $P_2$ have the same phase,
the waveforms $P_4$ and $P_5$ have the opposite phase to the waveforms $P_1$ and $P_2$, and
the waveforms $P_0$ does not contain any frequency components that have the same period as the vibration of the projector 501 and the louver 502.

When these signals are supplied to the phase detector circuit 510, which is illustrated in FIG. 55, its output draws a curve $H_3$ in FIG. 62. The vertical axis thereof represents the output from the phase detector circuit 510, while the horizontal axis thereof represents the position of the sample surface 505 on the optical axis LA.

Figure 67:
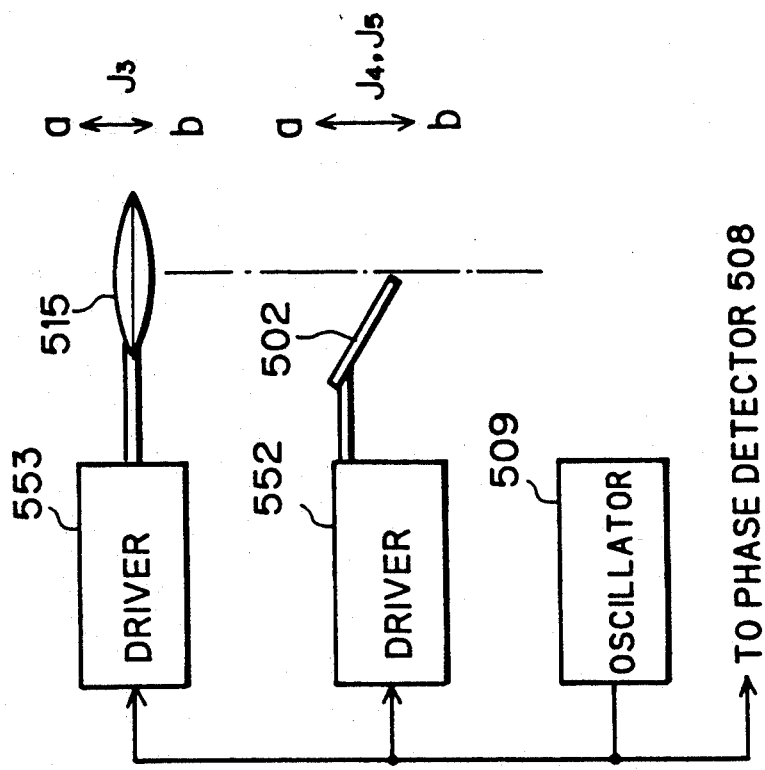

Thus, inconvenience with opposite polarities outside the area I pertaining to the curve $H_2$ in FIG. 60 is cleared as shown by the curve $H_3$ in FIG. 62. Such a modification is illustrated in FIG. 67, where drivers 551 and 552 are operable to vibrate the projector 501 and the louver 502 according to the oscillation signal delivered from the oscillator 509.

§23. Nineteenth Embodiment

In the eighth embodiment, the louver 502 and the projector 501 are vibrated in the opposite phases, as is illustrated in FIG. 61. If there are any difficulties involved in implementation of such a practice, the same efficacy as the eighth embodiment can be expected through adoption of the configuration of a nineteenth preferred embodiment illustrated in FIG. 63.

Figure 68:
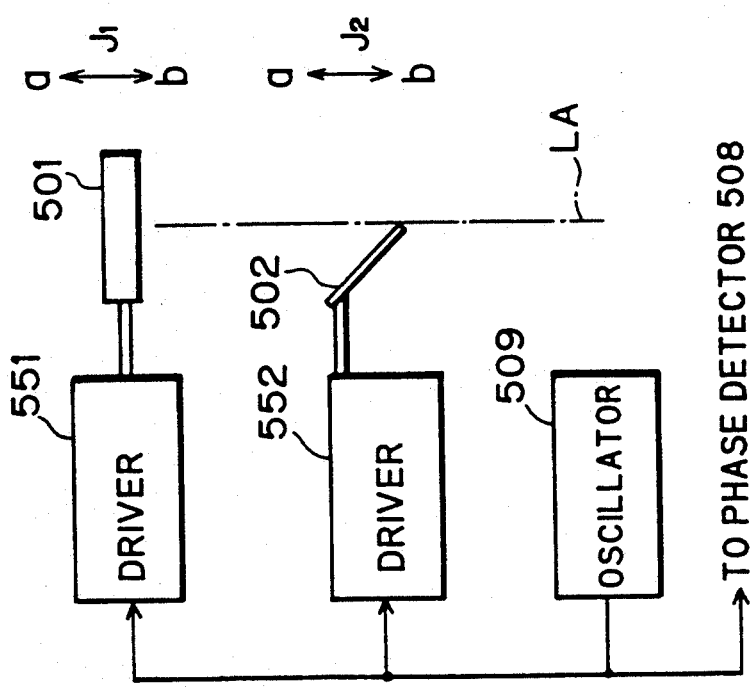

A light source 514 and a converging lens 515 comprise the projector 1. The converging lens 515 is vibrated in the same phase with the louver 502 without moving the light source 514. When the converging lens 515 is located at a position a of an arrow $J_3$, the convergent point of rays, which are represented by solid lines, is located at a position a of an arrow $J_5$. On the other hand, when the converging lens 515 is at a position b of the arrow $J_3$, the convergent point of the rays, which are represented by broken lines, is located at a position b designated by the arrow J5. That is, the converging lens 505 and the convergent point vibrate with the opposite phases. An in-phase vibration of the converging lens 514 and the louver 502 causes an antiphase vibration of the convergent point and the louver 502. Thus, the same efficacy as an antiphase vibration of the projector 501 and the louver 502, as is illustrated in FIG. 61, is obtained through the in-phase vibration of the lens 514 and the louver 502. Such a modification is shown in FIG. 68, where drivers 553 and 552 are operable to vibrate the converging lens 515 and the louver 502 according to the oscillation signal delivered from the oscillator 509, respectively.

§24. Other Embodiments

The projector 501 and the louver 502 illustrated in FIG. 61 are described as vibrating antiphase. An in-phase vibration can also provide the basically same efficacy as an antiphase vibration. With the in-phase vibration, however, inclinations of the arrows in FIG. 62 are reversed. Consequently, the amplitude of outputs from the photo-sensor 503 is decreased and the signal-noise ratio of the whole system will be reduced.

In FIG. 61, the projector 501 and the louver 502 do not necessarily vibrate at the same frequencies. Even with different frequencies, the same effcacy can be obtained by two-stage processing of the output from the photo-sensor 503 using first and second phase detectors, where:

the output from the photo-sensor 503 is processed using the first phase detector in synchronism with the vibration of the louver 502, output therefrom is fed to the second phase detector and processed in synchronism with the vibration of the projector 501.

Likewise, the louver 502 and the converging lens 515 do not necessarily vibrate at the same frequencies.

Figure 63:
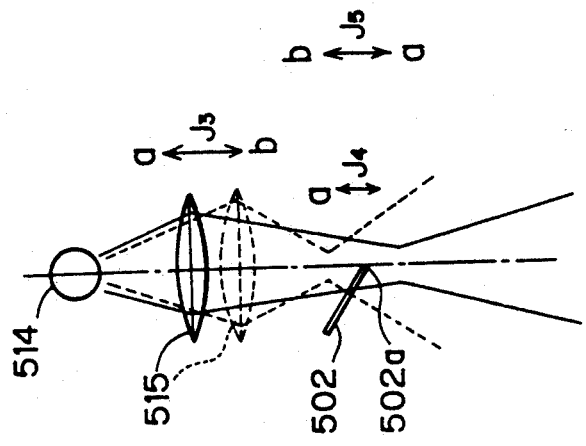
FIG. 63 is a schematic configuration diagram of a nineteenth preferred embodiment of the present invention.

In FIGS. 53, 61 and 63 depicting embodiments of the present invention, the edge 502a of the louver 502 is illustrated to contact the optical axis LA for the convenience of illustration.

In principle, however, the edge 502a does not necessariry contact the said optical axis LA. The photosensor 503 may be mounted on or united with the sample side surface of the louver 502.

§25. Advantage of Sixteenth through Nineteenth Embodiments

The sixteenth through nineteenth embodiments provide position detection systems which employ a universal principle of imaging optics that the amount of light illuminating the sample side surface of the louver 502 is minimized when the edge 502a of louver 502 is located in a conjugate position with the sample surface 505. Therefore, unlike any prior art for optical position detection, influences of optical conditions of the object of detection can be avoided.

Although the present invention has been described and illustrated in detail, it is clearly understood that the same is by way of illustration and example only and is not to be taken by way of limitation. The spirit and scope of the present invention should be limited only by the terms of the appended claims.

We claim:

1. A system for detection displacement of a sample surface from a predetermined reference position comprising:

(a) a light source for projecting light towards said sample surface;

(b) an objective lens located between said light source and said sample surface, wherein said light is projected onto said sample surface through said objective lens and is reflected upon said sample surface to thereby obtain a reflecting light travelling through said objective lens;

(c) a light blocking member located between said light source and said objective lens on one side only of the optical axis between said light source and said objective lens, wherein said light blocking member has a first surface that faces said objective lens and a second surface that faces said light source, and an edge of said light blocking member is located on a first position which is conjugate with said reference position across said objective lens, said light projected from said light source being partially blocked by a light blocking area which is defined on said second surface of said light blocking member and which includes said edge of said light blocking member; and (d) photo-sensor means for detecting an amount of said reflecting light which travels towards said first surface, said displacement being detected as a function of said amount of said reflecting light.

2. The system in accordance with claim 1 wherein:
said edge is located on an optical axis of said objective lens.

3. The system in accordance with claim 2 wherein:
said first surface has a light-reflecting surface area inclined from a plane perpendicular to said optical axis, whereby said reflecting light reflects from said first surface; and
said photo-sensor means has a light receiving surface facing said first surface and detects said amount of said reflecting light after said reflecting light reflects from said first surface.

4. The system in accordance with claim 3, further comprising:
(e) an imaging lens provided between said light source and said first position for forming an image of a photo-emitting plane of said light source at a second position defined upon said optical axis.

5. The system in accordance with claim 4 wherein:
said second position coincides with said first position.

6. The system in accordance with claim 4 wherein:
said second position is located between said imaging lens and said first position.

7. The system in accordance with claim 4 wherein:
said second position coincides with a focal point of said objective lens.

8. The system in accordance with claim 3 wherein:
said edge is located on a photo-emitting plane of said light source.

9. The system in accordance with claim 2, further comprising:
(e) a half mirror located between said objective lens and said light blocking member for leading a part of the said reflecting light to a first direction inclined from said optical axis; wherein
said photo-detector means has a light receiving surface located in said first direction at a position which is conjugate with said first surface.

10. The system in accordance with claim 2 wherein:
said photo-detector means is fixed to said light blocking member.

11. The system in accordance with claim 1 wherein:

said edge contains a linear part.

12. A system for detecting displacement of a sample surface from a predetermined reference position comprising:
   (a) a light source for projecting light towards said sample surface;
   (b) an objective lens located between said light source and said sample surface, wherein said light is projected onto said sample surface through said objective lens and is reflected upon said sample surface to thereby obtain a reflecting light travelling through said objective lens; and
   (c) a light detection module located between said light source and said objective lens on one side only of the optical axis between said light source and said objective lens, comprising a photo-sensor which has (c-1) a light receiving surface which faces said objective lens to detect the amount of said reflecting light travelling from said sample surface towards said light receiving surface and (c-2) a light blocking surface which faces said light source and has an edge located at a first position which is conjugate with said reference position across said objective lens for partially blocking said light on a light blocking area defined on said light blocking surface so as to include said edge, said displacement being detected as function of an output signal of said photo-sensor.

13. The system in accordance with claim 12 wherein: said light detection module has a transparent plate onto which said light blocking surface is attached.

14. The system in accordance with claim 13 wherein: said edge contains a linear part.

15. A system for detecting a displacement of a sample surface from a predetermined reference position comprising:
   (a) a first light source for projecting a first light towards said sample surface via a beam splitter;
   (b) a second light source for projecting a second light towards said sample surface via said beam splitter;
   (c) an objective lens located between said beam splitter and said sample surface;
   (d) a first light blocking member located between said first light source and said beam splitter, which has a first surface that faces said beam splitter, wherein a first and a second fixed position are defined at positions which have predetermined positional relations with said reference position and an edge of said first light blocking member is located upon a first position conjugate with said first fixed position across said objective lens, said first and second positions being deviated from each other in a direction parallel to an optical axis of said objective lens;
   (e) a second light blocking member located between said second light source and said beam splitter, which has a second surface that faces said beam splitter, wherein a an edge of said second light blocking member is located upon a second position which is conjugate with said second fixed position across said objective lens;
   (f) a first photo-sensor means for detecting an amount of a first reflecting light travelling toward said first surface to generate a first detection signal, wherein said first reflecting light is caused by reflection of aid first light from said sample surface, said first reflecting light after reflecting from said sample surface being transmitted through said objective lens and said beam splitter; and
   (g) a second photo-sensor means for detecting an amount of a second reflecting light travelling toward said second surface to generate a second detection signal, wherein said second reflecting light is caused by reflection of said second light from said sample surface, said second reflecting light after reflection from said sample surface being transmitted through said objective lens and said beam splitter, said displacement being detected as a function of a difference between said first and second detection signals.

16. The system in accordance with claim 15 wherein: said beam splitter comprises a wavelength selective half mirror which passes light of a first wavelength and reflects light of a second wavelength.

17. The system in accordance with claim 15 further comprising:
   (h) a first filter interposed between said first light blocking member and said beam splitter, said first filter having a first transmission band of wavelength; and
   (i) a second filter interposed between said second light blocking member and said beam splitter, said second filter having a second transmission band of wavelength.

18. The system in accordance with claim 15, further comprising:
   (h) a first electric means for generating a first electric signal of a first frequency to supply said first electric signal to said first light source, whereby said first light is modulated by said first electric signal;
   (i) a second electric means for generating a second electric signal of a second frequency to supply said second electric signal to said second light source, whereby said second light is modulated by said second electric signal;
   (j) a first detector circuit means for detecting a component of said first detection signal which is in synchronism with said first electric signal to generate a first output signal;
   (k) a second detector circuit means for detecting a component of said second detection signal which is in synchronism with said second electric singal to generate a second output singal, said displacement being detected as a function of said first and second output signals.

19. A system for detecting a displacement of a sample surface from a predetermined reference position comprising:
   (a) a light source for projecting light towards said sample surface;
   (b) an objective lens located between said light source and said sample surface;
   (c) first and second filters which are located between said light source and said objective lens across an optical axis of said objective lens, said first filter having a first transmission band of wavelength, said second filter having a second transmission band of wavelength;
   (d) a first light blocking member located between said light source and said first filter, which has a first surface that faces said objective lens, wherein first and second fixed positions are defined at positions which have fixed positional relations with said reference position and an edge of said first light blocking member is located at a first position which is conjugate with said first fixed position across said objective lens;

(e) a second light blocking member located between said second light source and said second filter, which has a second surface that faces said objective lens, wherein an edge of said second light blocking member is located at a second position which is conjugate with said second fixed position across said stage lens;

(f) a first photo-sensor means for detecting an amount of a first reflecting light travelling toward said first surface to generate a first detection signal, wherein said first reflecting light is caused by reflection of said first light upon said sample surface and transmitted through said objective lens; and (g) a second photo-sensor means for detecting an amount of a second reflecting light travelling said second surface to generate a second detection signal, wherein said second reflecting light is caused by reflection of said second light upon said sample surface and transmitted through said objective lens, said displacement being detected as a function of said first and second detection signals.

20. A system for detecting a displacement of a sample surface from a predetermined reference position comprising:

(a) a projector for projecting light towards said sample surface;

(b) an objective lens located between said projector and said sample surface;

(c) a light blocking member located between said light source and said objective lens, which has a first surface that faces said objective lens, an edge of said light blocking member being located at a first position which is conjugate with said reference position across said objective lens; and (d) a photo-sensor means for detecting an amount of a reflecting light travelling toward said first surface to generate a detection signal, wherein said reflecting light is caused by reflection of said light upon said sample surface and transmitted through said objective lens;

(e) an oscillator means for generating an electric signal of a predetermined frequency;

(f) a first driver means for receiving said electric signal and for vibrating said light blocking member in a direction parallel to an optical axis of said objective lens at said frequency; and (g) a detector circuit means for receiving said detection signal and said electric signal and for detecting a component of said detection signal having a same phase with said electric signal to generate an output signal, said displacement being detected as a function of said output signal.

21. The system in accordance with claim 20 wherein: said detector circuit means has:

(g-1) a pulse generator for generating, in response to said electric signal, a periodic binary pulse signal having said frequency; and (g-2) a multiplier for calculating a product of said periodic pulse signal and said detection signal, said output signal being obtained from said multiplier.

22. The system in accordance with claim 20, further comprising:

(h) means for detecting a peak of said detection signal to generate a first pulse;

(i) means for detecting a bottom of said detection signal to generate a second pulse; and (j) an RS flip-flop which accepts one of said first and second pulses as a set input and the other as a reset input, an output from said RS flip-flop being fed to said detector circuit means.

23. The system in accordance with claim 20, further comprising:

(k) a second driver means for receiving said electric signal and for vibrating said projector in said direction parallel to said optical axis at said frequency.

24. The system in accordance with claim 23 wherein: respective vibrations of said projector and said light blocking member are out-of-phase by 180 degrees.

25. A system for detecting a displacement of a sample surface from a predetermined reference position comprising:

(a) a projector including a light source and a converging lens for projecting light towards said sample surface;

(b) an objective lens located between said projector and said sample surface;

(c) a light blocking member located between said projector and said objective lens, which has a first surface that faces said objective lens, wherein an edge of said light blocking member is located at a first position which is conjugate with said reference position across said objective lens;

(d) a photo-sensor means for detecting an amount of a reflecting light travelling toward said first surface to generate a detection signal, wherein said reflecting light is caused by reflection of said light upon said sample surface and transmitted through said objective lens;

(e) a oscillator means for generating an electric signal of a predetermined frequency;

(f) a driver means for receiving said electric signal and for vibrating said objective lens in a direction parallel to an optical axis of said objective lens at said frequency; and (g) a detector circuit means for receiving said detection signal and said electric signal and for detecting a component of said detection signal which has said frequency to generate an output signal, said displacement being detected as a function of said output signal.

26. A system for detecting a displacement of a sample surface from a predetermined reference position comprising:

(a) a projector for projecting light towards said sample surface, having a light source and a conversing lens;

(b) an objective lens located between said projector and said sample surface, having a same optical axis with said conversing lens;

(c) a light blocking member located between said light source and said objective lens, which has a first surface that faces said objective lens, wherein an edge of said light blocking member is located at a first position which is conjugate with said reference position across said objective lens;

(d) a photo-detector means for detecting an amount of a reflecting light travelling toward said first surface to generate a detection signal, wherein said reflecting light is caused by reflection of said light upon said sample surface and transmitted through said objective lens;

(e) a oscillator means for generating an electric signal of a predetermined frequency;

(f) first and second driver means for receiving said electric signal and for vibrating said conversing lens and said light blocking member in a direction parallel to an optical axis at said frequency and different phases, respectively; and (g) a detector circuit means for receiving said detection signal and said electric signal and for detecting a component of said detection singal which has a same phase with said electric signal to generate an output signal, said displacement being detected as a function of said output.

27. A system for detecting a displacement of a sample surface from a predetermined reference position comprising:

(a) a projector for projecting light towards said sample surface;

(b) an objective lens located between said projector and said sample surface;

(c) a light blocking member located between said light source and said objective lens, which has a first surface that faces said objective lens, wherein an edge of said light blocking member is located at a first position which is conjugate with said reference position across said objective lens;

(d) a photo-sensor means for detecting to an amount of a reflecting light travelling toward said first surface to generate a detection signal, wherein said reflecting light is caused by reflection of said light upon said sample surface and transmitted through said objective lens;

(e) an oscillator means for generating an electric signal of a predetermined frequency;

(f) a driver means for receiving said electric signal to vibrate said sample surface in a direction parallel to an optical axis of said objective lens at said frequency; and (g) a detector circuit means for receiving said electric signal and for detecting a component of said detection signal which has a same phase with said detection signal to generate an output signal, said displacement being defined by a distance between said reference position and a center of vibration of said sample surface and being detected as a function of output signal.

28. A system for detecting a displacement of a sample surface from a predetermined reference position comprising:

(a) a light source for projecting light towards said sample surface;

(b) an objective lens located between said light source and said sample surface, wherein said light is projected onto said sample surface through said objective lens and is reflected upon said sample surface to thereby obtain a reflecting light travelling through said objective lens;

(c) a light blocking member located between said light source and said objective lens, wherein said light blocking member has a first surface that faces said objective lens, and an edge of said light blocking member is located on a first position which is conjugate with said reference position across said objective lens, said first surface having a light-reflecting surface area inclined from a plane perpendicular to said optical axis, whereby said reflecting light reflects from said first surface;

(d) photo-sensor means for detecting an amount of said reflecting light which travels towards said first surface, said displacement being detected as a function of said amount of said reflecting light, said photo sensor means having a light receiving surface facing said first surface for detecting said amount of said reflecting light after said reflecting light reflects from said first surface;

(e) an imaging lens provided between said light source and said first position for forming an image of a photo-emitting plane of said light source at a second position defined upon said optical axis, said second position being located between said objective lens and said first position.

29. A system for detecting a displacement of a sample surface from a predetermined reference position comprising:

(a) a light source for projecting light towards said sample surface;

(b) an objective lens located between said light source and said sample surface, wherein said light is projected onto said sample surface through said objective lens and is reflected upon said sample surface to thereby obtain a reflecting light travelling through said objective lens;

(c) a light blocking member located between said light source and said objective lens, wherein said light blocking member has a first surface that faces said objective lens, and an edge of said light blocking member is located on a first position which is conjugate with said reference position across said objective lens, said edge containing a non-linear part; and (d) photo-sensor means for detecting an amount of said reflecting light which travels towards said first surface, said displacement being detected as a function of said amount of said reflecting light.

30. A system for detecting a displacement of a sample surface from a predetermined reference position comprising:

(a) a light source for projecting light towards said sample surface;

(b) an objective lens located between said light source and said sample surface, wherein said light is projected onto said sample surface through said objective lens and is reflected upon said sample surface to thereby obtain a reflecting light travelling through said objective lens;

(c) a light blocking member located between said light source and said objective lens, wherein said light blocking member has a first surface that faces said objective lens, and an edge of said light blocking member is located on a first position which is conjugate with said reference position across said objective lens;

(d) photo-sensor means for detecting an amount of said reflecting light which travels towards said first surface, said displacement being detected as a function of said amount of said reflecting light;

(e) a first holder means for holding said light blocking member, which is revolvable about said first position; and (f) a second holder means for holding said photodetector means, which is revolvable about said first position.

31. A system for detecting a displacement of a sample surface from a predetermined reference position comprising;

(a) a light source for projecting light towards said sample surface;

(b) an objective lens located between said light source and said sample surface, wherein said light is projected onto said sample surface through said objective lens and is reflected upon said sample surface to thereby obtain a reflecting light travelling through said objective lens; and (c) a light detection module located between said light source and said objective lens, comprising a photo-sensor which has (c-1) a light receiving surface which faces said objective lens and (c-2) a light blocking surface which faces said light source, wherein an edge of said light blocking surface is located at a first position which is conjugate with said reference position across said objective lens, said displacement being detected as a function of an output signal of said photo-sensor, said light detection module having a transparent plate onto which said light blocking surface is fixed and said edge containing a non-linear part.

32. A system for detecting a displacement of a sample surface from a predetermined reference position comprising:

(a) a first light source for projecting a first light towards said sample surface via a beam splitter;

(b) a second light source for projecting a second light towards said sample surface via said beam splitter;

(c) an objective lens located between said beam splitter and said sample surface;

(d) a first light blocking member located between said first light source and said beam splitter, which has a first surface that faces said beam splitter, wherein first and second fixed positions are defined at positions which have predetermined positional relations with said reference position and an edge of said first light blocking member is located upon a first position conjugate with said first fixed position across said objective lens;

(e) a second light blocking member located between said second light source and said beam splitter, which has a second surface that faces said beam splitter, wherein an edge of said second light blocking member is located upon a second position which is conjugate with said second fixed position across said objective lens;

(f) a first photo-sensor means for detecting an amount of a first reflecting light illuminated on said first surface to generate a first detection signal, wherein said first reflecting light is caused by reflection of said first light upon said sample surface and transmitted through said objective lens and said beam splitter;

(g) a second photo-sensor means for detecting an amount of a second reflecting light illuminated on said second surface to generate a second detection signal, wherein said second reflecting light is caused by reflection of said second light upon said sample surface and transmitted through said objective lens and said beam splitter, said displacement being detected as a function of said first and second detection signals;

(h) a first polarizing filter for passing light polarized in a first direction, which is interposed between said first light blocking member and said beam splitter; and (i) a second polarizing filter for passing light polarized in a second direction, which is interposed between said second light blocking member and said beam splitter.

33. A system for detecting displacement of a sample surface from a predetermined reference position comprising:

(a) a first light source for projecting a first light towards said sample surface via a polarizing beam splitter;

(b) a second light source for projecting a second light towards said sample surface via said beam splitter;

(c) an objective lens located between said beam splitter and said sample surface;

(d) a first light blocking member located between said first light source and said beam splitter, which has a first surface that faces said beam splitter, wherein first and second fixed positions are defined at positions which have predetermined positional relations with said reference position and an edge of said first light blocking member is located upon a first position conjugate with said first fixed position across said objective lens;

(e) a second light blocking member located between said second light source and said beam splitter, which has a second surface that faces said beam splitter, wherein an edge of said second light blocking member is located upon a second position which is conjugate with said second fixed position across said objective lens;

(f) a first photo-sensor means for detecting an amount of a first reflecting light illuminated on said first surface to generate a first detection signal, wherein said first reflecting light is caused by reflection of said first light upon said sample surface and transmitted through said objective lens and said beam splitter; and (g) a second photo-sensor means for detecting an amount of a second reflecting light illuminated on said second surface to generate a second detection signal, wherein said second reflecting light is caused by reflection of said second light upon said sample surface and transmitted through said objective lens to said beam splitter, said displacement being detected as a function of said first and second detection signals.

34. A system for detecting a displacement of a sample surface from a predetermined reference position comprising:

(a) a first light source for projecting a first light towards said sample surface via a beam splitter;

(b) a second light source for projecting a second light towards said sample surface via said beam splitter, said beam splitter having a disk revolved by a motor and said disk having a pattern comprising a transparent area and a reflective area which alternatively cross optical paths of said first and second lights;

(c) an objective lens located between said beam splitter and said sample surface;

(d) first light blocking member located between said first light source and said beam splitter, wherein first and second fixed positions are defined at positions which have predetermined positional relations with said reference position and an edge of said first light blocking member is located upon a first position conjugate with said first fixed position across said objective lens;

(e) a second light blocking member located between said second light source and said beam splitter, which has a second surface that faces said beam splitter, wherein an edge of said second light blocking member is located upon a second position which is conjugate with said second fixed position across said objective lens;

(f) a first photo-sensor means for detecting an amount of a first reflecting light illuminated on said first surface to generate a first detection signal, wherein said first reflecting light is caused by reflection of said first light upon said sample surface and transmitted through said objective lens and said beam splitter;

(g) a second photo-sensor means for detecting an amount of a second reflecting light illuminated on said second surface to generate a second detection signal, wherein said second reflecting light is caused by reflection of said second light upon said sample surface and transmitted through said objective lens and said beam splitter, said displacement being detected as a function of said first and second detection signals;

(h) an angle sensor which is connected with said motor and senses an angle of revolution of said disk;

(i) a first sample-hold means for, in response to an output from said angle sensor, sampling and holding said first detection signal as a first holding signal while said transparent area crosses said optical paths of said first and second lights; and (j) a second sample-hold means for, in response to said output from said angle sensor, sampling and holding said second detection signal as a second holding signal while said transparent area crosses said optical paths of said first and second lights, said displacement being detected as a function of said first and second holding signals.

* * * * *

UNITED STATES PATENT AND TRADEMARK OFFICE
CERTIFICATE OF CORRECTION

PATENT NO. : 5,251,011

DATED : October 5, 1993

INVENTOR(S) : Nariaki Fujiwara and Tokuji Shibahara

It is certified that error appears in the above-indentified patent and that said Letters Patent is hereby corrected as shown below:

On title page, item [75] change "Tokaji Shibahara"

to --Tokuji Shibahara--.

Signed and Sealed this

Fourteenth Day of June, 1994

Attest:

BRUCE LEHMAN

*Attesting Officer*     *Commissioner of Patents and Trademarks*